United States Patent [19]

Ishibashi et al.

[11] Patent Number: 5,687,404
[45] Date of Patent: Nov. 11, 1997

[54] CAMERA

[75] Inventors: Kenji Ishibashi, Sakai; Yoshihiro Hara, Kishiwada; Kazuhiko Yukawa, Wakayama; Akihiko Fujino, Sakai; Yasuo Maeda, Kawachinagano; Shigeto Ohmori, Sakai; Fumiaki Ishito, Sakai; Hiroshi Ootsuka, Sakai; Masayuki Miyazawa, Sakai, all of Japan

[73] Assignee: Minolta Camera Kabushiki Kaisha, Osaka, Japan

[21] Appl. No.: 705,690

[22] Filed: Aug. 29, 1996

Related U.S. Application Data

[62] Division of Ser. No. 324,962, Oct. 18, 1994, Pat. No. 5,576,791, which is a division of Ser. No. 233,943, Apr. 28, 1994, Pat. No. 5,386,262, which is a division of Ser. No. 743,241, Aug. 9, 1991, Pat. No. 5,319,411.

[30] Foreign Application Priority Data

| Feb. 11, 1990 | [JP] | Japan | 2-298624 |
| Aug. 11, 1990 | [JP] | Japan | 2-212675 |
| Aug. 11, 1990 | [JP] | Japan | 2-212676 |
| Aug. 11, 1990 | [JP] | Japan | 2-212677 |
| Aug. 11, 1990 | [JP] | Japan | 2-212678 |
| Aug. 11, 1990 | [JP] | Japan | 2-212679 |
| Sep. 11, 1990 | [JP] | Japan | 2-241979 |
| Sep. 11, 1990 | [JP] | Japan | 2-241980 |

[51] Int. Cl.$^6$ ................................ G03B 13/10
[52] U.S. Cl. ............................ 396/88; 396/296; 396/379
[58] Field of Search ........................ 396/281, 287, 396/296, 378, 379, 72, 85, 88

[56] References Cited

U.S. PATENT DOCUMENTS

| 4,855,782 | 8/1989 | Kobayashi et al. | 396/88 |
| 5,319,411 | 6/1994 | Ishibashi et al. | 396/85 |
| 5,386,262 | 1/1995 | Ishibashi et al. | 396/379 |
| 5,576,791 | 11/1996 | Ishibashi et al. | 396/379 |

*Primary Examiner*—David M. Gray
*Attorney, Agent, or Firm*—Burns, Doane, Swecker & Mathis, LLP

[57] ABSTRACT

A single-lens reflex camera comprises a taking lens having a zooming optical system, a finder whose angle of view is determined according to a focal length of the taking lens, and an operation member which is manually operated. In the single-lens reflex camera, the focal length of the taking lens is changed by driving the zooming optical system, and the zooming operation is controlled in response to an operation of the operation member so that the focal length of the taking lens is changed in the wide-angle direction by a predetermined amount. An angle of view corresponding to that which is seen before the focal length is changed is displayed within the finder.

12 Claims, 77 Drawing Sheets

FD1: Finder frame
FD2: Taking frame
FD3: Focus detection area
FD4: Display of shutter speed
FD5: Display of control aperture value

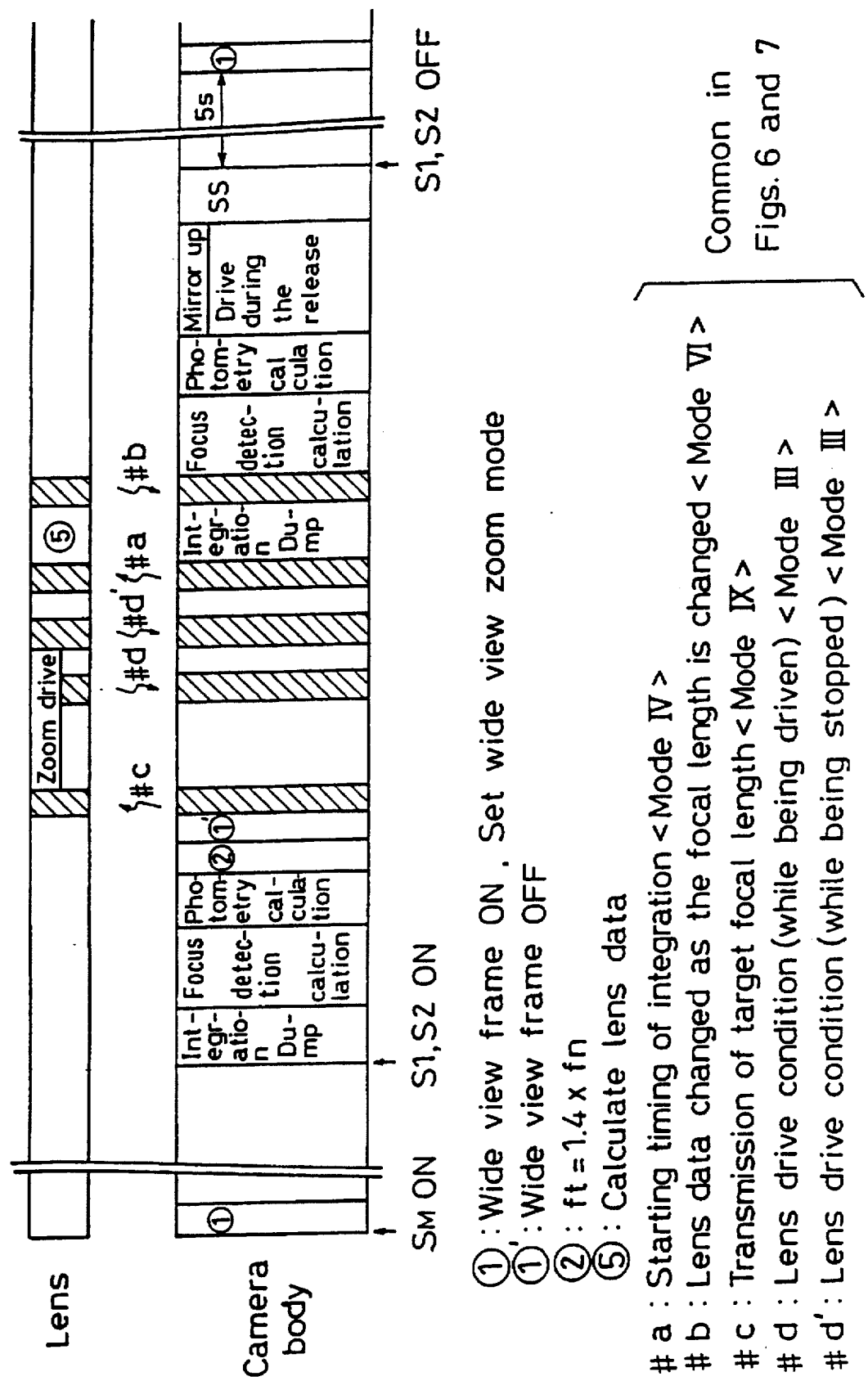

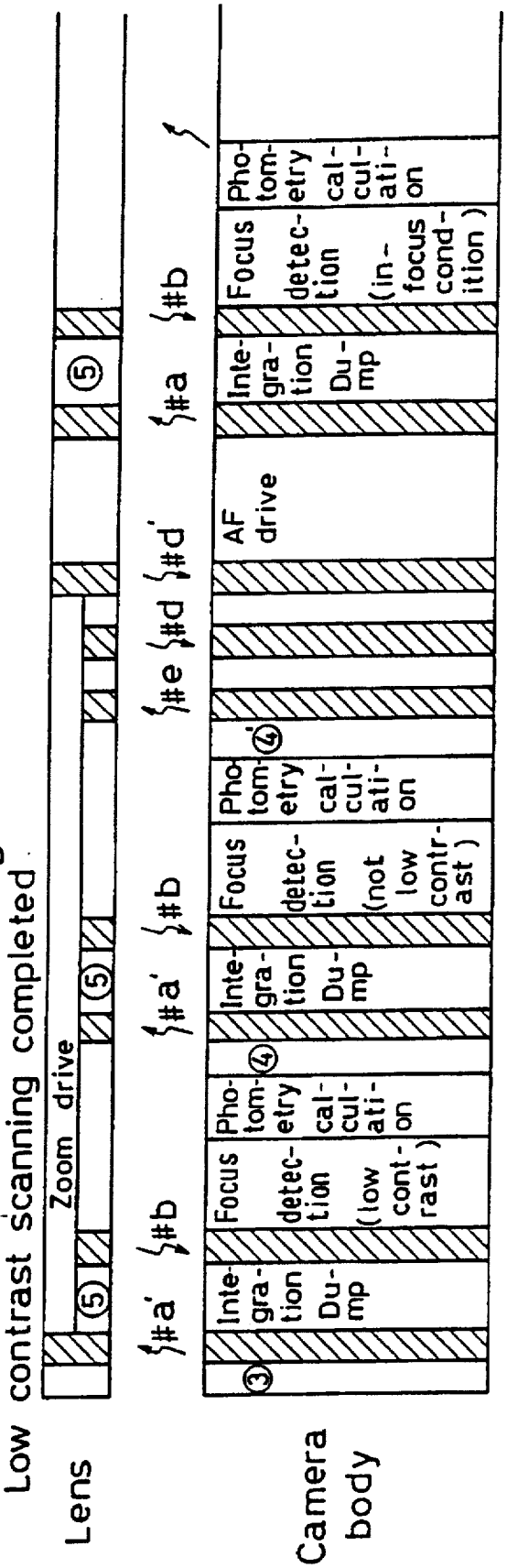

DISP1

Set
CAMERA

This application is a divisional of application Ser. No. 08/324,962, filed Oct. 18, 1994, now U.S. Pat. No. 5,576,791 which is a divisional of application Ser. No. 08/233,943, filed Apr. 28, 1994, (now U.S. Pat. No. 5,386,262), which is a divisional of application Ser. No. 07/743,241, filed Aug. 9, 1991, (now U.S. Pat. No. 5,319,411).

BACKGROUND OF THE INVENTION

1. Field of the Invention

The present invention relates a camera having a finder whose angle of view is variable.

2. Description of the Related Art

In conventional cameras, only an object situated in a taking area can be viewed through a finder since the taking area and the finder field area almost coincide. Such cameras have the following problems:

For example, when an object is violently moving, the object is immediately out of the taking area even if the camera is trained on the object and the object is captured within the taking area. At this time, since the object is out of the finder field, the location of the object cannot be found, and therefore it is difficult to capture the object within the taking area again.

In photographing with a telephoto lens, since the finder shows a part of the object which is enlarged, it is difficult to find out which part of the object is shown in the finder.

Such problems can be solved by a finder designed so that the finder field is larger than the taking area. However, it is inevitable that the size of such a finder is large, which increases the size of the camera. Moreover, in single-lens reflex cameras, it is impossible to make a finder field larger than the taking area since only object light that is within, or almost within, the taking area is conveyed to the finder.

SUMMARY OF THE INVENTION

An object of the present invention is, in order to solve the above-described problems, to provide a camera having a finder through which an object situated out of a taking area can be viewed without increasing the size of the finder.

To achieve the above-described object, the present invention provides a camera comprising: a taking lens having a zooming optical system; zooming means for changing a focal length of the taking lens by driving said zooming optical system; a finder whose angle of view is determined according to the focal length of the taking lens; an operation member which is manually operated; controlling means for controlling said zooming means in response to an operation of said operation member so that the focal length of said taking lens is changed in the wide-angle direction by a predetermined amount; and displaying means for displaying within said finder an angle of view corresponding to that which is seen before the focal length is changed.

The features of the present invention which are believed to be novel are set forth with particularly in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 6 is a sequence chart schematically showing an operation sequence of the camera system in the wide view mode.

FIG. 7 is a sequence chart schematically showing an operation sequence of the camera system in the auto wide mode.

FIG. 11 is a flow chart showing a subroutine AF LENS UNIT MOVE-IN.

FIG. 12 is a flow chart showing a subroutine ZOOM LENS UNIT MOVE-IN.

FIG. 40 is a flow chart showing a subroutine ZOOM LENS UNIT MOVE-IN.

DETAILED DESCRIPTION OF THE PREFERRED EMBODIMENT

A single-lens reflex camera system to which an interchangeable lens is attachable where the lens is moved by the driving force of a motor to change its focal length motor will hereinafter be described as an embodiment of the present invention.

Figure 1:
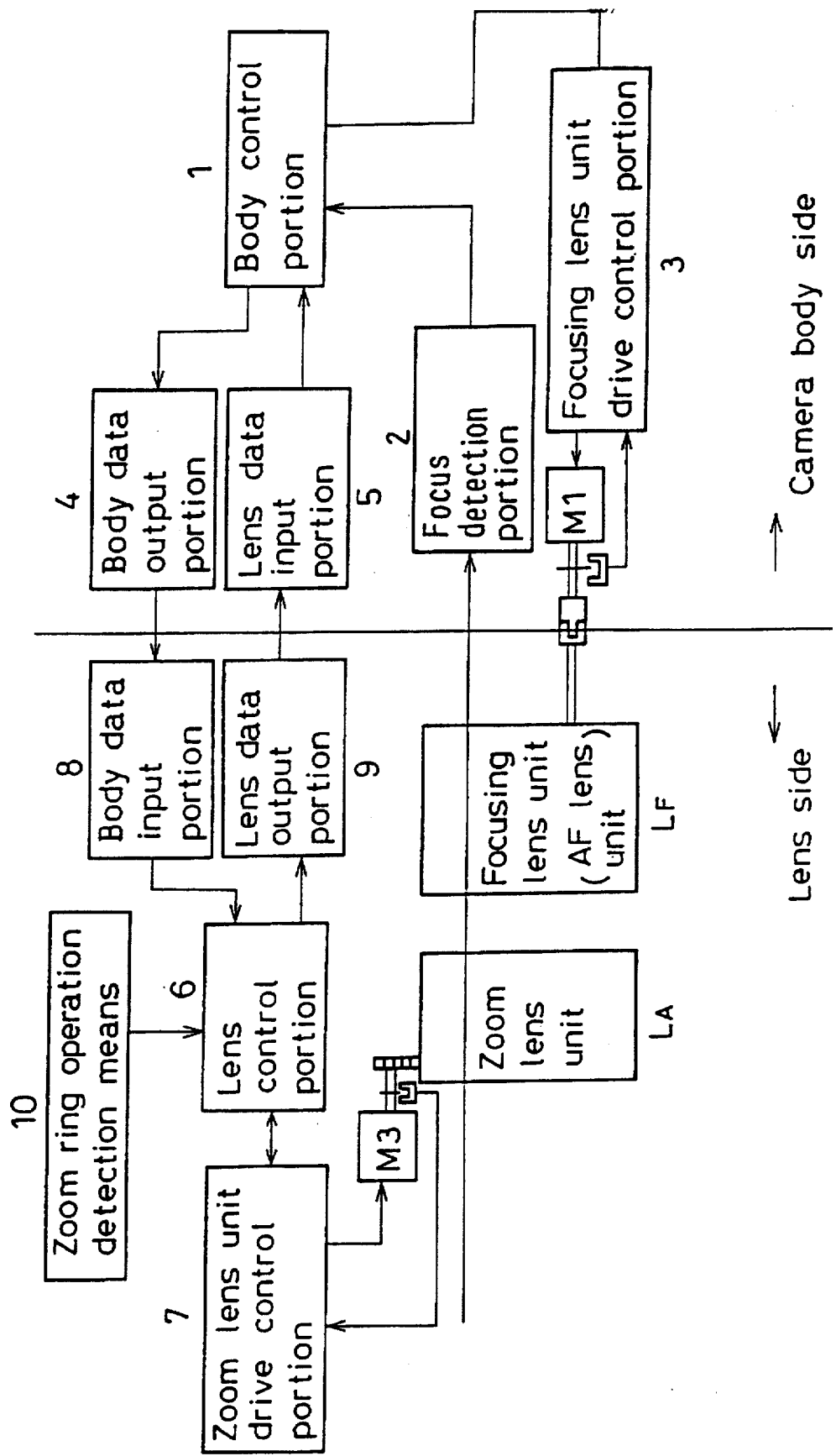
FIG. 1 is a block diagram showing a camera system constructed in accordance with the present invention.

FIG. 1 is a block diagram of the single-lens reflex camera system. As shown in the figure, the camera body side has a function to move a lens unit for focusing (hereinafter referred to as AF lens unit) $L_F$ to automatically adjust the focus. The automatical adjustment is executed by applying a current to a motor M1 through a focusing lens unit drive control portion 3 where the current is generated in accordance with a lens movement amount calculated by a body control portion 1 based on input data from a focus detection portion 2. Further, the camera body side has a function to move a lens by a will of the camera body by exchanging data with the lens side through a body data output portion 4 and a lens data input portion 5.

The lens side has a function to move a zoom lens unit $L_A$ to perform a zooming operation by applying a current from a zoom lens unit drive control portion 7 to a motor M3 when an operation of a zoom ring is detected by zoom ring operation detection means 10 (this function will hereinafter be referred to as "power zoom"), a function to supply lens data to the camera body by exchanging data with the camera body through a body data input portion 8 and a lens data output portion 9, and a function to make itself operate based on data from the camera body.

Next, appearances of the camera body and lens will be described referring to FIGS. 2A and 2B.

Figure 2A:
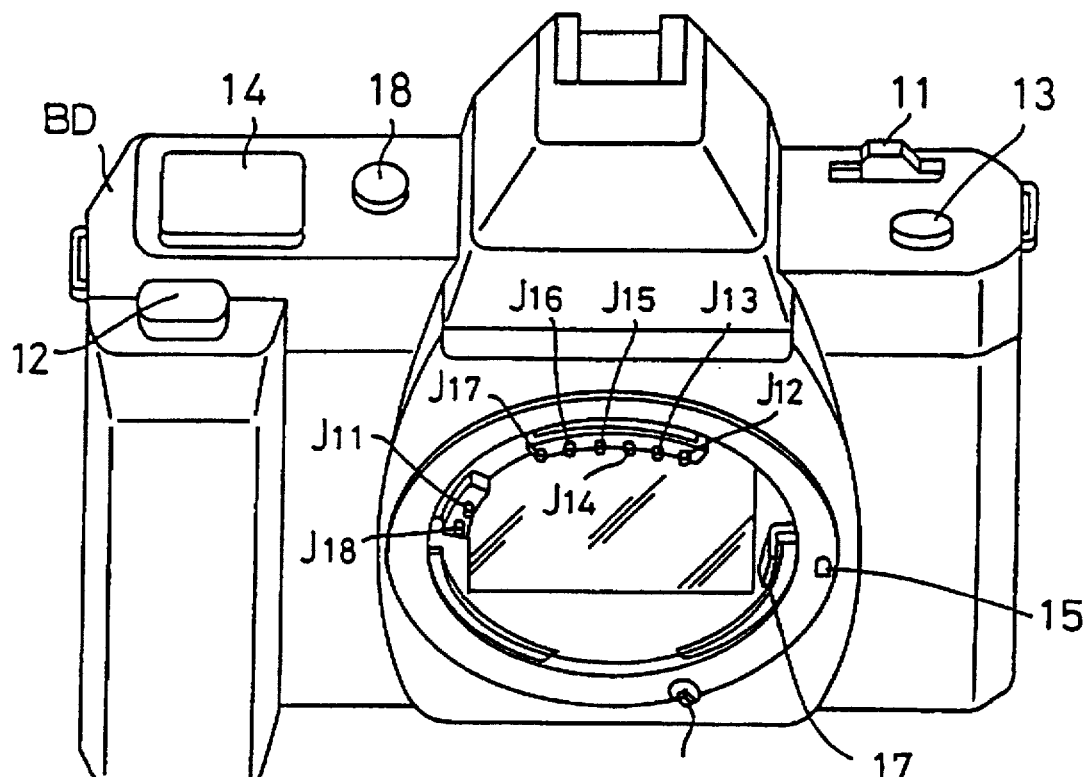
FIG. 2A shows the appearance of the camera body of the camera system.
Figure 2B:
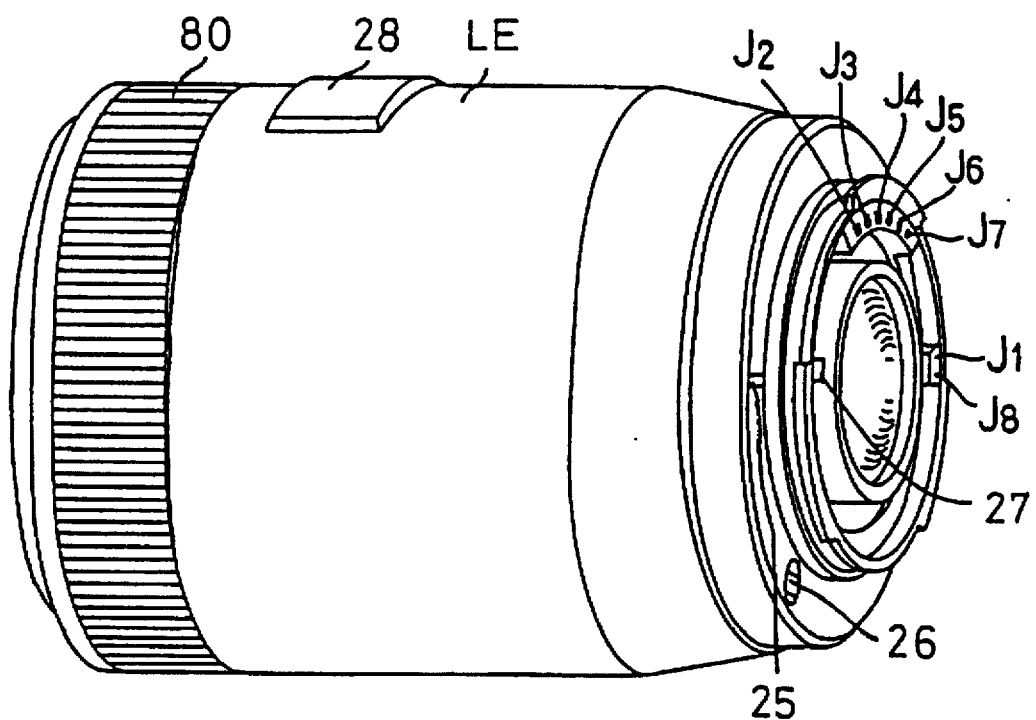
FIG. 2B shows the appearance of an interchangeable lens to be attached to the camera body.

FIG. 2A shows an appearance of a camera body BD to which the present invention is applied. FIG. 2B shows an appearance of an interchangeable lens LE interchangeably attachable to the camera body BD shown in FIG. 2A. The name and function of each portion will briefly be described in the following referring to FIGS. 2A and 2B.

11 is a slider for turning on and off a main switch $S_M$. When the slider 11 is at ON position, the camera body BD is in an operable condition. When it is at OFF position, the camera body BD is in an inoperable condition.

12 is a release button. By a first-stroke depression of the release button 12, a taking preparation switch S1 (to be described later) is turned on to start a photometry, exposure calculation and automatic focusing (AF) operation. By a second-stroke depression of the release button 12, a release switch S2 (to be described later) is turned on to start an exposure control operation.

Figure 5:
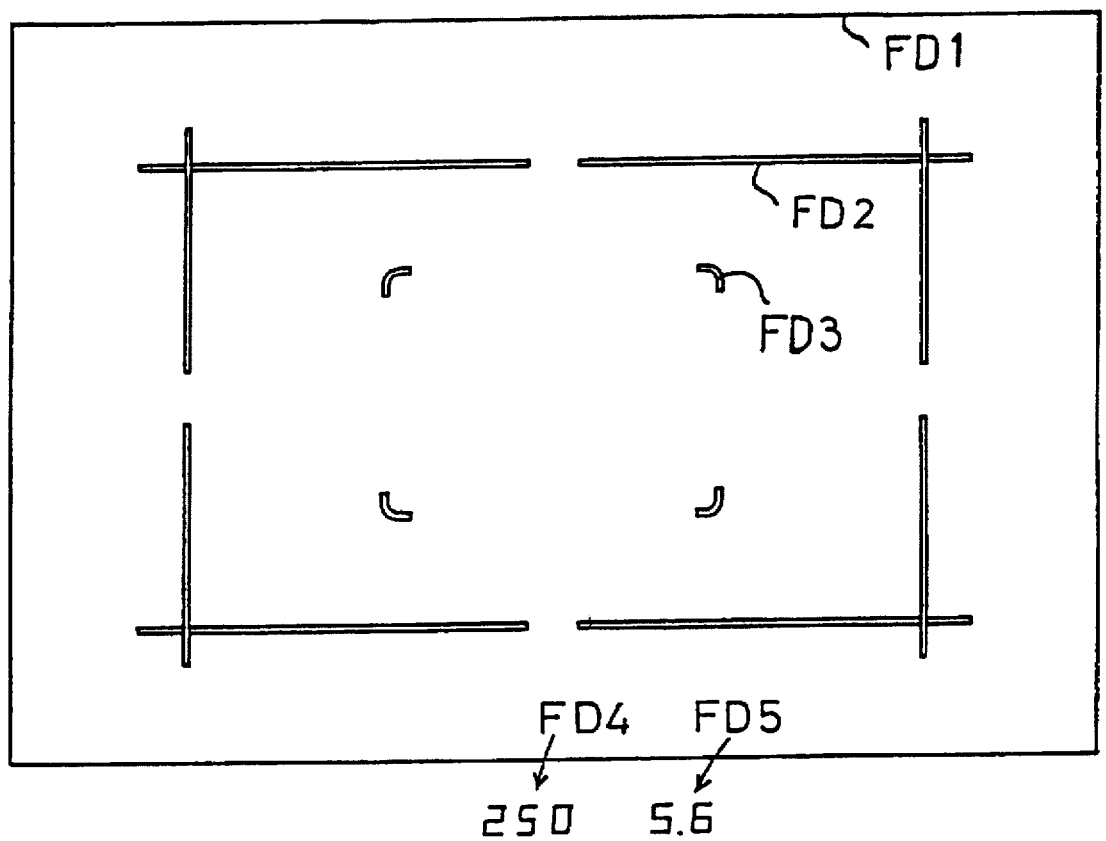
FIG. 5 shows a view-finder display of the camera system.

13 is a wide view key. A changing-over is made in response to an operation of the wide view key 13 between a condition where the finder field almost coincides with the taking area and a condition where the finder field is larger than the taking area. When the release switch S2 in turned on under the latter condition, firstly, a taking area viewed within a taking frame FD2 (to be described later) shown in FIG. 5 is enlarged so that the taking area coincides to an image forming area of a film, and then, an exposure is started. (This function will hereinafter be referred to as "wide view.")

14 is a display portion for displaying a shutter speed, an aperture value, information on the switches and a warning indicating that batteries in the battery holder are nearly exhausted. In a view-finder display portion shown in FIG. 5, a shutter speed FD4, a taking frame FD2, etc. are displayed.

15 is a mount lock pin. Under the mount locked condition where the interchangeable lens LE is attached, a lens attachment switch $S_{LE}$ (to be described later) is OFF. Under other conditions where the interchangeable lens LE is not attached, the lens attachment switch $S_{LE}$ is ON.

16 is an AF coupler, which rotates according to a rotation of an AF motor provided in the camera body BD.

17 is a stop-down lever for closing an aperture of the interchangeable lens LE by the number of stop-down steps obtained at the camera body BD.

18 is an auto wide key for changing-over an ON/OFF of an auto wide function. The auto wide function is a function to repeat a focus detection while automatically performing a zooming operation in the WIDE direction (the wide-angle direction) when the focal point cannot be detected and when the focal point cannot be detected even after a low contrast scanning is completed. The low contrast scanning is that a focus detection is repeated while the AF lens unit is being moved when a contrast required for detecting a focusing condition is not obtained in a focus detection (the condition will hereinafter be referred to as low contrast condition). The focus detection contains the following operations (1) to (3):

(1) Whether or not the contrast is low is determined;

(2) When the contrast is not low, the focusing condition, that is, a deviation amount of a focal point, (or a defocus amount), is detected to determine whether or not an in-focus condition is obtained; and (3) When an in-focus condition is not obtained, a position, of the AF lens unit, at which an in-focus condition is obtained, or a drive pulse count of the AF lens unit required for obtaining an in-focus condition is calculated based on the defocus amount obtained in the above-described operation (2).

In this embodiment, it is assumed that the focal point cannot be detected only under the low contrast condition. A case where the focal point cannot be detected due to a low luminance will not be considered in the following description, since the above case can be dealt with separately from the case where the focal point cannot be detected due to the low contrast.

Next, the name and function of each portion of the interchangeable lens LE will be described referring to FIG. 2B.

25 is a mount lock slot. 26 is an AF coupler. 27 is a stop-down lever. When the interchangeable lens LE is attached to the camera body BD, the mount lock pin 15 on the camera body BD is engaged with the mount lock slot 25; and a convex portion of the AF coupler 16 on the camera body side, with a concave portion of the AF coupler 26 on the lens side, so that the rotation of the AF motor on he camera body side is transmitted to the lens side through the AF couplers 16 and 26 to move the AF lens unit for focusing. The terminals $J_1$ to $J_8$ on the lens side are connected to the terminals $J_{11}$ to $J_{18}$ on the camera body side. The stop-down lever 17 on the camera body side is engaged with the stop-down lever 27 on the lens side. The stop-down lever 27 on the lens side is moved following the stop-down lever 17 on the camera body side by the movement amount of the stop-down lever 17 on the camera body side to adjust the aperture value so that it becomes a value corresponding to the movement amount of the stop-down levers 17 and 27.

28 is a lens display portion for displaying a focal length, etc.

80 is an operation ring (a zoom ring), which is rotated to specify the speed and direction of power zooming.

Next, the circuit arrangement of the camera system will be described.

Figure 3:
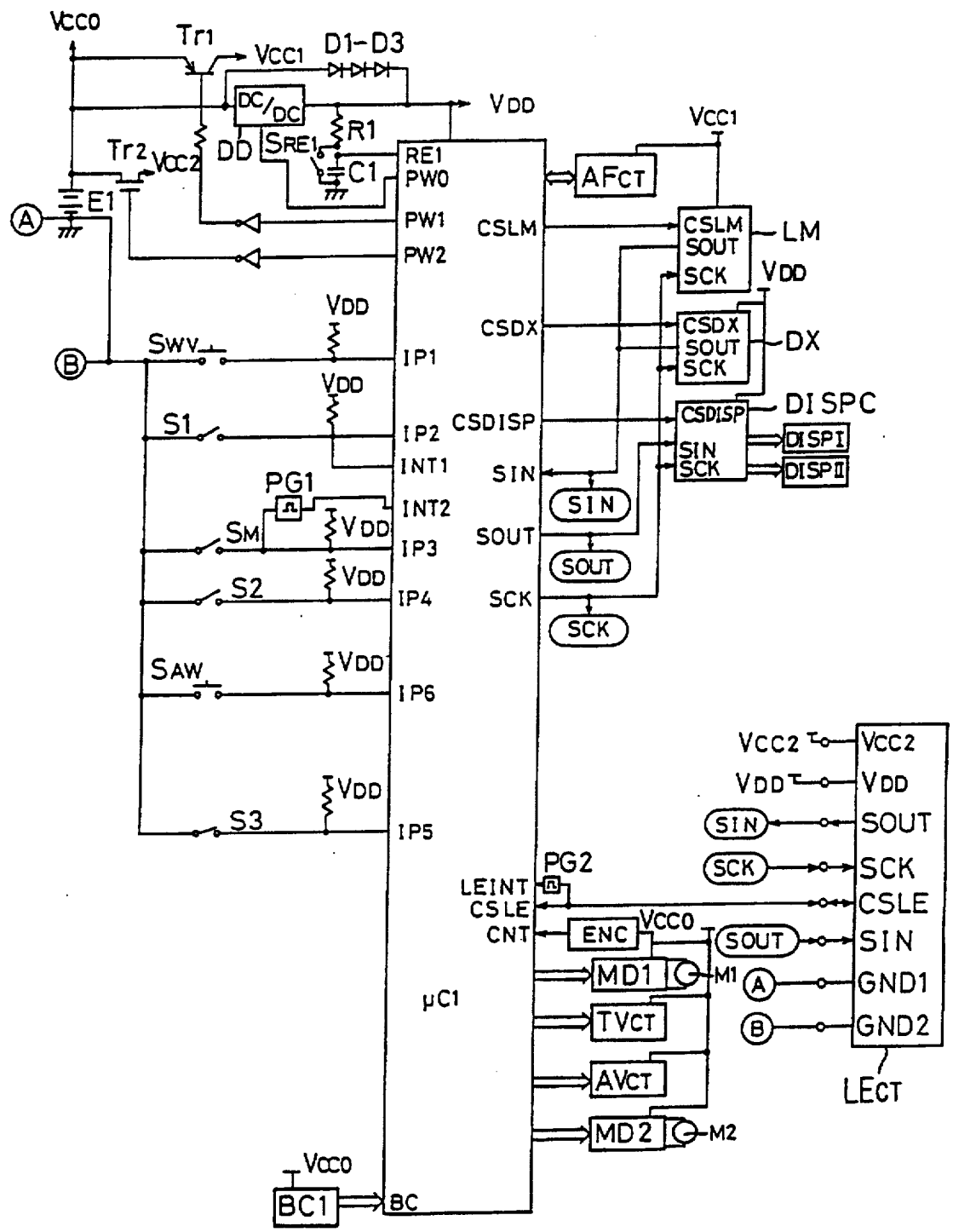
FIG. 3 is a circuit diagram of an in-body circuit built in the camera body.

FIG. 3 is a circuit diagram of a circuit provided in the camera body BD. First, the circuits in the camera body BD will be described referring to the figure.

μC1 represents a microcomputer, provided in the camera body BD, for controlling the entire camera system and for performing various calculations (hereinafter referred to as an "in-body microcomputer").

$AF_{CT}$ represents a focus detection light receiving circuit, which has a CCD (charge coupled device) serving as an image sensor of an integration type for detecting a focal point which accumulates an optical charge for a predetermined period of time, a CCD drive circuit, and a circuit for processing an output of the CCD, A/D-(analog to digital) converting it and supplying it to the in-body microcomputer μC1 (this supplying operation will hereinafter be referred to as "data dump"). The focus detection light receiving circuit $AF_{CT}$ is connected to the in-body microcomputer μC1 through a data bus. The information on a deviation amount (a defocus amount) of the focal point of an object situated in the focus detection area is obtained by the focus detection light receiving circuit $AF_{CT}$.

LM represents a photometric circuit provided on the optical path of the finder for A/D-converting a photometry value and giving it to the in-body microcomputer μC1 as luminance information.

DX represents a film sensitivity reading device provided in a film holder for reading data on a film sensitivity and serially outputting them to the in-body microcomputer μC1. DISPC represents a display circuit for receiving display data and a display control signal from the in-body microcomputer μC1 and for making a display portion DISPI provided on top of the camera body BD (the display portion 14 shown in FIG. 2) and a display portion DISPII of the finder (see FIG. 5) display predetermined operation data.

Figure 9A:
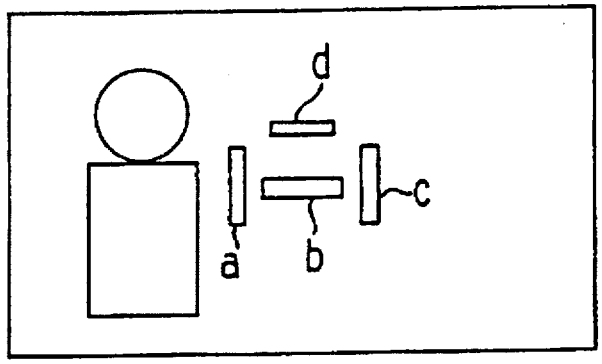
FIGS. 9A and 9B show views through the finder in the auto wide mode.
Figure 9B:
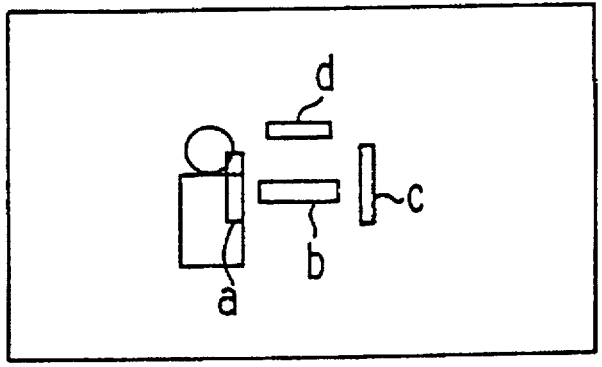

Now, the display of the finder shown in FIG. 5 will be described. In the figure, FD1 is a finder frame showing an area where an object is actually viewed. FD2 is a taking frame displayed when the wide view function is turned to ON by operating the wide view key 13. An object viewed inside the taking frame FD2 can be photographed. FD3 shows a focus detection area. In other words, it shows that an an object viewed inside the focus detection area FD3 can be brought into focus. However, in actuality, the focus detection areas a to d are provided in the focus detection area FD3 as shown in FIGS. 9A and 9B so that an object situated in the areas a to d is brought into focus. FD4 and FD5 are a shutter speed and a control aperture value, respectively, obtained by a photometry calculation.

Returning to FIG. 3, $LE_{CT}$ represents an in-lens circuit provided in the interchangeable lens LE for supplying information on the interchangeable lens LE to the in-body microcomputer a μC1. The in-lens circuit $LE_{CT}$ will be described in detail later.

M1 represents an AF motor for driving the AF lens unit of the interchangeable lens LE through the AF couplers 16 and 26.

MD1 represents a motor drive circuit for driving the AF motor M1 according to the focus detection information. The in-body microcomputer μC1 controls the rotation direction and the starting and stopping of the AF motor M1 through the motor drive circuit MD1.

ENC represents an encoder for monitoring the rotation of the AF motor M1. The encoder ENC outputs a pulse into a counter input terminal CNT of the in-body microcomputer μC1 every predetermined rotation angle. The in-body microcomputer μC1 counts the number of pulses to control the speed of the AF lens unit.

$TV_{CT}$ represents a shutter control circuit for controlling a shutter according to a control signal produced by the in-body microcomputer μC1.

$AV_{CT}$ represents an aperture control circuit for controlling an aperture according to a signal produced by the in-body microcomputer μC1.

M2 represents a motor for charging a film winding and rewinding function and an exposure control function. MD2 represents a motor drive circuit for driving the motor M2 according to a signal produced by the in-body microcomputer μC1.

Next, the power sources shown in FIG. 3 will be described.

E1 represents a battery for supplying power to the camera body BD.

Tr1 represents a first power transistor for supplying power to some of the above-described circuits. Tr2 represents a second power transistor for supplying power for driving an in-lens zoom motor provided inside the interchangeable lens LE. The second power transistor has an MOS (metal oxide semiconductor) constitution.

DD represents a DC/DC (direct current to direct current) converter for stabilizing a voltage $V_{DD}$ supplied to the in-body microcomputer μC1. The DC/DC converter DD operates when the level of a power control terminal PW0 is high. The voltage $V_{DD}$ represents an operation power voltage of the in-body microcomputer μC1, the in-lens circuit $LE_{CT}$, the film sensitivity reading circuit DX and the display control circuit DISPC. $V_{CC1}$ represents an operation power source voltage of the focus detection light receiving circuit $AF_{CT}$ and the photometric circuit LM. The voltage $V_{CC1}$ is supplied by the battery E1 through the power transistor Tr1 under control of a signal outputted by a power control terminal PW1. $V_{CC2}$ represents an operation power source voltage of the in-lens zoom motor of the interchangeable lens LE. The voltage $V_{CC2}$ is supplied by the battery E1 through the power transistor Tr2. $V_{CC0}$ represents an operation power voltage of the motor drive circuit MD1, the shutter drive circuit $TV_{CT}$, the aperture control circuit $AV_{CT}$ and the motor drive circuit MD2. The voltage $V_{CC0}$ is supplied directly to the above circuits by the battery E1.

D1 to D3 represent diodes for supplying a voltage lower than the voltage $V_{DD}$ to the in-body microcomputer μC1 to decrease the power consumption when the DC/DC converter DD is stopped. The diodes D1 to D3 are designed so as to supply the minimum voltage by which the in-body microcomputer μC1 can be operated. When the DC/DC converter is stopped, only the in-body microcomputer μC1 can be operated.

BC1 represents a battery check circuit for detecting the voltage $V_{CC0}$ of the battery E1 and for giving the detection result to the in-body microcomputer μC1.

GND1 represents a ground line of a smaller-power-consumption portion. The ground line GND1 is connected through the terminals $J_{17}$ and $J_7$ between the interchangeable lens LE and the camera body BD. Different ground lines are required for the analog and digital signal processing portions in the camera body BD; however, they are represented by a single line in the figure.

GND2 represents a ground line of a larger-power-consumption portion. The ground line GND2 is connected through the terminals $J_{18}$ and $J_8$ between the interchangeable lens LE and the camera body BD.

Next, the switches shown in FIG. 3 will be described.

$S_{WV}$ represents a normally-open push switch for changing-over ON/OFF of the wide view mode. The switch $S_{WV}$ is turned on when the above-described wide view key 13 is pushed.

$S_{AW}$ represents a normally-open push switch for changing-over ON/OFF of the auto wide function. The switch $S_{AW}$ is turned on when the above-described auto wide key 18 is pushed.

S1 represents a preparation switch which is turned on by the first-stroke depression of the release button 12. When the switch S1 is turned on, an interrupt signal is inputted into an interrupt terminal INT1 of the in-body microcomputer μC1 to start preparation operations such as a photometry, focus detection, driving of the AF lens unit, etc. required for photographing operations.

$S_M$ represents a main switch turned on when the slider 11 which starts the operations of the camera system is slid to the ON position and turned off when the slider 11 is slid to the OFF position.

PG1 represents a pulse generator for generating low-level pulses every time the main switch $S_M$ is turned from on to off or from off to on. The output of the pulse generator PG1 is supplied to an interrupt terminal INT2 of the in-body microcomputer μC1 as an interrupt signal.

S2 represents a release switch which is turned on by the second-stroke depression of the release button 12. When the switch S2 is turned on, the photographing operations are started.

S3 represents a mirror-up switch which is turned on when a mirror-up operation is completed and turned off when a mirror-down operation is completed.

$S_{RE1}$ is a battery attachment detection switch which is turned off when the battery E1 is attached to the camera body BD. When the battery E1 is provided and the battery attachment detection switch $S_{RE1}$ is turned off, a condenser C1 is charged and the level of a reset terminal RE1 of the in-body microcomputer μC1 is changed from low to high. Consequently, a routine RESET is executed by the in-body microcomputer μC1 as described later.

Next, the arrangements, for a serial data communication, shown in FIG. 3 will be described.

The photometric circuit LM, the film sensitivity reading circuit DX and the display control circuit DISPC perform serial communication with the in-body microcomputer μC1 through such signal lines as a serial input SIN, a serial output SOUT and a serial clock SCK. A partner of the serial communication with the in-body microcomputer μC1 is selected by chipselect terminals CSLM, CSDX and CSDISP, That is, when the level of the terminal CSLM is low, the photometric circuit LM is selected; when the level of the terminal CSDX is low, the film sensitivity reading circuit DX is selected; and when the level of the terminal CSDISP is low, the display control circuit DISPC is selected. The three signal lines SIN, SOUT and SCK for a serial communication are connected to the in-lens circuit $LE_{CT}$ through the terminals $J_{15}$ and $J_5$, $J_{14}$ and $J_4$, and $J_{16}$ and $J_6$, respectively. When the in-lens circuit $LE_{CT}$ is selected as the partner of the serial communication, the level of the terminal CSLE is low. This low-level signal is transmitted to the in-lens circuit $LE_{CT}$ through the terminals $J_3$ and $J_{13}$.

Figure 4:
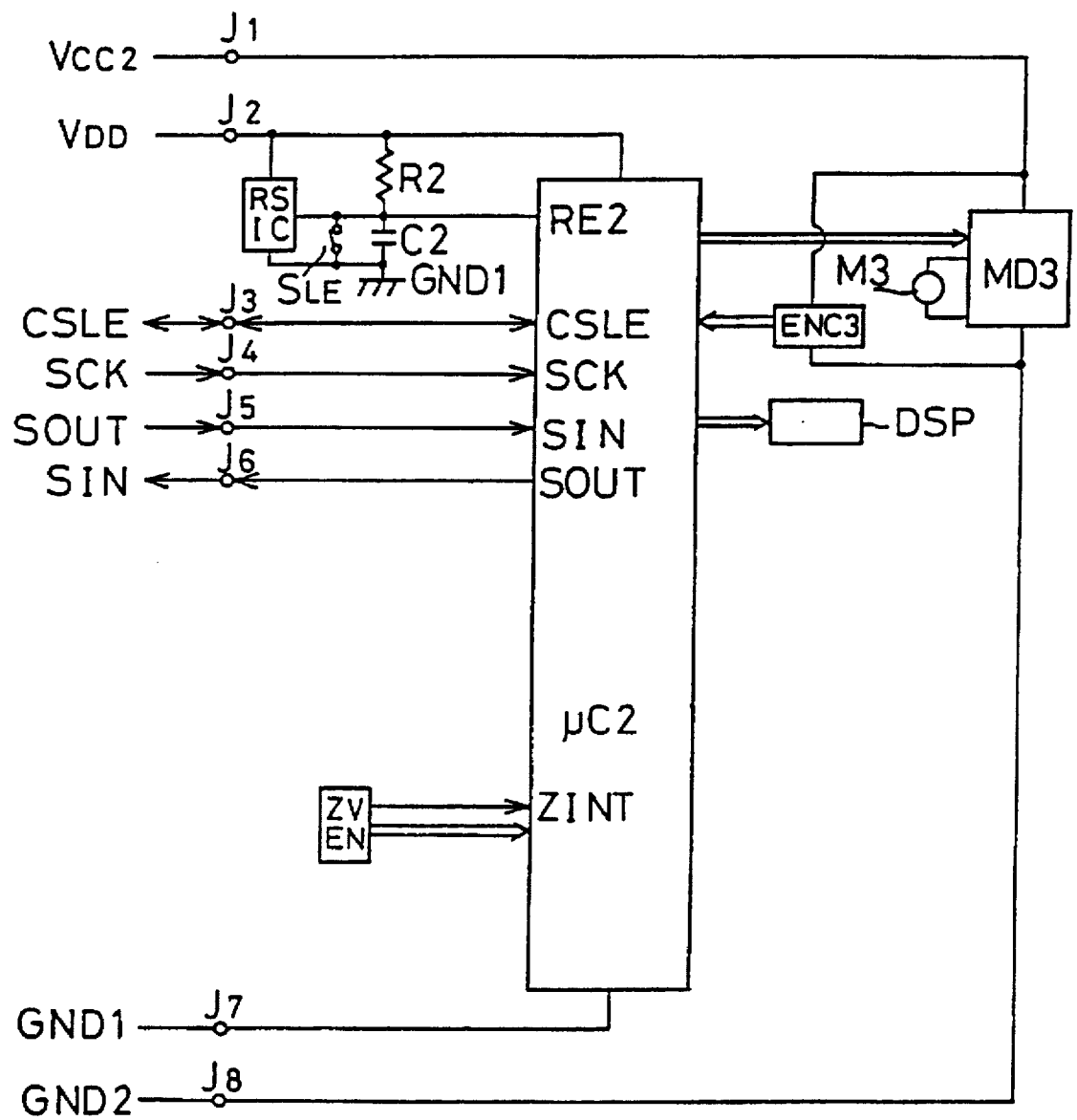
FIG. 4 is a circuit diagram of an in-lens circuit built in the interchangeable lens.

Next, the in-lens circuit will be described referring to FIG. 4. FIG. 4 is a circuit diagram of the in-lens circuit $LE_{CT}$ incorporated in the interchangeable lens LE. In the figure, μC2 is a microcomputer incorporated in the interchangeable lens LE (hereinafter referred to as an in-lens microcomputer) for controlling the zoom motor incorporated in the interchangeable lens LE, a data communication with the in-body microcomputer μC1 and a mode setting.

Here, the terminals $J_1$ to $J_8$ connected to the camera body BD will be described. $J_1$ is a power terminal for supplying the power voltage $V_{CC2}$ for driving the zoom motor from the camera body side to the lens side. $J_2$ is a power terminal for supplying the power voltage $V_{DD}$, to be used except for the zoom motor drive, from the camera body side to the lens side. $J_3$ is a terminal for inputting and outputting a signal representing data communication request. $J_4$ is a clock terminal for inputting a clock for data communication from the camera body side. $J_5$ is a serial input terminal for inputting data from the camera body side, and $J_6$ is a serial output terminal for outputting data to the camera body side. $J_7$ is a ground terminal for circuits other than a circuit for driving a motor, and $J_8$ is a ground terminal for a circuit for driving a motor.

A signal line on the terminal CSLE, by which signals are transmitted between the interchangeable lens LE and the camera body BD through the terminals $J_3$ and $J_{13}$ is a two-way signal line. When a signal is transmitted from the in-body microcomputer μC1 to the in-lens microcomputer μC2 through the above signal line, an interrupt is applied to the in-lens microcomputer μC2, so that the interchangeable lens LE is selected as the partner of the data communication with the camera body BD as well as an operation of the in-lens microcomputer μC2 is started. On the contrary, when a signal is transmitted from the in-lens microcomputer μC2 to the in-body microcomputer μC1 through the above signal line, an interrupt signal is inputted into a lens interrupt terminal LEINT of the in-body microcomputer μC1 by the pulse generator PG2 (see FIG. 3), so that an operation of the in-body microcomputer μC1 is started. The in-body microcomputer μC1 is designed to inhibit an interrupt LEINT when data are transmitted from the in-body microcomputer μC1 to the in-lens microcomputer μC2.

RSIC represents a reset IC (integrated circuit) for resetting the in-lens microcomputer μC2 when the voltage $V_{DD}$ supplied by the camera body BD becomes lower than the normal operation voltage of the in-lens microcomputer μC2. R2 and C2 represent a reset register and a reset condenser, respectively, for resetting the in-lens microcomputer μC2.

RE2 represents a reset terminal for resetting the in-lens microcomputer μC2. When the voltage $V_{DD}$ for driving the in-lens microcomputer μC2 is supplied to the reset terminal RE2 by the camera body BD and the level of the terminal RE is changed from low to high by the resistance R2 and the condenser μC2, the in-lens microcomputer μC2 is reset.

ZVEN represents a zoom speed encoder which interlocks with the above-described operation ring (zoom ring) 80. The zoom speed encoder ZVEN sets the speed and direction of the power zoom operation.

M3 represents a zoom motor for driving a zoom lens unit. A focal length can continuously be changed by the zoom motor M3 without an image point being changed by a movement of the zoom lens unit.

MD3 represents a motor drive circuit for driving the zoom motor M3. The motor drive circuit MD3 controls the rotation of the zoom motor M3 according to a control signal representing a motor drive direction and speed given by the in-lens microcomputer μC2. It also performs a short-circuiting between two terminals of the zoom motor M3 and stops applying a voltage to the zoom motor M3 according to a motor stop signal and a motor halt signal given by the in-lens microcomputer μC2.

ENC3 represents an encoder for detecting a rotation amount of the zoom motor M3. It is also used for detecting a focal length.

DSP represents an in-lens display control circuit for displaying data from the in-lens microcomputer μC2 on the lens display portion 28.

$S_{LE}$ represents a lens attachment detection switch which is turned off when the interchangeable lens LE is mounted and locked on the camera body BD. That is, when the interchangeable lens LE is dismounted from the camera body BD, the switch $S_{LE}$ is turned on to short both of the terminals of the condenser C2. Thereby, the electric charge stored in the condenser C2 is discharged, so that the level of the terminal RE2 of the in-lens microcomputer μC2 becomes low. When the interchangeable lens LE is thereafter attached to the camera body BD, the switch $S_{LE}$ is turned off and the condenser μC2 is charged by the power $V_{DD}$. And after a predetermined period of time determined by the resistance R2 and the condenser μC2, the level of the terminal RE2 becomes high, so that the in-lens microcomputer μC2 is reset as described above.

Completing the description of the hardware employed for the present invention, the software employed for the present embodiment will hereinafter be described.

First, operation sequences in the wide view mode and in the auto wide mode, which are the important features of the present embodiment, will be described referring to FIGS. 6 to 9.

Figure 8A:
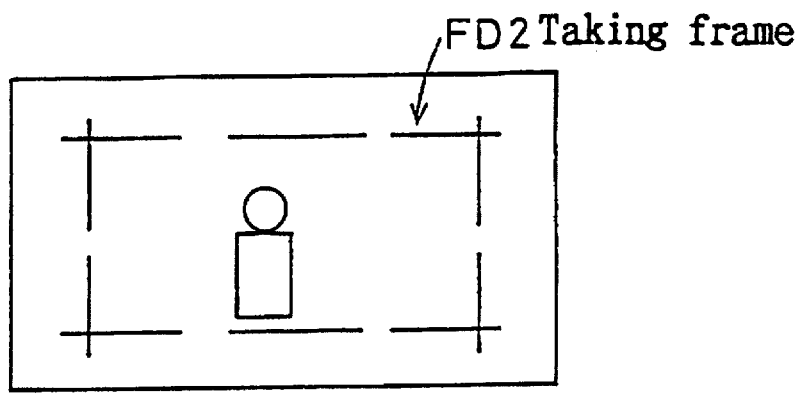
FIGS. 8A and 8B show views through the finder in the wide view mode.
Figure 8B:
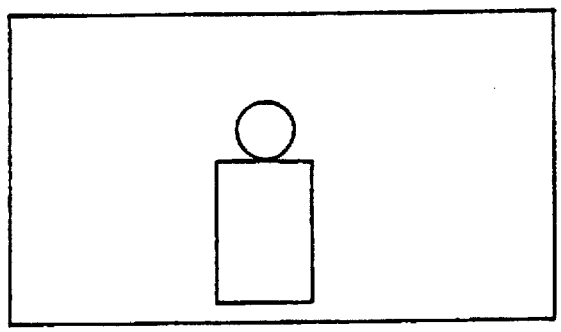

FIG. 6 is a sequence chart of the operation in the wide view mode. FIGS. 8A and 8B show an image in the finder in the wide view mode. A sequence chart is a chart showing operation sequences, of a camera body and a lens, of a camera system as well as data communication between the camera body and the lens so that a relation and a timing for each operation are easily understood. The data communications will be described later as lens data communications in the description of each communication mode.

In FIG. 6, after the main switch $S_M$ is turned on, when the wide view switch $S_{WV}$ is turned on, the wide view mode is set, where the taking frame shown in FIG. 8A is displayed in the finder. If the preparation switch S1 and the release switch S2 are simultaneously turned on considering the case where a release is performed for the shortest period of time as a sequence, first, a focus detection and a photometry are performed. Then, a target focal length $f_t$ which is 1.4 times the present focal length $f_n$ is set for zooming up (in this embodiment, the finder field rate is 140%). Next, the taking frame FD2 is erased, and the target focal length $f_t$ is transmitted to the in-lens microcomputer μC2 (a communication #C of Mode IX). The in-lens microcomputer μC2 having received the target focal length starts a zooming operation, which is continued until the target focal length $f_t$ is realized (see FIG. 8B). At this time, the in-body microcomputer μC1 receives data on the condition of the interchangeable lens LE at regular intervals, and waits for a signal indicating that the zooming operation is completed to be inputted (communications #d and #d' of Mode III). After the data indicating the completion of the zooming operation is inputted, a communication #a of Mode, IV where data on a timing for a start of the charge integration (hereinafter referred to as a CCD integration or an integration) at a CCD for a focus detection, is performed to start the CCD integration. After the CCD integration, the data dump is performed. At the time of completion of the data dump, lens data changed in the zooming operation are received by the in-body microcomputer μC1 (a communication #b of Mode VI), and the in-body microcomputer μC1 performs, a focus detection calculation and photometry calculation based on the lens data. The lens data changed in the zooming operation (the concrete content of the data will be described later) may be received from the lens side after the completion of the zooming operation and before the CCD integration. To improve an accuracy of the focus detection and photometry, they are re-performed after the completion of the zooming operation. After the focus detection and re-photometry, the AF lens unit is moved by the amount corresponding to a defocus amount detected by the focus detection. In a release operation, a mirror-up operation is performed for the exposure while the AF lens unit is being moved. After five seconds have passed since the preparation switch S1 and the release switch S2 were turned off, the wide view mode is again set and the taking frame FD2 is displayed. During the five seconds, the in-body microcomputer μC1 is under the sleep condition. The period when the in-body microcomputer μC1 is under the sleep condition is not necessarily five seconds. The wide view mode is not set during five seconds after the preparation switch S1 and the release switch S2 are turned off in order to prevent a zooming up operation from continuing in a time laps shooting of one scene.

Next, the operation sequences of the auto wide mode will be described referring to FIGS. 7 and 9. FIG. 7 is a sequence chart of an operation of the auto wide mode. FIGS. 9A and 9B show an image in the finder in the auto wide mode. In FIGS. 9A and 9B, a to d are focus detection areas. A focus detection can be performed with respect to an object situated in the focus detection areas a to d. Then, a multipoint algorithm is executed for determining which of the focus detection values of the focus detection areas a to d is selected for focusing.

The sequence shown in FIG. 7 starts at the time of completion of the low contrast scanning. After the low contrast scanning is completed, the target focal length $f_t$ is obtained from the present focal length $f_n$. It is preferable to set the target focal length $f_t$ to be a value which does not give a user an incompatibility in a zooming operation. In this embodiment, it is set to be a value which is 0.5 times the present focal length $f_n$. After the target focal length $f_t$ is obtained, the data on a timing for a start of the CCD integration and the obtained target focal length $f_t$ are transmitted to the in-lens microcomputer µC2 in a communication #a' of Mode V. Receiving the target focal length $f_t$, the in-lens microcomputer µC2 performs a zooming operation until the target focal length $f_t$ is realized. At that time, the in-body microcomputer µC1 starts the CCD integration to perform a focus detection in a zooming operation, and at the time of completion of the data dump after the CCD integration, receives lens data calculated by the in-lens microcomputer µC2 at a timing for a start of the CCD integration (the communication #b of Mode VI). A focus detection and photometry calculations are performed by the in-body microcomputer µC1 by use of the lens data. When the contrast is low in the focus detection, the communication #a' of Mode V, the CCD integration, the data dump, the communication #b of Mode VI, the focus detection and photometry calculations and a check of the completion of a zooming operation are repeated in the above order.

Now, a case where a focal point can be detected in the above-described zooming operation will be considered. In this case, when a contrast sufficient for detecting a focal point is obtained, data representing a zoom stop is transmitted from the in-body microcomputer µC1 to the in-lens microcomputer µC2 (a communication #e of Mode II). Receiving the data representing the zoom stop, the in-lens microcomputer µC2 brakes and stops the zoom lens unit. At this time, the in-body microcomputer µC1 repeats the communications #d and #d' of Mode where data on a lens condition is received to detect if the zoom lens unit is stopped. After the stop of the zoom lens unit is confirmed, the AF lens unit is moved to adjust the focus. In the sequence chart shown in FIG. 7, after the communication #d', where the zoom lens unit is confirmed to be stopped, is completed, the AF lens unit is moved to adjust the focus according to a focus detection value (a drive pulse count of the AF lens unit) obtained by the focus detection in a zooming operation. However, when the accuracy of the focus detection is low, it is possible to move the AF lens unit by use of a focus detection value obtained by the next focus detection (including the communications #a and #b of Modes IV and VI).

Next, a case where a focal point cannot be detected in the above-described zooming operation, which is not shown in FIG. 7, will be considered. In this case, since the data transmitted in the communication #b of Mode includes data on a condition of the zoom lens unit, a drive condition of the zoom lens unit is confirmed in the process in the auto wide mode which is set after a photometry calculation. When the zoom lens unit is confirmed to be stopped, it is determined to be impossible to detect a focal point even if a zooming operation is continued until the target focal length $f_t$ is realized, so that a focus detection in the auto wide mode is canceled.

Next, a detailed description of operations of the present embodiment will be given by describing the software of the in-body microcomputer µC1 and that of in-lens microcomputer µC2. The content of the lens communications in the following description is shown in Table 1; the lens condition data transmitted from the in-lens microcomputer µC2 to the in-body microcomputer µC1, in Table 2; and the body condition data transmitted from the in-body microcomputer µC1 to the in-lens microcomputer µC2, in Table 3. The control flags and variables used in the flow charts in the following description are shown in Tables 4 and 5, respectively.

First, the software of the in-body microcomputer µC1 will be described.

When the battery E1 is attached to the camera body BD, the battery attachment detection switch $S_{RE1}$ is turned off in the circuit of the camera body shown in FIG. 3. Consequently, the reset condenser µC1 is charged through a resistance R1, and a reset signal representing a change of a level from low to high is inputted into the reset terminal RE1 of the in-body microcomputer µC1 which controls the entire camera system. By the input of the reset signal, the in-body microcomputer µC1 activates the DC/DC converter DD as well as starts to generate a clock by the hardware provided in the in-body microcomputer µC1. Thereby, the in-body microcomputer µC1 is supplied with the power voltage $V_{DD}$ to execute a routine RESET shown in FIG. 10. Under the sleep condition (to be described later), where the clock generation by the in-body microcomputer µC1 and the operation of the DC/DC converter DD are stopped, the in-body microcomputer µC1 starts the clock generation and activates the DC/DC converter DD by means of the inside hardware provided in the in-body microcomputer µC1 by an interrupt in the same manner as that when the battery E1 is attached.

Figure 10:
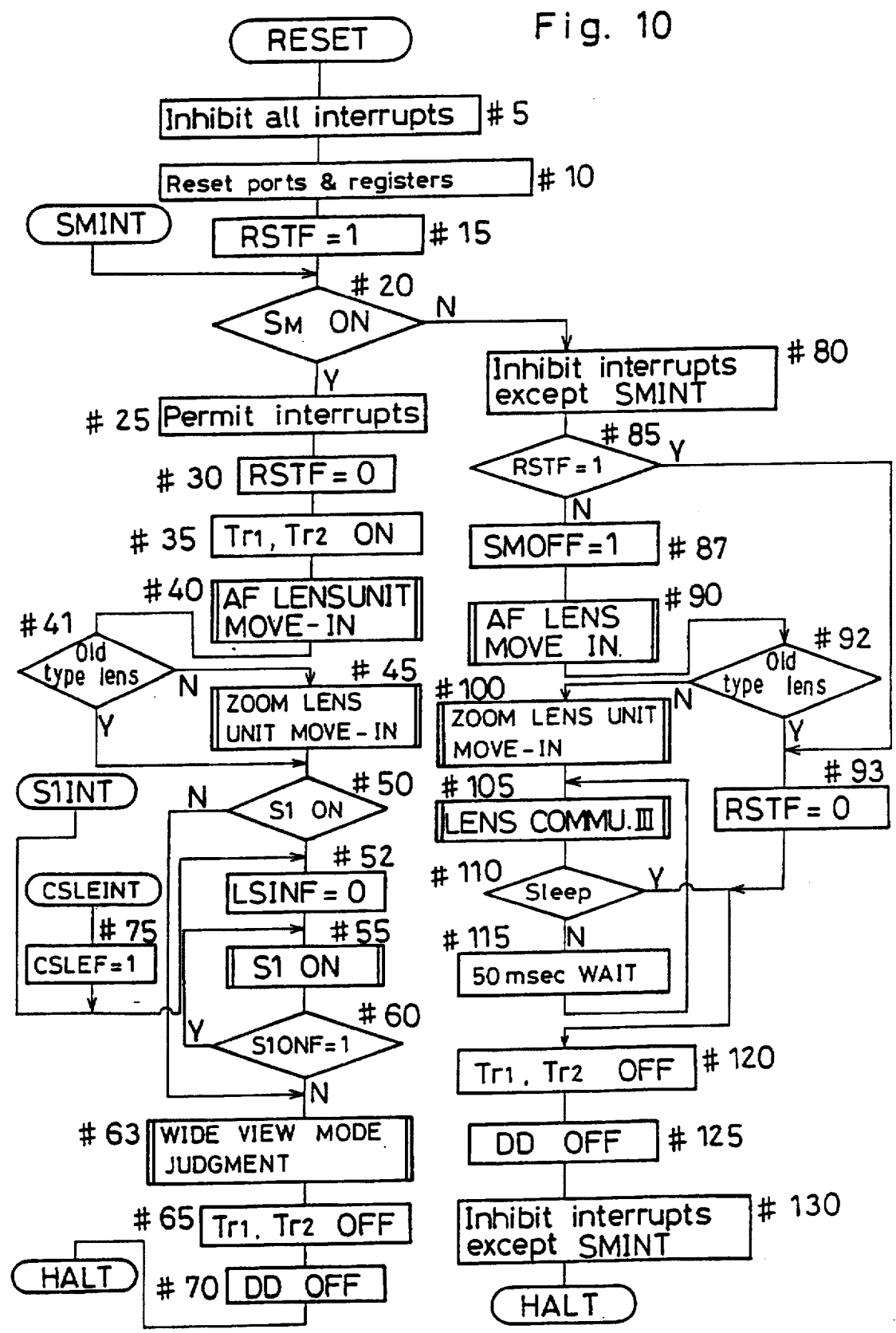
FIG. 10 is a flow chart showing a routine RESET of an in-body microcomputer μC1 of the camera system.

In the routine RESET shown in FIG. 10, first, all the interrupts are inhibited, various kinds of ports and registers are reset, and a flag RSTF showing that the process has passed the routine RESET is set (steps #5 to #15). Then, whether or not the main switch $S_M$ is ON is determined at step #20. When the main switch $S_M$ is turned from on to off or from off to on, an interrupt SMINT is executed by the operation of the main switch $S_M$, and the routine RESET is started at step #20. When the main switch $S_M$ is ON at step #20, all the interrupts are permitted, the flag RSTF showing that the process has passed the routine RESET is reset, and the levels of the output ports PW1 and PW2, which are power control terminals, are changed to high to turn on the transistors Tr1 and Tr2 for supplying power to each circuit and to the lens (steps #25 and #35).

Next, at step #40, a subroutine AF LENS UNIT MOVE-IN, shown in FIG. 4, is executed. When the subroutine AF LENS UNIT MOVE-IN is called, first, a subroutine LENS COMMUNICATION VII is executed at seep #150.

The lens communication is a communication in Mode VII where data from a new-type lens (hereinafter referred to as new lens) described in this embodiment is inputted. The new lens is a lens system having a zoom motor M3 for changing a focal length and an in-lens microcomputer µC2 and for transmitting a larger amount of data to a camera body than those transmitted by an old-type lens.

Figure 36:
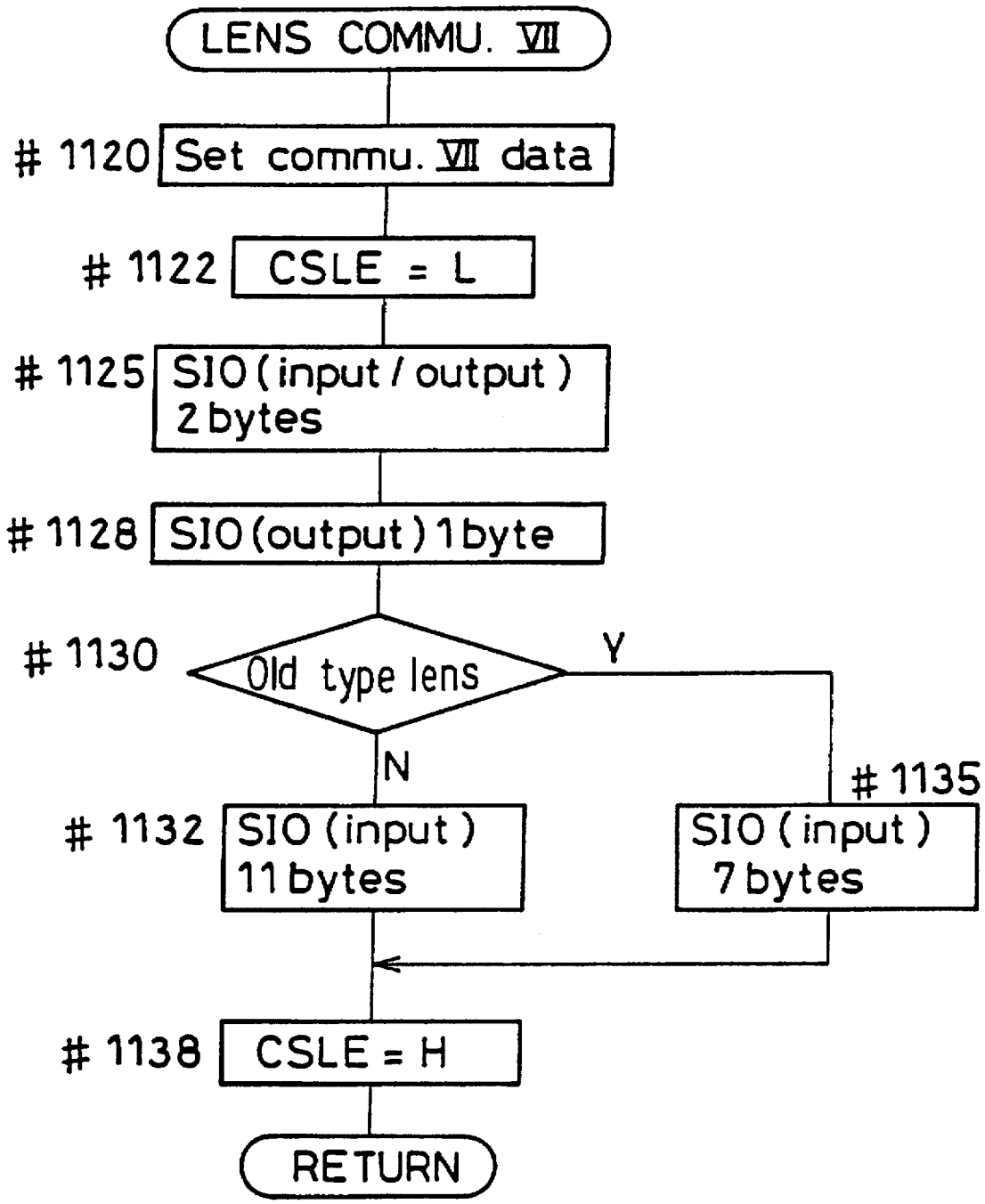

The subroutine LENS COMMUNICATION VII is shown in FIG. 36. When the subroutine LENS COMMUNICATION VII is called, first, data showing that the communication mode is Mode VII is set, the level of the terminal CSLE is changed to low, and the in-lens microcomputer µC2 is notified that a communication will be performed (steps #1120 and #1122). Then at step #1125, a two-byte serial communication (serial input/output) is performed. In the serial communication, the in-body microcomputer µC1 and the in-lens microcomputer µC2 simultaneously receive data transmitted from the other in a serial manner while serially transmitting data to the other. At the first byte, the data on the type of the camera body are outputted by the in-body microcomputer μC1. At this time, meaningless data $FF_H$ (the subscript $_H$ represents a hexadecimal number) are outputted by the in-lens microcomputer μC2, and the in-lens microcomputer μC2 and the in-body microcomputer μC1 respectively input the data transmitted from the other. At the second byte, the data on the type of the lens are outputted by the in-lens microcomputer μC2. At this time, meaningless data $FF_H$ are outputted by the in-body microcomputer μC1, and the in-lens microcomputer μC2 and the in-body microcomputer μC1 respectively input the data transmitted from the other. Then, to indicate that the communication mode with the lens is Mode VII, one byte of the data of the communication mode which is set as described above are serially outputted to the in-lens microcomputer μC2. The process of the in-body microcomputer μC1 waits for a while, and at step #1130, whether or not the lens is of old type is determined. As a result of the determination, when the lens is of old type, seven-byte data are inputted by the in-lens microcomputer μC2, the level of the terminal CSLE is changed to high, and the process returns (steps #1135 and #1138). When the lens is of new type, 11-byte data are inputted by the in-lens microcomputer μC2, the level of the terminal CSLE is changed to high, and the process returns (steps #1132 and #1138). The level of the terminal CSLE is changed to high before the process returns to notify the in-lens microcomputer μC2 of the completion of the subroutine LENS COMMUNICATION VII. The same process is executed in other communication modes.

Now, the content of the communication data transmitted between the in-body microcomputer μC1 and the in-lens microcomputer μC2 will be described referring to Table 1.

In the lens communication with the old lens (not shown), data particular to the lens are transmitted to the in-body microcomputer μC1. The following are the content of the data:

(i) an open aperture value $AV_o$;

(ii) a maximum aperture value $AV_{MAX}$;

(iii) a converting coefficient $K_L$ for converting a defocus amount into a driving amount (hereinafter referred to as a drive amount converting coefficient);

(iv) a present focal length $f_n$;

(v) a lens mount signal $L_{ON}$;

(vi) a converting coefficient $K_N$ for converting a lens move-out amount into a distance (hereinafter referred to as a distance converting coefficient); and (vii) a difference ΔSB between a film surface and an AF sensor surface.

On the other hand, in the lens communication with the new lens, there are communications of Modes I to IX. The lens communications of these Modes I to IX are called lens communications I to IX, respectively. The lens communication of each Mode will hereinafter be described. In the following description, "lens data" is a general term for the data transmitted from the in-lens microcomputer μC2 to the in-body microcomputer μC1; "lens condition data", for the data, shown in Table 2, on a drive condition of the lens; and "body condition data", for the data, shown in Table 3, on an operation condition of the camera body and on the commands for controlling the lens.

In the lens communication I, data on a lens move-in mode are transmitted from the in-body microcomputer μC1 to the in-lens microcomputer μC2.

In the lens communication II, data on a zoom stop (body condition data) are transmitted from the in-body microcomputer μC1 to the in-lens microcomputer μC2.

In the lens communication III, data on a lens condition (see Table 2) are transmitted from the in-lens microcomputer μC2 to the in-body microcomputer μC1.

In the lens communication IV, data on a starting timing for the CCD integration (body condition data) are transmitted from the in-body microcomputer μC1 to the in-lens microcomputer μC2. Immediately after the lens communication IV, the in-lens microcomputer μC2 starts to calculate the lens data with respect to the present focal length (data changed as the focal length is changed).

In the lens communication V, data on a starting timing for the CCD integration (body condition data) and (x) a target focal length $f_t$ are transmitted from the in-body microcomputer μC1 to the in-lens microcomputer μC2.

In the lens communication, the lens condition data and data calculated at the time of the lens communication IV or V which is performed before the lens communication VI and changed in accordance with the focal length are transmitted from the in-lens microcomputer μC2 to the in-body microcomputer μC1. The following are the latter data:

(iii) a drive amount converting coefficient $K_L$;

(iv) a present focal length $f_n$;

(vi) a distance converting coefficient $K_N$; and (vii) a difference ΔSB between a film surface and an AF sensor surface.

In the lens communication VII, all of the data particular to the lens are transmitted from the in-lens microcomputer μC2 to the in-body microcomputer μC1. The content of the data are the lens condition data and the following:

(i) an open aperture value $AV_o$;

(ii) a maximum aperture value $AV_{MAX}$;

(iii) a drive amount converting coefficient $K_L$;

(iv) a present focal length $f_n$;

(v) a lens mount signal $L_{ON}$;

(vi) a distance converting coefficient $K_N$;

(vii) a difference ΔSB between a film surface and an AF sensor surface;

(viii) a minimum focal length $f_{min}$; and (ix) a maximum focal length $f_{max}$.

In the lens communication VIII, data on a permission of the power zoom (body condition data) are transmitted from the in-body microcomputer μC1 to the in-lens microcomputer μC2.

In the lens communication IX, the body condition data and (x) a target focal length $f_t$ are transmitted from the in-body microcomputer μC1 to the in-lens microcomputer μC2.

Each of the above-described data (i) to (x) are transmitted as one-byte data; the body condition data and the lens condition data, as two-byte data.

If the lens communication VI, where the Lens data (data changed as the focal length is changed) are received, is performed after the lens communications IV and V, where the data on a starting timing for the CCD integration are transmitted, are performed to conduct the CCD integration and data dump, it becomes possible for the in-lens microcomputer μC2 to calculate the lens data while the CCD integration and data dump are being conducted. This reduces a waiting time for waiting a completion of the calculation of the lens data, so that the time required for focus detection is decreased.

Figure 11:
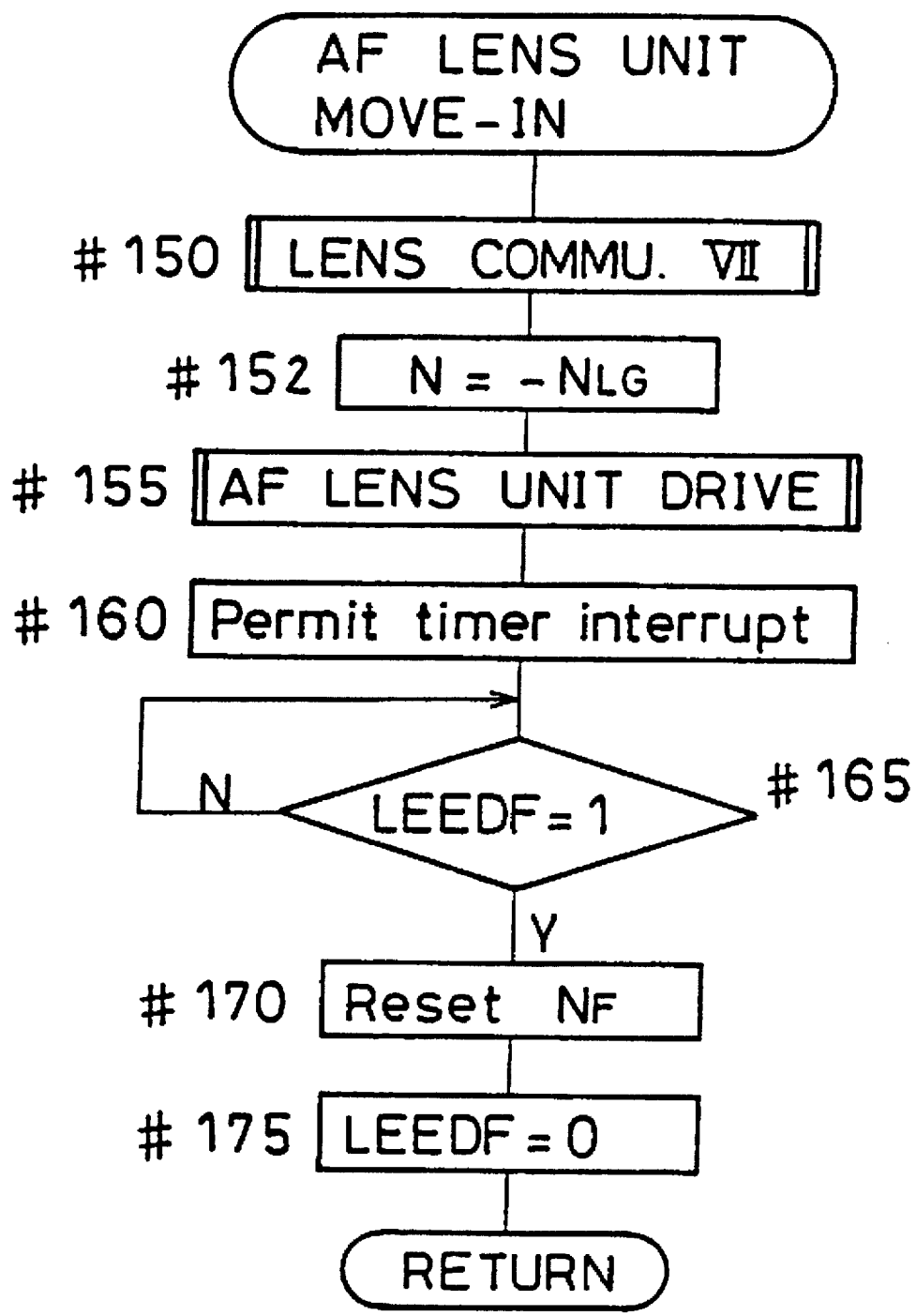

Returning to the flow chart shown in FIG. 11, the description will be continued from step #152. At step #152, the value of a counter N showing a drive amount of the AF lens unit for focusing is set to $-N_{LO}$ (a negative value having a large absolute value, and whether the first bit thereof is 0 or 1 indicates whether the value is positive or negative). At step #155, a subroutine AF LENS UNIT DRIVE is executed.

Now, a module for driving the AF lens unit (not shown) will be described. The lens drive module controls the driving of the AF lens unit in response to an counter interrupt and a timer interrupt. The counter interrupt is executed when a pulse representing the driving of the AF lens unit is inputted by the encoder ENC (see FIG. 3), while the timer interrupt is executed when the next counter interrupt is not executed within a predetermined period of time after the counter interrupt is executed. Based on the timer interrupt, it is determined that the lens unit has reached infinity or the nearest position. Also, the module sets a lens drive flag LMVF before the lens drive, resets it by use of the counter or timer interrupts after the lens drive is completed, and causes the process to return.

Returning to the flow chart shown in FIG. 11, the timer interrupt is permitted at step #160. At the next step #165, the process waits for a flag LEEDF, showing that the lens unit has reached infinity or the nearest position, to be set. When the flag LEEDF is set, it is assumed that the lens reached infinity, and a counter for counting a move-out amount $N_F$ of the lens unit from infinity is reset, the above flag LEEDF is reset, and the process returns (steps #170 and #175).

Figure 12:
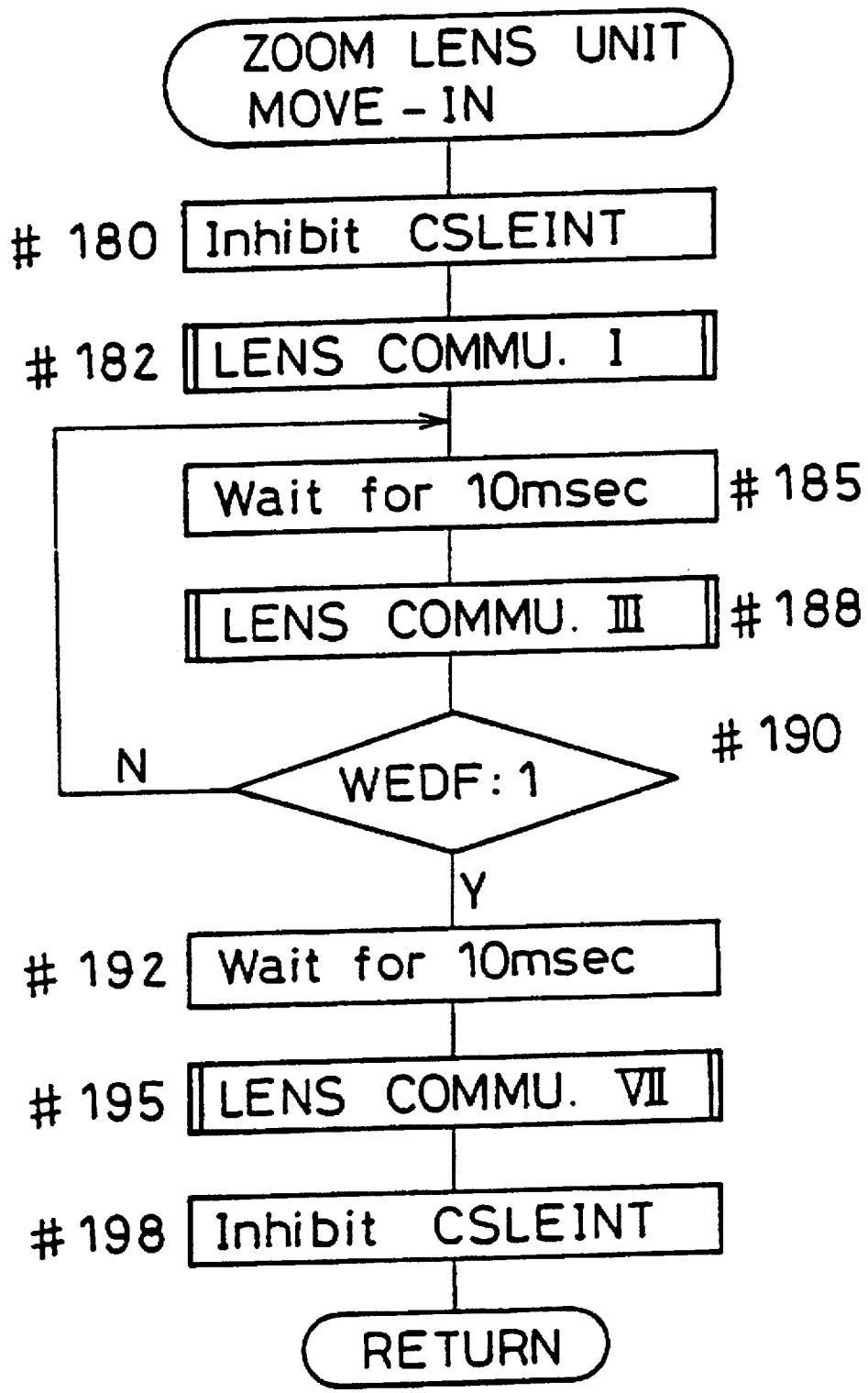

Returning to the flow chart shown in FIG. 10, the description will be continued from step #41. At step #41, whether or not the lens is of old type is determined. When it is not of old type, the process proceeds to step #45, where a subroutine ZOOM LENS UNIT MOVE-IN is executed. The subroutine ZOOM LENS UNIT MOVE-IN is shown in FIG. 12. When the subroutine ZOOM LENS UNIT MOVE-IN is called, firstly, an interrupt CSLEINT by a lens selecting signal CSLE, produced by the lens, is inhibited, a subroutine LENS COMMUNICATION I is executed, and the data showing the zoom lens unit move-in mode are outputted (steps #180 and #182). Secondly, the lens communication III, where a lens condition is examined every 10 msec, is repeated. When a flag WEDF, showing the shortest focal length condition, is set, it is determined that the lens move-in is completed (steps #185 to #190). Lastly, after 10 msec, the lens communication VII is performed to input all the lens data, a request for an interrupt CSLEINT of the lens is permitted, and the process returns (steps #192 to #198).

Now, subroutines LENS COMMUNICATION I and LENS COMMUNICATION III will be described.

Figure 30:
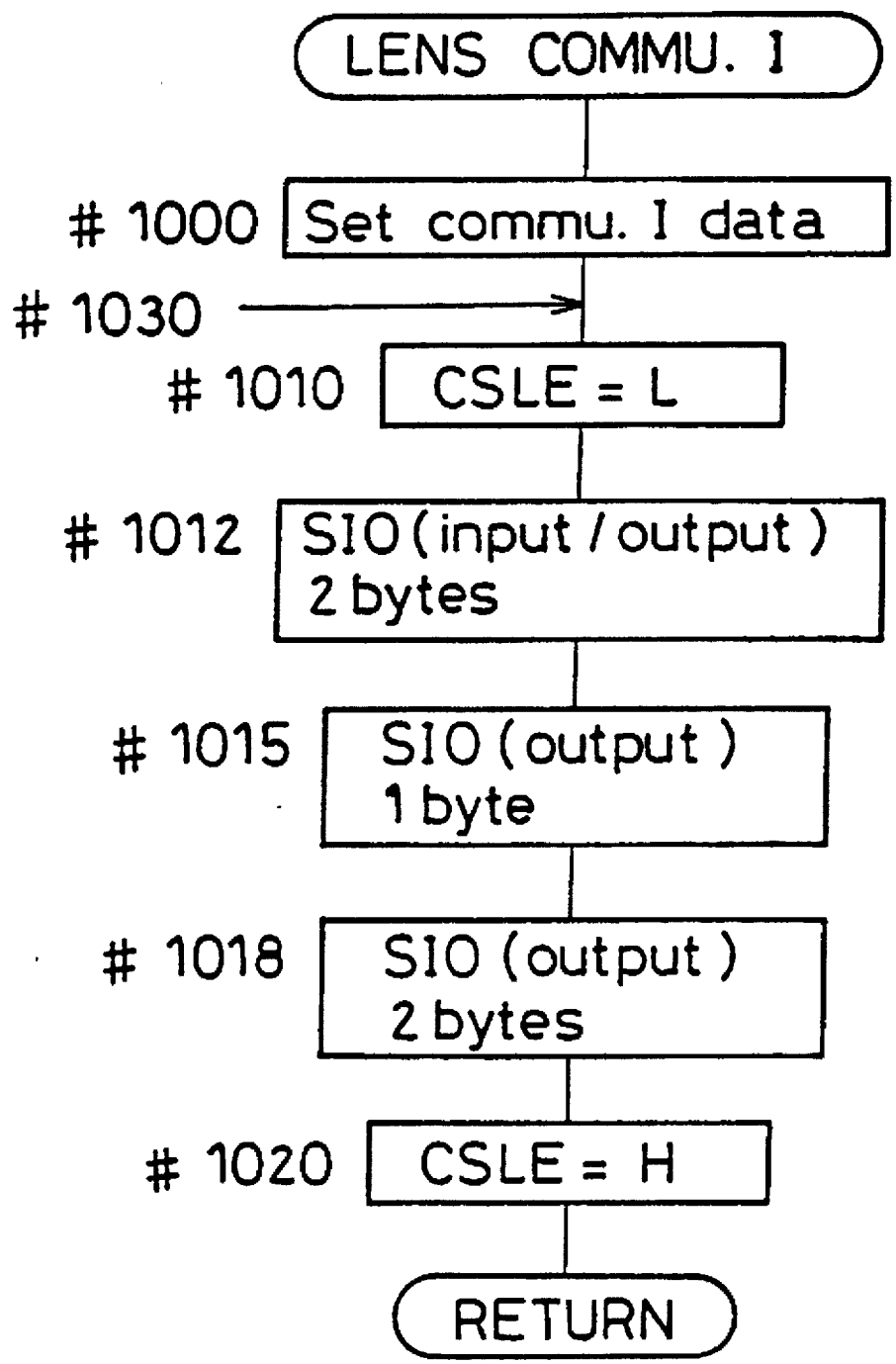
FIGS. 30 to 38 are flow charts showing subroutines LENS COMMUNICATIONS I to IX, respectively.
Figure 31:
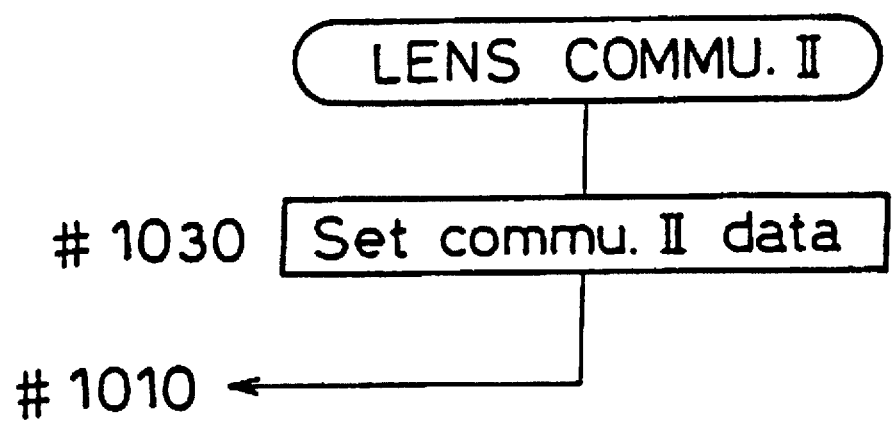

First, the subroutine LENS COMMUNICATION I shown in FIG. 30 will be described. When the subroutine LENS COMMUNICATION I is called, the data, showing that the communication mode is Mode I, is set, the level of the terminal CSLE is changed to low, and a two-byte serial data communication (serial input/output) is performed to determine the types of the camera body and lens (steps #1000 to #1012). Next, one-byte data are serially inputted to show that the present mode is Mode I. Then, two-byte body condition data, instructing a move-in of the zoom lens unit, are serially outputted to the in-lens microcomputer μC2, the level of the terminal CSLE is changed to high, and the process returns (steps #1015 to to #1020).

Figure 32:
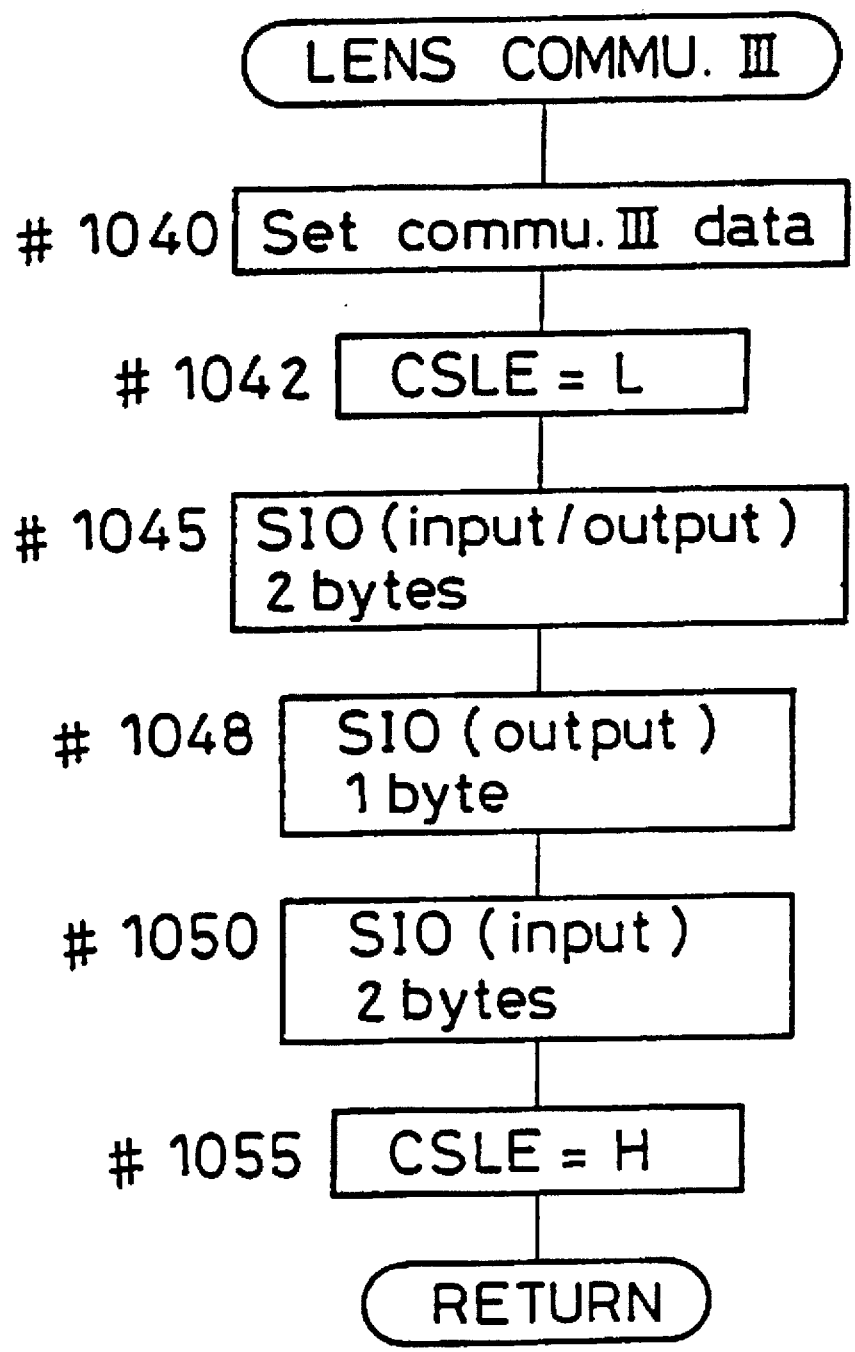

Next, the subroutine LENS COMMUNICATION III shown in FIG. 32 will be described. When the subroutine LENS COMMUNICATION III is called, first, data showing that the present mode is Mode III is set, the level of the terminal CSLE is changed to low, and two-byte serial data communication (serial input/output) is performed to determine the types of the camera body and lens (steps #1040 to #1045). Next, one-byte data are outputted to the in-lens microcomputer μC2 to show that the present mode is Mode III. Then, two-byte data showing a lens condition are inputted, the level of the terminal CSLE is changed to high, and the process returns (steps #1048 to #1055).

Returning to the flow chart shown in FIG. 10, the case where the lens is determined to be of old type at the above-described step #41 will be described. When the lens is determined to be of old type, the process proceeds to step #50, where whether or not the preparation switch S1 is ON is determined. When the preparation switch S1 is not ON, the process proceeds to step #63, where a subroutine, for determining whether or not the present mode is the wide view mode, is executed. After the execution of the step #63, the levels of the power control terminals PW1 and PW2 are changed to low, respectively, to turn off the power transistors Tr1 and Tr2, and the level of the power control terminal PW0 is changed to low to stop the DC/DC converter DD (steps #65 and 70). Then, the process enters the sleep condition (stop condition).

On the other hand, when the preparation switch S1 is determined to be turned on at step #50, the process proceeds to step #52, where a flag for inhibiting the low contrast scanning is reset, and at step #55, a subroutine S1ON (to be described later) is executed. Then, at step #60, whether or not a flag S1ONF has been set is determined. When it has been set, the process returns to step #55. When it has not been set, the process proceeds to step #63. The flag S1ONF is set while the preparation switch S1 is ON or within the five seconds immediately after the switch S1 is turned off.

In an interrupt S1INT which is generated when the preparation switch S1 is turned on after it is once turned off, the processes from step 52 are executed. In the lens interrupt CSLEINT which is generated when an interrupt signal is inputted into the lens interrupt terminal LEINT by the in-lens microcomputer μC2, a flag CSLEF, showing that an interrupt is executed by the in-lens microcomputer μC2, is set at step #75, and the processes from step #52 are executed.

Now, the subroutine WIDE VIEW MODE DETERMINATION, at the above-mentioned step #63, shown in FIG. 13 will be described. When the subroutine WIDE VIEW MODE DETERMINATION is called, whether or not the wide view switch $S_{WV}$, showing whether or not the wide view mode is effective, is ON is determined at step #200. When the wide view switch $S_{WV}$ is not ON, a flag WVF, showing that the wide view mode is effective, is reset, the taking frame FD2 in the finder is erased, and the process returns (steps #220 and #225). Even when the wide view switch $S_{WV}$ is ON, if the 1.4 times the present focal length $f_n$ exceeds the maximum focal length $f_{MAX}$ of the lens, it is impossible to perform a zooming of 1.4×. Therefore, the wide view mode is determine to be ineffective (WVF=0), and the taking frame in the finder is erased (steps #205, #220 and #225). On the other hand, when it is determined that the wide view switch $S_{WV}$ is ON and that $1.4 \times f_N \leq f_{MAX}$, the flag WVF is set to make the wide view mode effective (WVF=1), the taking frame FD2 is displayed in the finder, and the process returns (steps #210 and #215).

Next, the subroutine S1ON of step #55 will be described referring to FIG. 14. When the subroutine S1ON is called, first, a flag S1ONF, showing that the process has passed the subroutine S1ON, is set. Then, the interrupt S1INT is inhibited, the levels of the power terminals PW1 and PW2 are changed to high, respectively, to turn on the power source transistors Tr1 and Tr2, and the above-described subroutine WIDE VIEW MODE DETERMINATION (see FIG. 13) is executed (steps #300 to #308). The subroutine WIDE VIEW MODE DETERMINATION is executed at step #308 every time the process passes the subroutine S1ON in order to cope with the situation where the wide view switch $S_{WV}$ is turned on or off while the preparation switch S1 is ON or within five seconds immediately after the preparation switch is turned off.

After the subroutine WIDE VIEW MODE DETERMINATION at step #308 is completed, whether or not the subroutine S1ON is called by a request for the interrupt CSLEINT of the in-lens microcomputer μC2 is determined by the flag CSLEF (step #310). Then, when the flag CSLEF showing that an interrupt is executed by the in-lens microcomputer μC2 is set, after a subroutine LENS INTERRUPT CONTROL is executed at step #315, the process proceeds to step #332.

Figure 16:
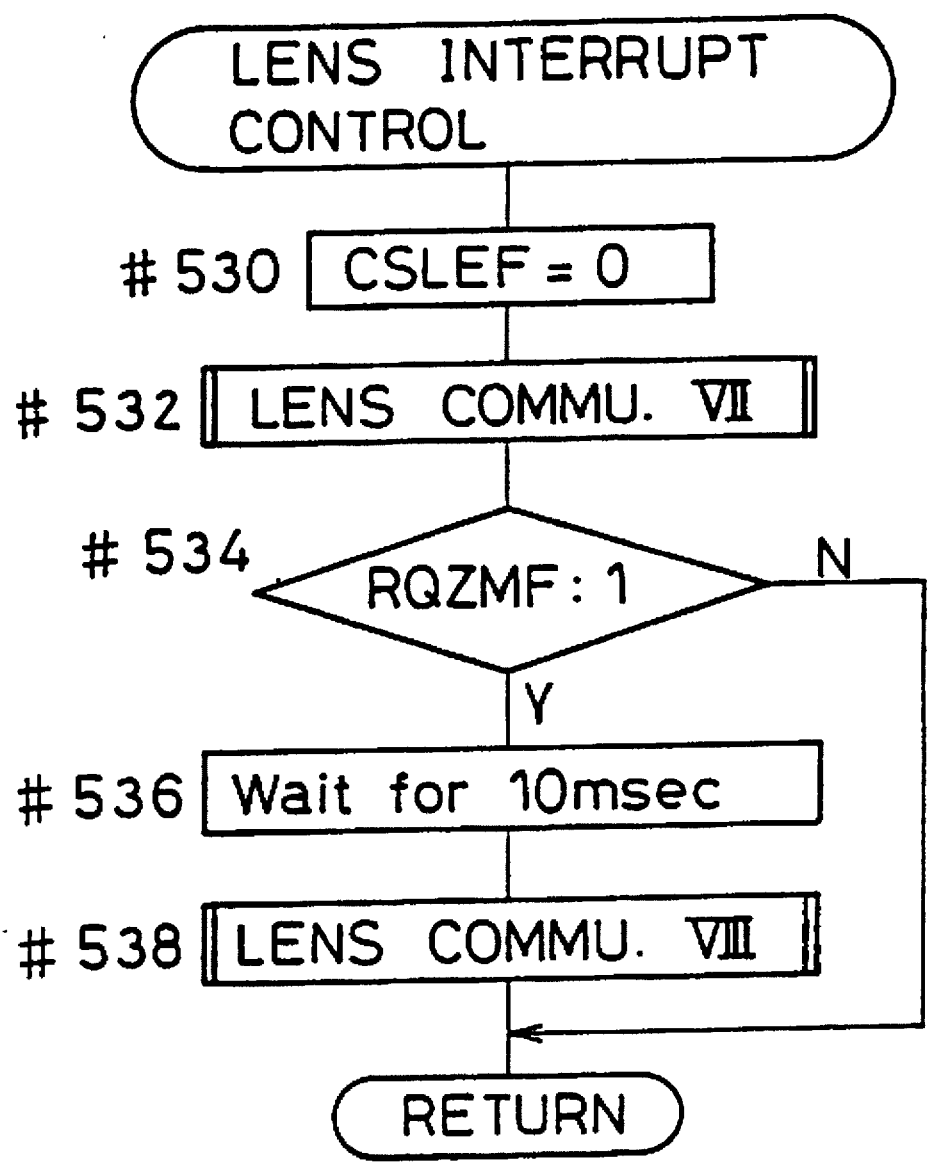
FIG. 16 is a flow chart showing a subroutine LENS INTERRUPT CONTROL for controlling the interrupt from the lens.

Now, the above-mentioned subroutine LENS INTERRUPT CONTROL, where an interrupt by the in-lens microcomputer μC2 is controlled, shown in FIG. 16 will be described. When the subroutine LENS INTERRUPT CONTROL is called, the flag CSLEF, showing that an interrupt is executed by the in-lens microcomputer μC2 is reset, and the lens communication VII is performed to input all the lens data (steps #530 and #532). Then, whether or not a flag RQZMF, included in the lens condition data (shown in Table 2) which are transmitted from the in-lens microcomputer μC2 in the above lens communication VII, has been set is determined. When the flag RQZMF, which shows that the lens requests, to the in-body microcomputer μC1, the permission of the power zoom, has not been set, the process returns. On the other hand, when the flag RQZMF has been set, after the process waits for 10 msec, a subroutine LENS COMMUNICATION VIII where the data on the permission of the power zoom are transmitted to the in-lens microcomputer μC2 is executed, and the process returns (steps #534 to #538).

Figure 37:
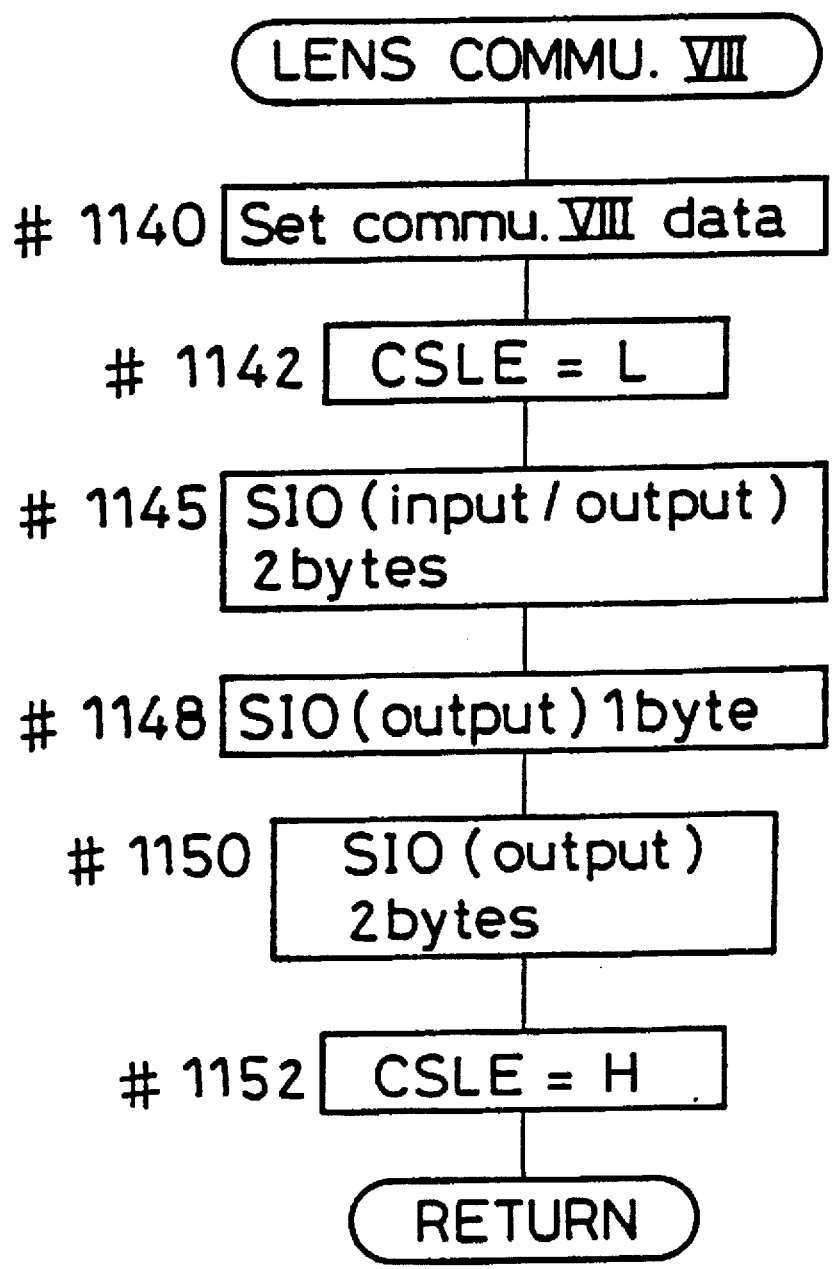

Now, the subroutine LENS COMMUNICATION VIII shown in FIG. 37 will be described. When the subroutine LENS COMMUNICATION VIII is called, first, the data showing that the present mode is Mode VIII is set, the level of the terminal CSLE is changed to low, and a two-byte serial data communication (serial input/output) is performed to determine the types of the camera body and lens (steps #1140 to #1145). Next, one-byte data are serially outputted to the in-lens microcomputer μC2 to show that the present mode is Mode VIII. Then, two-byte body condition data (see Table 3), where a flag MZOKF showing that the power zoom is permitted (power zoom OK) is set, are serially outputted to the in-lens microcomputer μC2, the level of the terminal CSLE is changed to high, and the process returns (steps #1148 to #1152).

Returning to the flow chart shown in FIG. 14, the case where the flag CSLEF is determined not to have been set at the above-mentioned step #310 will be described. When the flag CSLEF has not been set, the process proceeds to step #320, where whether or not the preparation switch S1 is ON is determined. When the preparation switch S1 is not ON, a power zoom operation is being performed, or less than five minutes have passed since the switch S1 was turned off. Therefore, the subroutine LENS COMMUNICATION VIII is executed to input the lens data (step #325), and the process proceeds to step #332. On the other hand, when the preparation switch S1 is determined to be ON at step #320, the camera system is under the preparation condition. Therefore, a subroutine AF CONTROL is executed to move the AF lens unit for the distance calculation and focusing (step #330).

The subroutine AF CONTROL shown in FIG. 15 will be described. When the subroutine AF CONTROL is called, first, a subroutine TRS, where a starting timing for the CCD integration is sent to the in-lens microcomputer μC2 and a target focal length $f_t$ is transmitted to the in-lens microcomputer μC2, is executed (step #450). Since in the subroutine TRS, the in-body microcomputer μC1 exchanges data with the in-lens microcomputer μC2 only when a zooming operation of 1.4× is performed in the auto wide and wide view modes, the process returns, at first, without executing any process. Next, a CCD in the focus detection light receiving circuit $AF_{CT}$ is made to perform an integration (charge accumulation) at step #452. After the integration is completed, the data converted into digital signals are inputted (data dump), and a subroutine RCV where variable data (data changed as the focal length is changed) of the lens is inputted (steps #455 and #460). Provided the data on a starting timing for the CCD integration is not transmitted in the subroutine TRS, the process returns without executing any process. The subroutine RCV as well as the above-mentioned subroutine TRS will be described later with reference to FIGS. 17 and 18.

Figure 19:
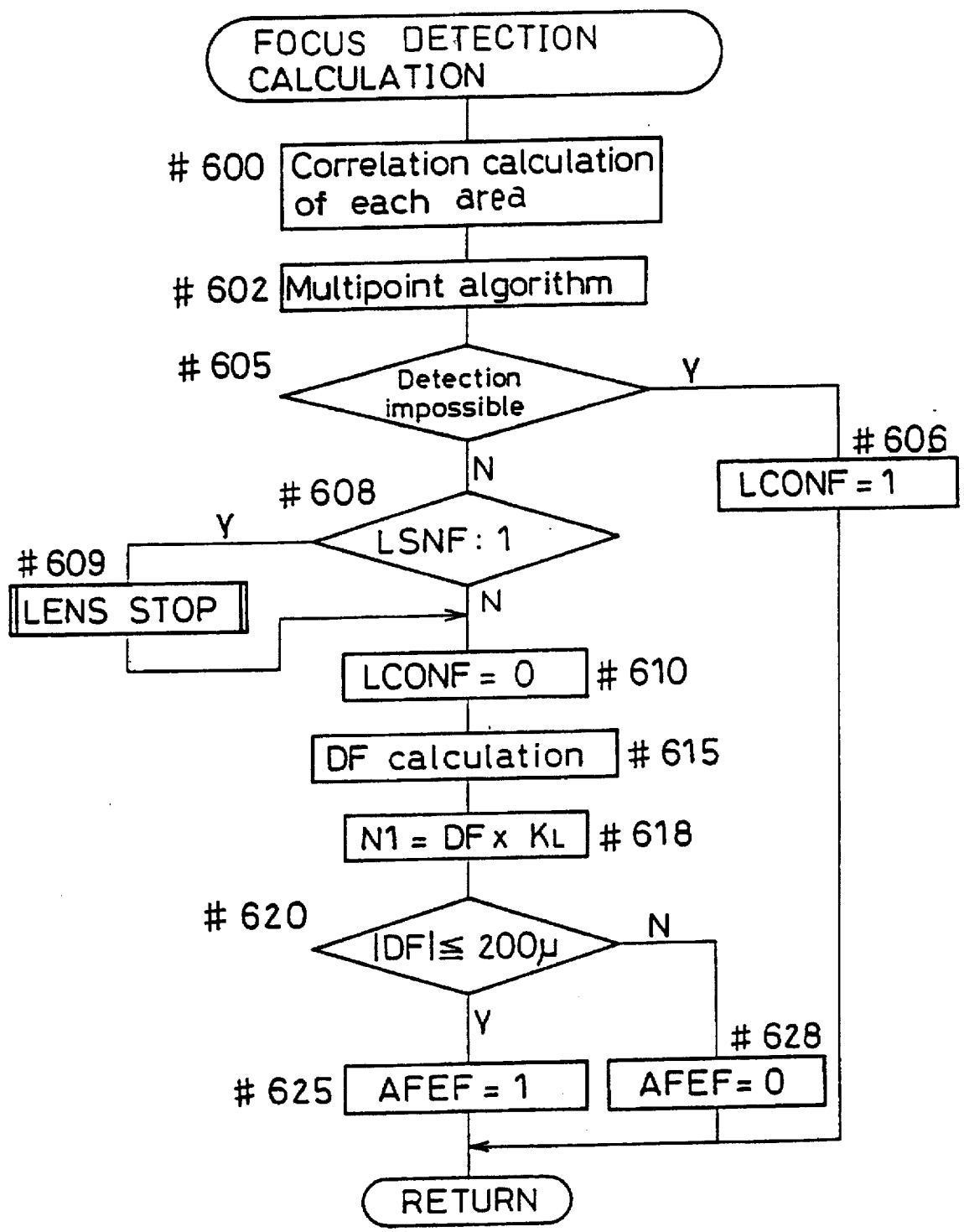

After returning from the subroutine RCV, the process proceeds to step #465, where a focus detection calculation is performed to calculate a defocus amount. The subroutine FOCUS DETECTION CALCULATION shown in FIG. 19 will be described. When the subroutine FOCUS DETECTION CALCULATION is called, first, a correlation among the focus detection areas a to d (see FIG. 9) is calculated. The calculation of the correlation, which is not a subject matter of this embodiment, will not be described in this specification. After the calculation of the correlation is completed, the process proceeds to step #602, where a multipoint algorithm is executed for determining which of the focus detection values of the focus detection areas a to d is employed.

Figure 54:
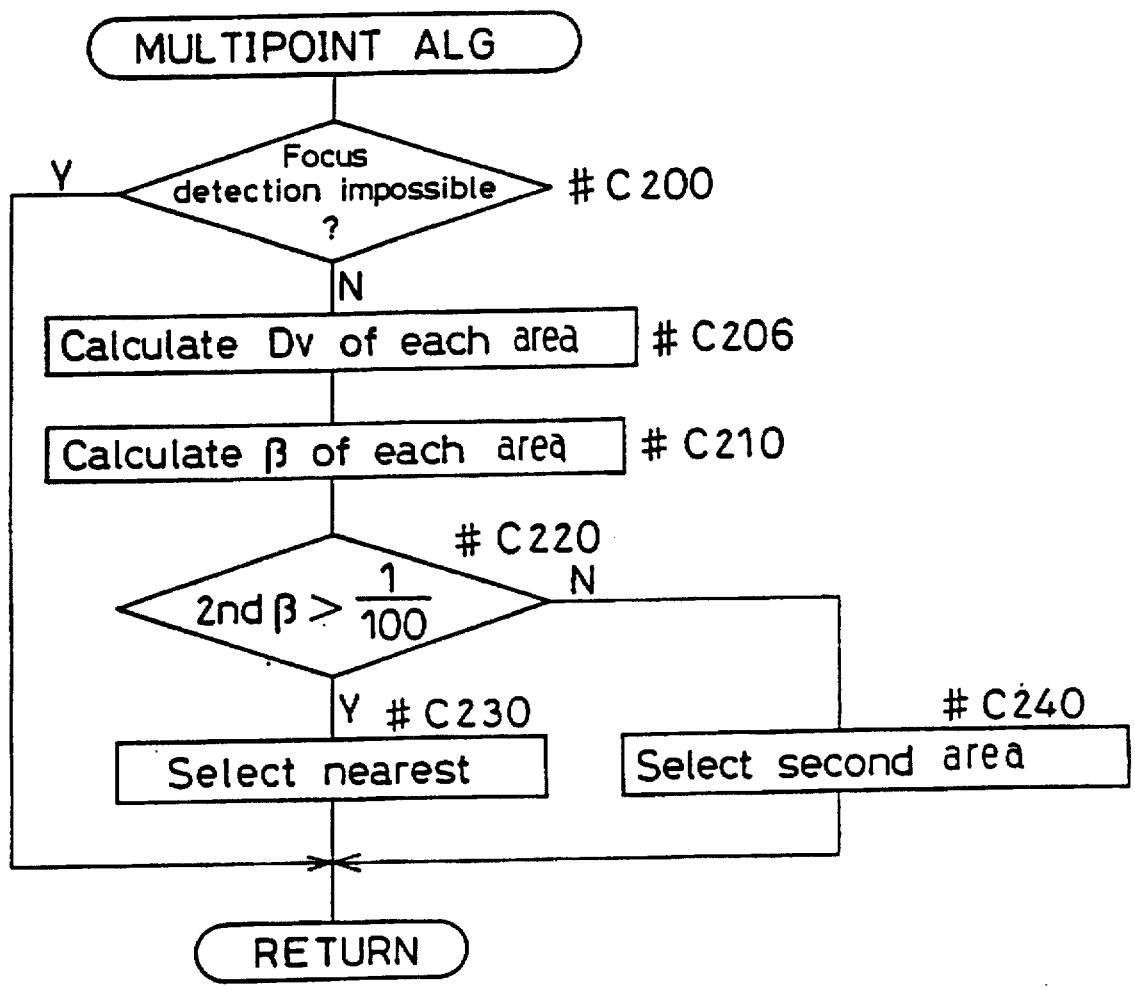
FIG. 54 is a flow chart showing a subroutine MULTI-POINT ALGORITHM.

A subroutine MULTIPOINT ALGORITHM is shown in FIG. 54. The subroutine MULTIPOINT ALGORITHM is a routine for focusing on an optimal object by obtaining the object distance $D_V$ and a magnification β by a defocus amount detected in each area, the present movement amount of the AF lens, the drive amount conversion coefficient $K_L$, and the distance converting coefficient $K_N$, and by changing a selection method of the areas when the magnification β of the second area (the area b located in the center of the finder) is large (that is, when β>1/100) and when it is small (that is, when β≦1/100). That is, when the magnification β is small, since the range of a depth of field increases, a comparatively in-focus condition is obtained if a focusing is performed by using the area b located in the center of the finder; however, when the magnification β is large, since the range of the depth of field decreases, it is considered appropriate to perform a focusing by using the nearest area considering that an object closer to the camera is the main object. The reason why the area is selected based on the magnification β as described above is that the depth of field can be evaluated more accurately compared with the case where the area is selected based on the object distance $D_V$ since β=f/$D_V$, that is, the magnification is influenced by the focal length f as described later.

In the flow chart shown in FIG. 54, firstly, whether or not the focus detection is impossible in all the areas under the low contrast condition is determined (step #C200). When the focus detection is impossible in all the areas, the process immediately returns, since it is unnecessary to select an area. When there are areas where the focus detection is possible, the object distance $D_V$ and the magnification β of each area where the focus detection is possible are obtained (steps #C206 and #C210). The object distance $D_V$ is calculated by the following equation:

$$D_V = K_N/(DF \times K_L + L_p),$$

wherein:

$K_N$ represents a distance converting coefficient;

$K_L$ represents a drive amount conversion coefficient;

DF represents a defocus amount; and

Lp represents a movement amount of the AF lens from the infinity end when an object having an object distance of $D_V$ is focused on.

The magnification β is calculated, by using the above object distance $D_V$, by the following equation:

$$\beta = f/D_V,$$

wherein f represent a focal length.

After the object distance $D_V$ and the magnification β are calculated as described above, whether or not the magnification β of the second area is larger than 1/100 is determined at step #C220. As a result of the determination, when β>1/100, the nearest area (a focus detection area corresponding to a nearest object) is selected (step #C230), and when β⩽1/100, the second area is selected in order to give priority to the information in the center of the image plane (step #C240). Then, the process returns. After the process returns, a focusing is performed with respect to the selected area. When the focus detection is impossible in the second area, after the determination at step #C220, the process proceeds to step #C230.

When the process returns from the above-described subroutine MULTIPOINT ALGORITHM, whether or not the focus detection is possible is determined at step #605. When it is impossible, a flag LCONF showing the low contrast is set, and the process returns (step #605). On the other hand, when the focus detection is determined to be possible, whether or not a flag LSNF showing that a low contrast scanning is being performed has been set is determined at step #608. When it has been set, the AF lens unit is being moved. Therefore, after a subroutine LENS STOP is executed, the process proceeds to step #610. In the subroutine LENS STOP (its flow chart is not shown), after the AF lens unit is stopped by controlling the motor drive circuit MD1, the flag LMVF is reset. When the flag LSNF is determined not to have been set at the above-mentioned step #608, the process proceeds directly to step #610. At step #610, the flag LCONF is reset. Thereafter, a defocus amount is calculated, and the defocus amount is multiplied by the coefficient $K_L$, for converting a defocus amount into an AF lens unit drive pulse count, to obtain an AF lens unit drive pulse count (steps #615 and #618). Next, whether or not the absolute value of the defocus amount is within the focusing range is determined at step #620. Here, if the absolute value of the defocus amount is equal to or less than 200 μm, it is determined to be within the focusing range. As a result of the determination, when the absolute value of the defocus amount is within the focusing range, a flag AFEF, showing that the AF lens unit is in-focus, is set; when it is not within the focusing range, the flag AFEF is reset, and the process returns (steps #625 and #628).

Figure 15:
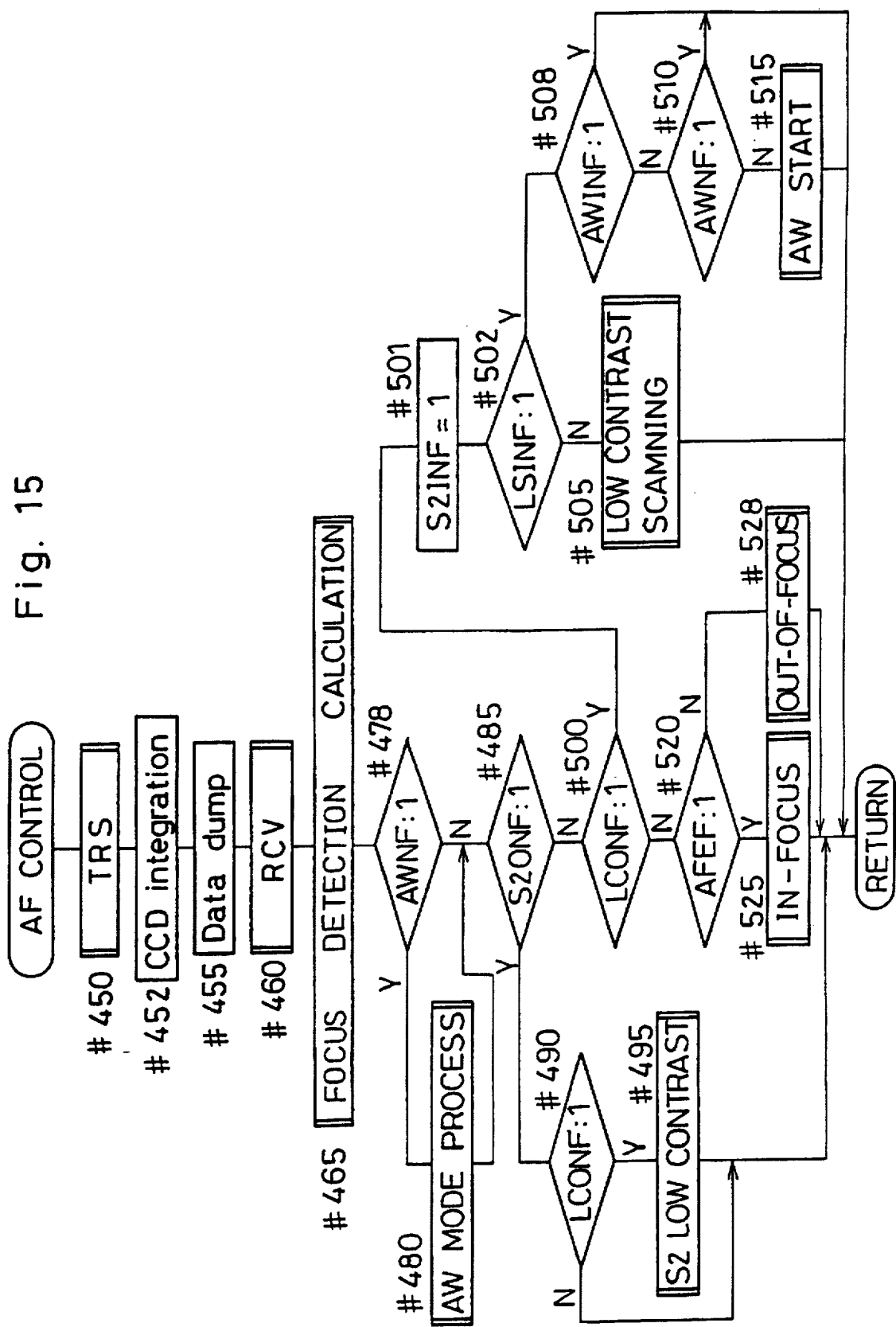
FIG. 15 is a flow chart showing a subroutine AF CONTROL.

Returning to the flow chart shown in FIG. 15, the description of the subroutine AF CONTROL will be continued. After returning from the above-described subroutine FOCUS DETECTION CALCULATION (step #465), the process proceeds to step #478, where whether or not a flag AWNF, showing that the present mode is the auto wide mode, has been set is determined. When the flag AWNF has been set, a subroutine AW-MODE PROCESS is executed at step #480. However, since the flag AWNF has not been set at first, the process proceeds directly to step #485. At step #485, whether or not a flag S2ONF, showing that the sequence after the release switch S2 is turned on in the wide view mode (hereinafter referred to as "after S2ON") is being executed, has been set is determined. When the flag S2ON has been set, a routine (steps #490 and #495) executed in the wide view mode is executed, and the process returns. However, since the flag S2ONF has not been set at the time of the first focus detection, the process proceeds to step #500, where whether or not the flag LCONF, showing that the contrast is low, has been set is determined. When the flag LCONF has been set, processes, under the low contrast condition, from step #501 are executed. However, assuming that the flag has not been set at this time, the process proceeds to step #520. At step #520, whether or not the flag AFEF, showing that the AF lens unit is in-focus, has been set is determined. When the flag AFEF has been set, a subroutine IN-FOCUS is executed (step #525). When it has been reset, a subroutine OUT-OF-FOCUS is executed (step #528), and the process returns.

Now, the above-mentioned subroutines IN-FOCUS and OUT-OF-FOCUS will be described.

Figure 20:
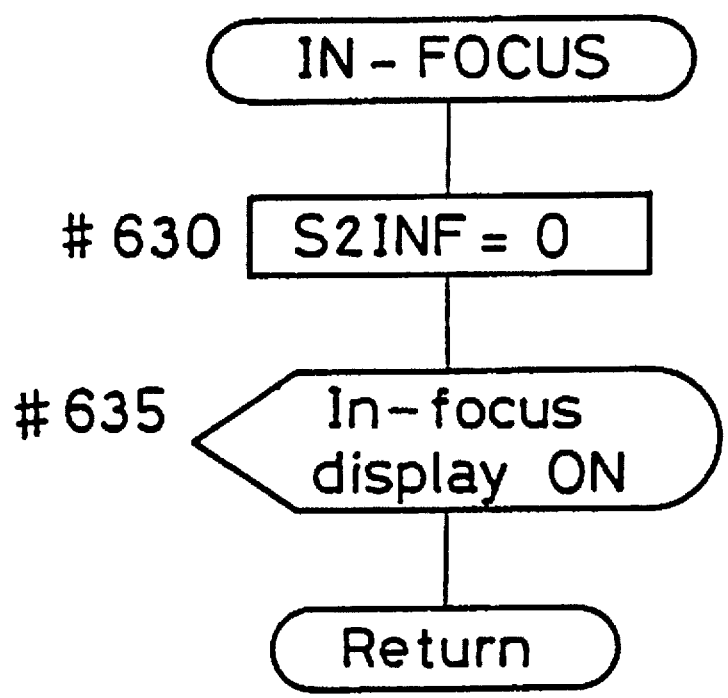

First, the subroutine IN-FOCUS shown in FIG. 20 will be described. When the subroutine IN-FOCUS is called, a flag S2INF for making the turning on of the release switch S2 ineffective (see step #352 shown in FIG. 14) is reset, and the in-focus display is turned on in the finder (steps #630 and #635). Then, the process returns.

Figure 21:
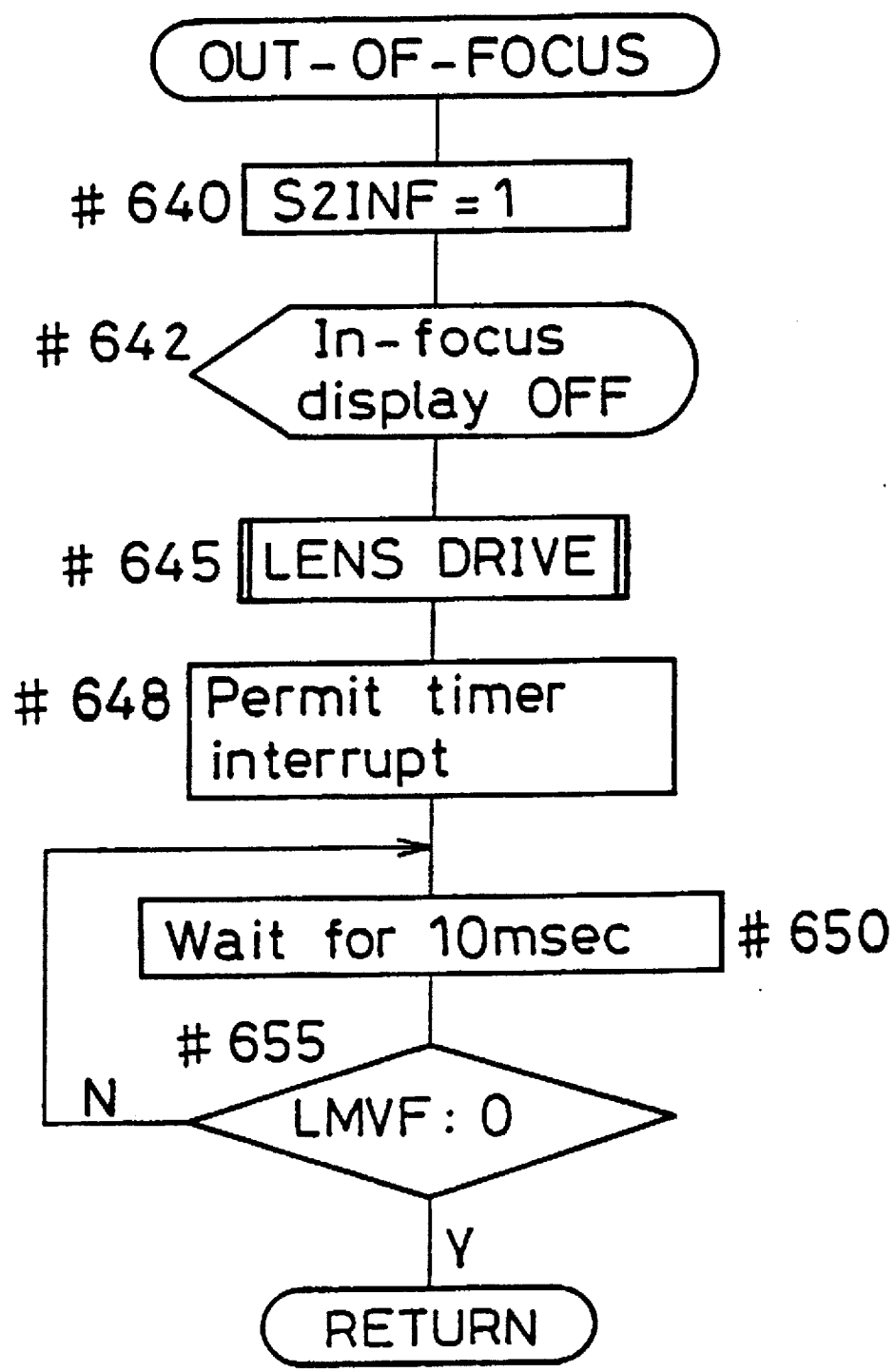

Next, the subroutine OUT-OF-FOCUS shown in FIG. 21 will be described. When the subroutine OUT-OF-FOCUS is called, the flag S2INF, for making the turning on of the release switch S2 ineffective, is set, and the in-focus display is turned off (steps #640 and #642). Then, after a subroutine LENS DRIVE is executed according to the AF lens unit drive pulse count N1 calculated in the subroutine FOCUS DETECTION CALCULATION (step #465 shown in FIG. 15), the timer interrupt is permitted (steps #645 and #648). And, while repeating, at predetermined intervals, a determination of whether or not a flag LMVF, showing that the AF lens unit is being moved, has been reset, the process waits until the AF lens unit stops. When the AF lens unit stops, the process returns (steps #650 and #655). Now, the subroutine LENS DRIVE (its detailed flow chart is not shown) at step #645 will be described. The subroutine LENS DRIVE corresponds to a subroutine DRIVE I (see FIG. 41). After the flag LMVF is set and the drive amount N1 or N is decided in the subroutine LENS DRIVE, the driving of the AF lens unit (the turning on of the AF motor M1) is started. The flag LMVF is reset by the counter interrupt or the timer interrupt for controlling the lens drive after the AF lens unit is moved by a predetermined amount.

Returning to the flow chart shown in FIG. 15, the case where the flag LCONF, showing that the contrast is low, is determined to have been set at step #500 will be described. When the flag LCONF has been set, the flag S2INF for inhibiting the release is set (step #501), and whether or not a flag LSINF inhibiting the low contrast scanning has been set is determined at step #502. When the flag LSINF has not been set yet, a subroutine LOW CONTRAST SCANNING is executed (step #505), and the process returns.

Figure 22:
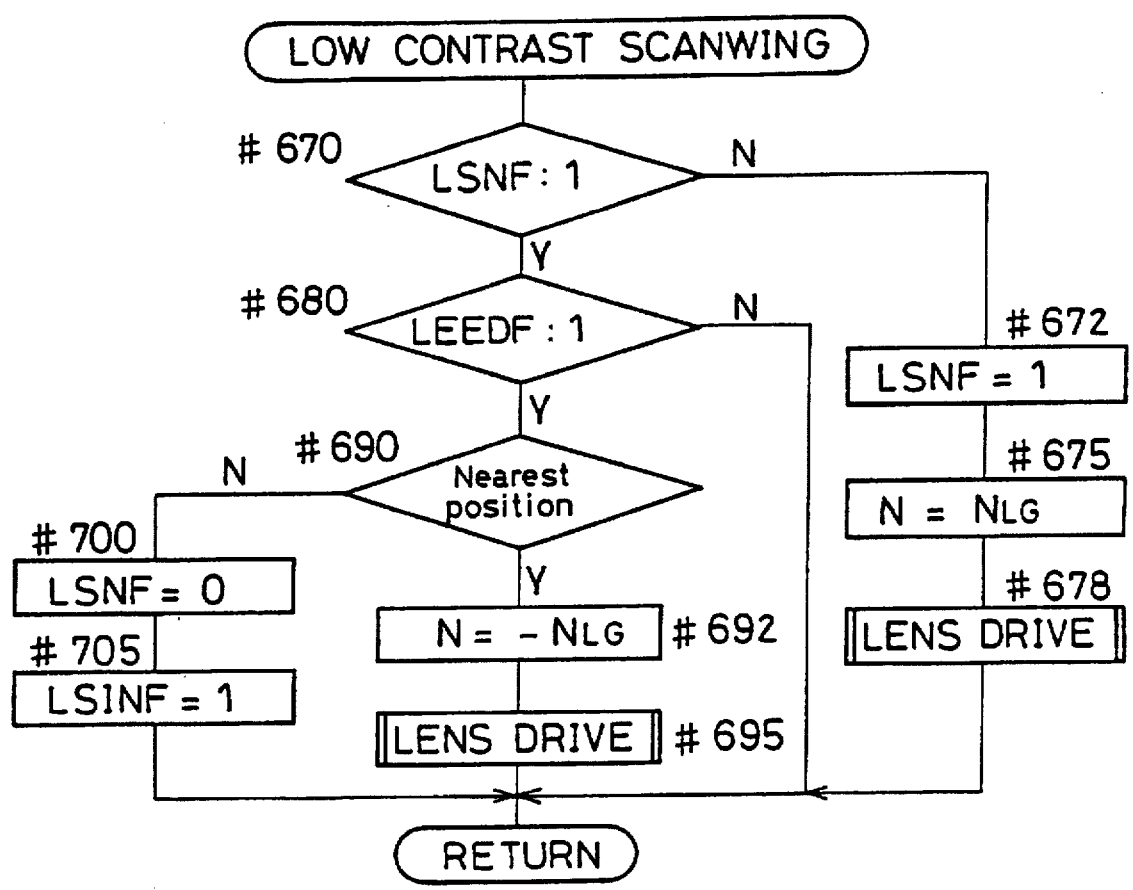

Now, the above-mentioned subroutine LOW CONTRAST SCANNING shown in FIG. 22 will be described. In the subroutine LOW CONTRAST, the focus is adjusted on an object whose contrast is low, since the AF lens unit is situated far away from the position where the AF lens unit becomes in-focus at the object. When the subroutine LOW CONTRAST is called, first, whether or not the flag LSNF has been set is determined at step #670. Since it has not been set at first, the process proceeds to step #672, where the flag LSNF is set. Then, the lens movement amount N is set to the positive large value $N_{LC}$, the above-described subroutine LENS DRIVE is executed, and the process returns (steps #675 and #678). The low contrast scanning is started as described above. Here, the AF control (control for automatically adjusting the focus) is mainly considered in the low contrast scanning.

Due to the above-described lens movement for starting the low contrast scanning, the following focus detection is performed while the AF lens unit is being moved toward the nearest position. When the focus detection becomes possible at the next focus detection calculation (step #465 shown in FIG. 15), the AF lens unit is immediately stopped, and after whether the AF lens unit is in-focus or out-of-focus is determined, a sequence for focusing (steps #520 to #528) is executed. On the other hand, when the contrast is again determined to be low as a result of the next focus detection, the subroutine LOW CONTRAST SCANNING is again executed (steps #501 to #505 shown in FIG. 15).

When the subroutine LOW CONTRAST SCANNING is executed again, the flag LSNF has been set. Therefore, the focus detection is repeated, while the AF lens unit is being moved toward the nearest position, until the flag LEEDF showing that the AF lens unit has reached an endmost position is set (steps #670 and #680). When the flag LEEDF is determined to have been set at step #670, whether or not the AF lens unit is at the nearest position is determined at step #690. Since the AF lens unit is moved toward the nearest position at first, the result of the determination is "Yes", and the process proceeds to step #692, where the lens movement amount N is set to the negative large value $-N_{LO}$ to start to move the AF lens unit (step #695). In this case, while the AF lens unit is being moved toward infinity, the focus detection is repeated. When the contrast continues to be low while the focus detection is repeated and the AF lens unit is determined to be at infinity (not at the nearest position) at step #690, the flag LSNF, showing that the low contrast scanning is being performed, is reset, and the flag LSINF, showing that the low contrast scanning is inhibited, is set to finish the subroutine LOW CONTRAST (steps #700 and #705).

Returning to the flow chart shown in FIG. 15, the description of the subroutine AF CONTROL will be continued. In the subroutine LOW CONTRAST SCANNING, as described above, while the focus detection is impossible (LCONF=1), a loop consisting of steps #55 and #60 (see FIG. 10) is repeated, after steps #501 to #505 are executed, until the AF lens unit reaches infinity. When the focus detection does not become possible even after the subroutine LOW CONTRAST SCANNING is completed, the flag LSINF showing that the low contrast scanning has been inhibited is determined to have been set at step #502. Then, the process proceeds to step #508, where whether or not a flag AWINF showing that the auto wide mode has been inhibited, and a flag AWNF showing that the present mode is the auto wide mode, is determined (steps #508 and #510). Since neither of the flags AWINF and AWNF have been set at first, a subroutine AW START is executed (step #515), and the process returns.

Now, the subroutine AW (AUTO WIDE) START shown in FIG. 23 will be described. When the subroutine AW START is called, whether or not the switch $S_{AW}$ for setting the ON/OFF of the auto wide mode is ON is determined. When it is not ON, the flag AWINF, showing that the auto wide mode has been inhibited, is set, and the process returns (steps #720 and #725). On the other hand, when the switch $A_{AW}$ is determined to be ON at step #720, the target focal length $f_t$ is set to a half the present focal length $f_n$, and the target focal length $f_t$ is compared with the minimum focal length $f_{min}$ of the zoom lens unit (steps #730 and 732). When $f_t<f_{min}$, after the target focal length $f_t$ is re-set to the minimum focal length $f_{min}$, the process proceeds to step #735; when $f_t \geq f_{min}$, the process proceeds directly to step #735. At step #735, the flag AWNF, showing that the present mode is the auto wide mode, is set, and the process returns.

An auto wide sequence will hereinafter be described. The auto wide sequence is a sequence for obtaining a sufficient contrast for detecting a focal point condition by moving a zoom lens unit in the WIDE direction when too large magnification of an image causes a low contrast. Similarly to the description of the subroutine LOW CONTRAST SCANNING, the AF control will mainly be considered in the following description of the auto wide sequence. If the auto wide operation is started by the above-described subroutine AW START (step #515), the subroutine TRS (step #450) is called in the condition where the flag AWNF, showing that the present mode is the auto wide mode, has been set at the subsequent AF control.

Figure 17:
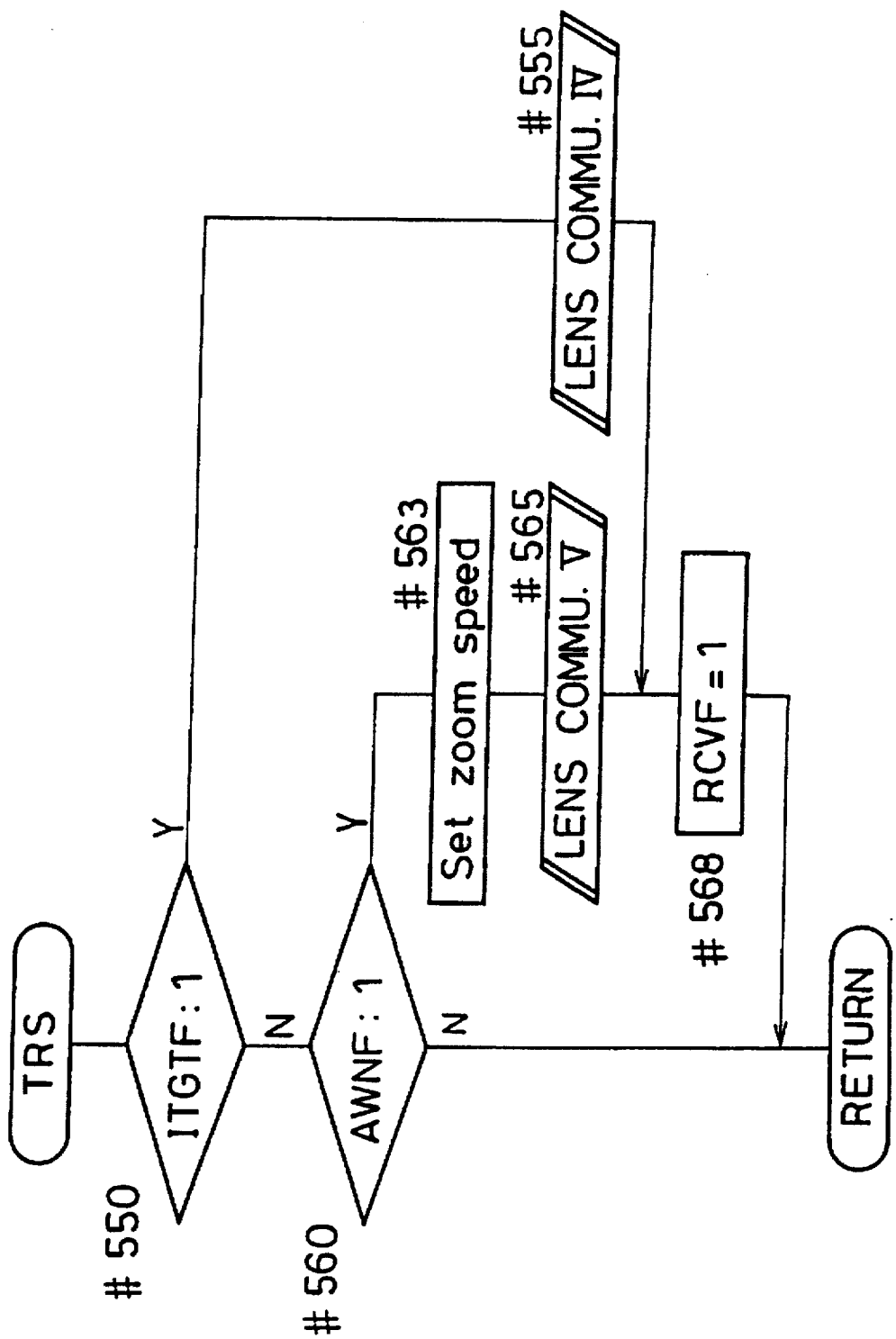
FIGS. 17 to 24 and 28 are flow charts showing subroutines called in the subroutine AF CONTROL.

Now, the subroutine TRS shown in FIG. 17 will be described. When the subroutine TRS is called, first, whether or not a flag ITGTF, for instructing the transmission of the data on a starting timing for the CCD integration, has been set is determined at step #500. When the flag ITGTF has been set, the subroutine LENS COMMUNICATION IV is executed to notify the in-lens microcomputer μC2 of the starting timing for the CCD integration. Then, a flag RCVF, showing the receiving of the lens data changed as the focal length is changed is set, and the process returns (steps #555 and #568). On the other hand, when the flag ITGTF is determined not to have been set at step #550, the process proceeds to step #560, where whether or not the flag AWNF has been set is determined. When the flag AWNF has been set, after the zoom drive speed is set, a subroutine LENS COMMUNICATION V is executed to transmit the data on a starting timing for the CCD integration and the target focal length $f_t$ to the in-lens microcomputer μC2. Then, the flag RCVF, showing the receiving of the lens data, is set, and the process returns (steps #563, #565, and #568). By the subroutine LENS COMMUNICATION, a calculation of the lens data and a zooming operation are started by the in-lens microcomputer μC2. On the other hand, when neither of the flags ITGTF and AWNF have been set, the process returns without executing the subroutine LENS COMMUNICATION. It is in order to set a zoom speed according to the photographing condition that the zoom drive speed is set by the in-body microcomputer μC1 at step #563.

Figure 18:
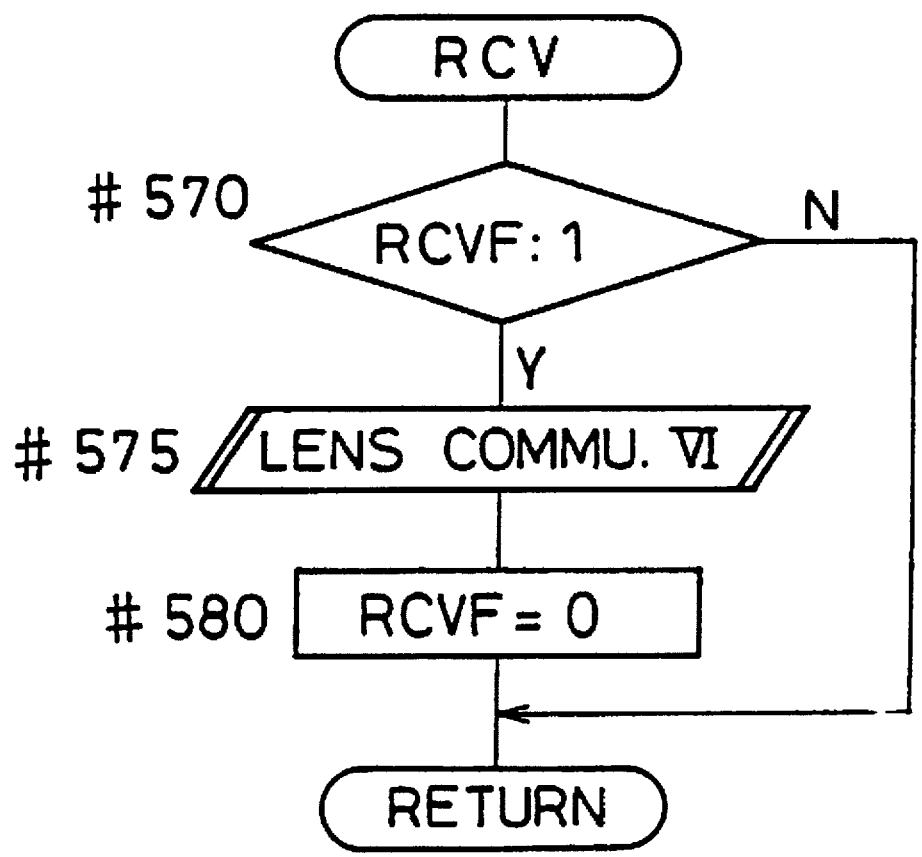

Next, the subroutine RCV, shown in FIG. 18, where the lens data, changed as the focal length is changed, is received will be described. When the subroutine RCV is called, first, whether or not the flag RCV, showing the receiving of the lens data, has been set is determined at step 570. When the flag RCVF has been set, a subroutine LENS COMMUNICATION VI is executed to receive the lens data (step #575). Then, the flag RCVF is reset, and the process returns (step #580). On the other hand, when the flag RCVF has not been set, the process returns without executing the subroutine LENS COMMUNICATION VI.

Now, the subroutines LENS COMMUNICATION IV, LENS COMMUNICATION V, and LENS COMMUNICATION VI used in the above-described process will simultaneously be described.

Figure 33:
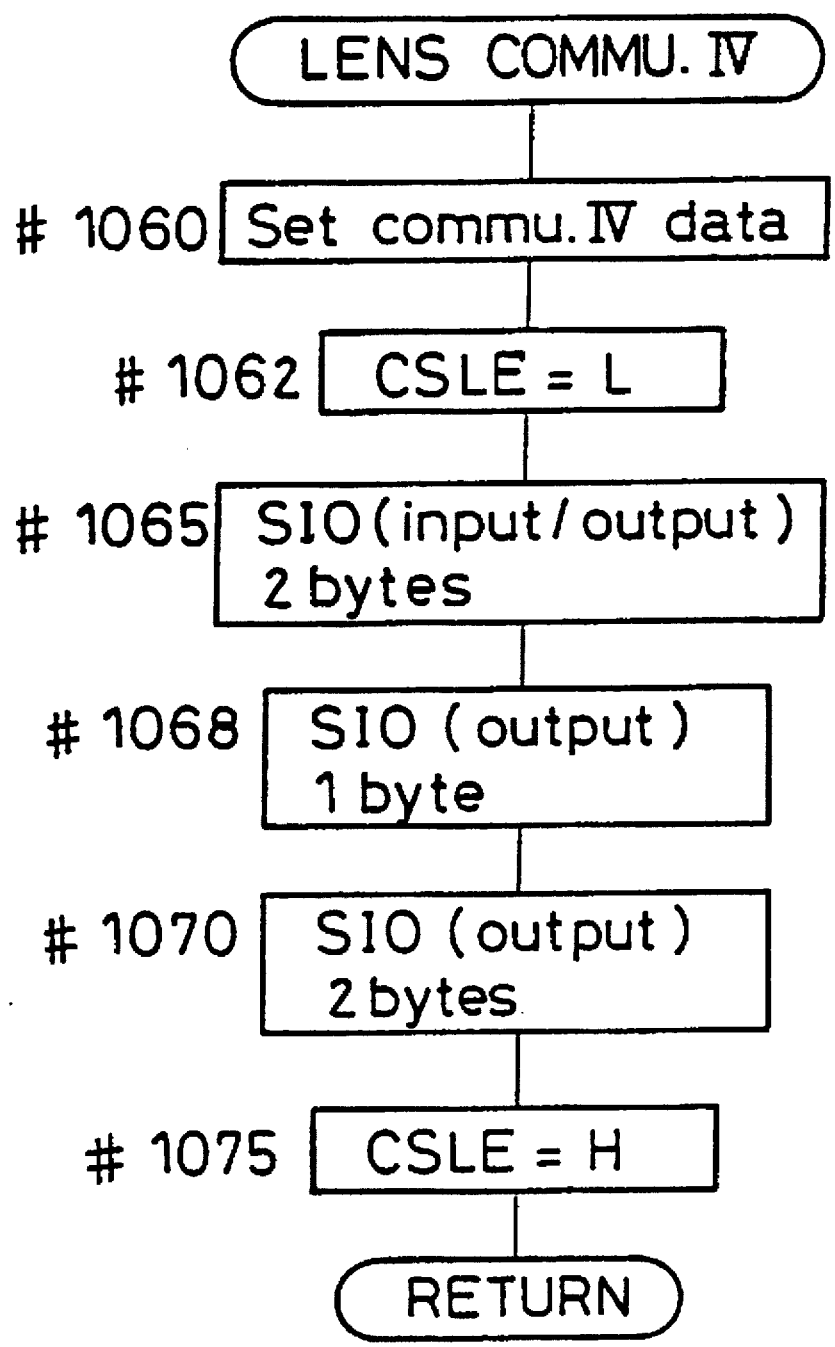
Figure 34:
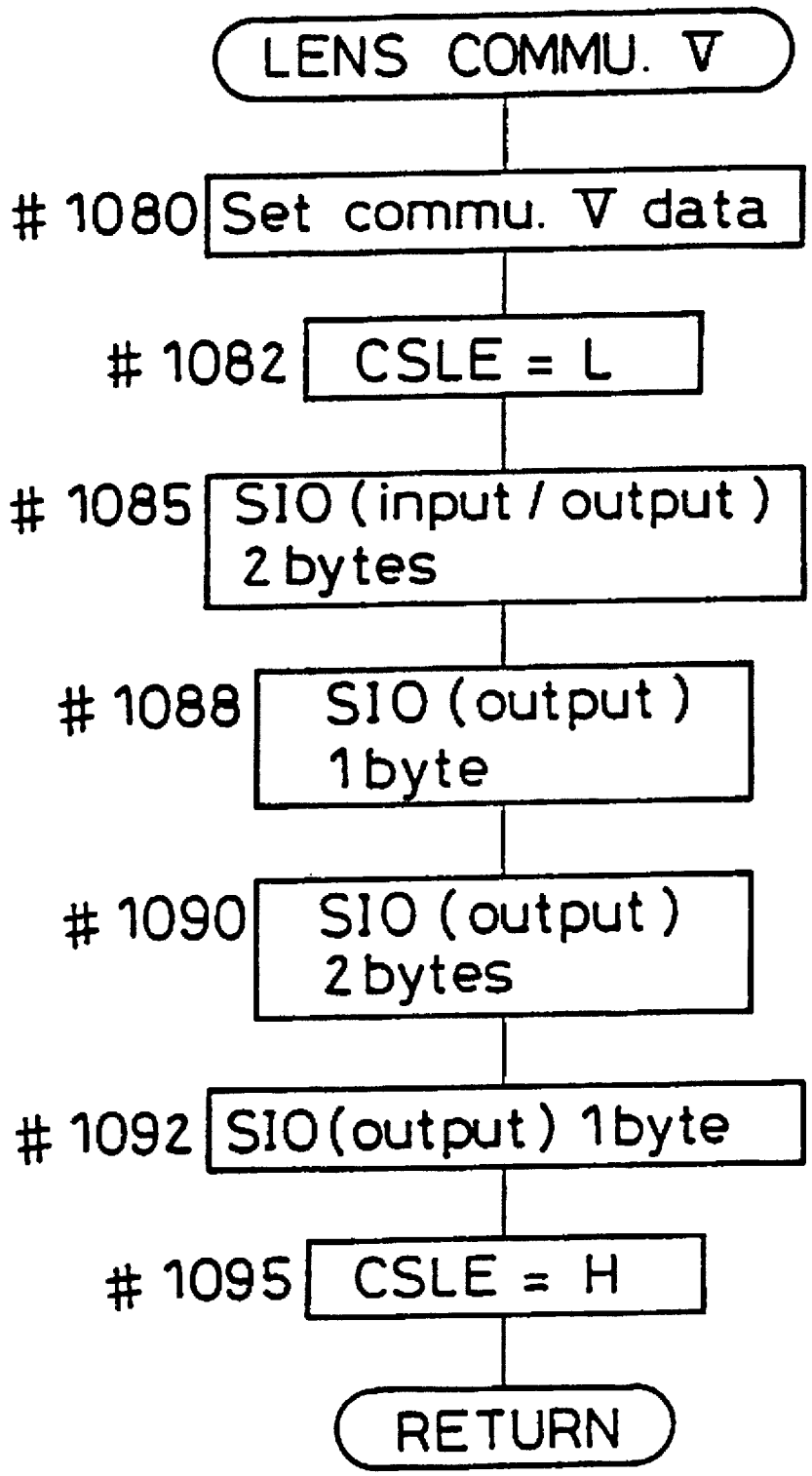
Figure 35:
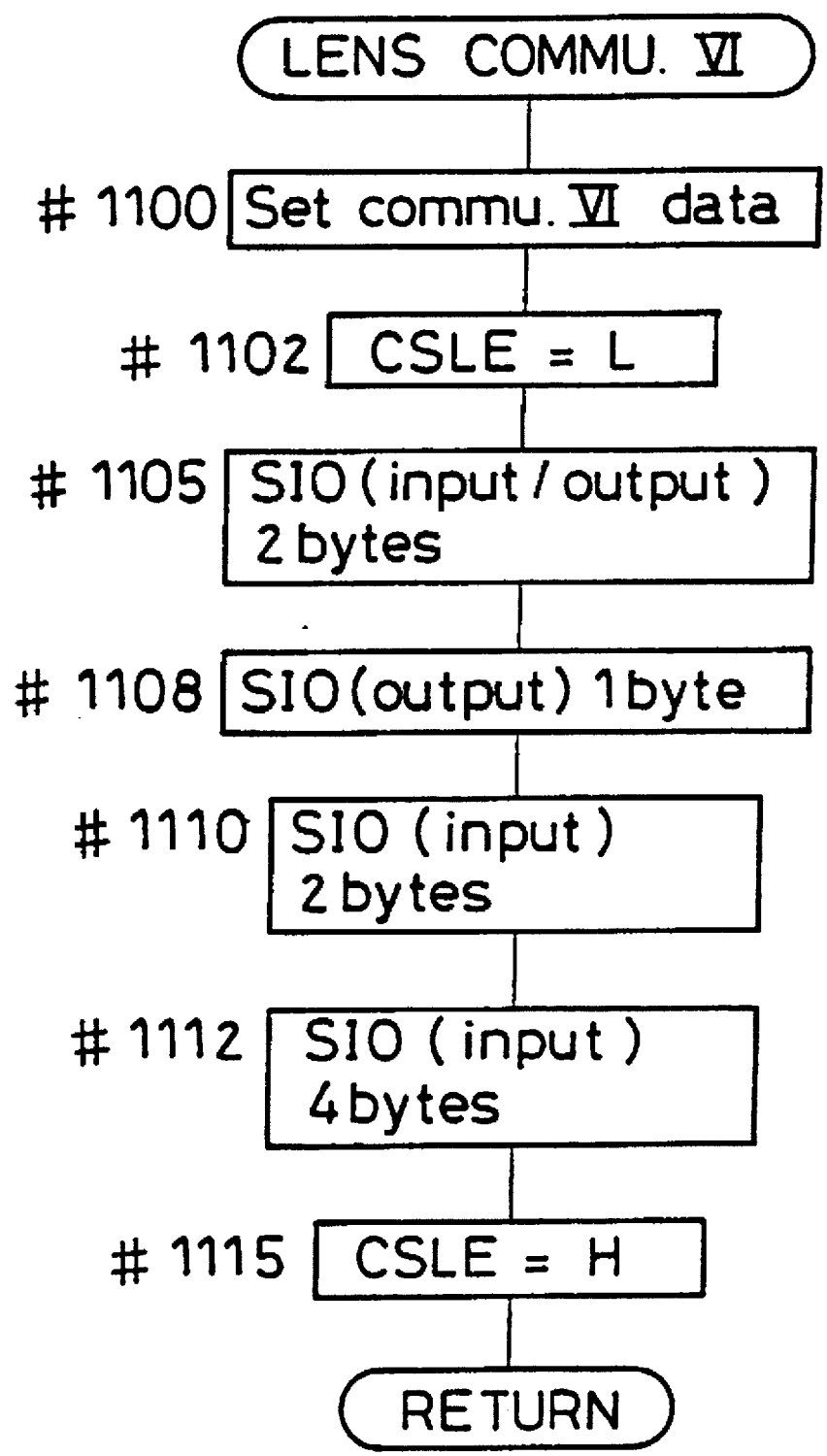

The subroutine LENS COMMUNICATION IV is shown in FIG. 33; the subroutine LENS COMMUNICATION V, in FIG. 34; and the subroutine LENS COMMUNICATION VI, in FIG. 35. When the subroutine LENS COMMUNICATION IV (LENS COMMUNICATION V, or LENS COMMUNICATION VI) are called, first, the data representing Mode IV (Mode V, or Mode VI) are set, the level of the terminal CSLE is changed to low, and a two-byte serial input/output is performed to determine the types of the camera body and lens. Then, one-byte data are serially outputted to the in-lens microcomputer μC2 to show that the present mode is Mode IV (Mode V, or Mode VI) (steps #1060 to #1068, #1080 to #1088, and #1100 to #1108). Next, in the subroutine LENS COMMUNICATION IV, two-byte body condition data, showing that the communication is performed to notify a starting timing for the CCD integration, are serially outputted (step #1070). In the subroutine LENS COMMUNICATION V, one-byte data on the target focal length $f_t$ as well as two-byte body condition data similar to the data transmitted in the LENS COMMUNICATION IV, are serially outputted (steps #1090 and #1092), the level of the terminal CSLE is changed to high, and the process returns (steps #1075 and #1095). In the subroutine LENS COMMUNICATION VI, two-byte lens condition data (the lens condition data when the lens communication VI is executed) and four-byte data changed by zooming (the lens data changed as the focal length is changed) when the LENS COMMUNICATION IV or the LENS COMMUNICATION V is executed) are serially inputted, the level of the terminal CSLE is changed to high, and the process returns (steps #1110 to #1115).

Returning to the flow chart shown in FIG. 15, the description of the subroutine AF CONTROL will be continued from step #450. While the flag AWNF, showing that the present mode is the auto wide mode, is being set, after the data on a starting timing for the CCD integration and the target focal length $f_t$ are transmitted to the in-lens microcomputer μC2 in the subroutine LENS COMMUNICATION V of the subroutine TRS (step #450), the lens data, when the CCD integration is started, is inputted to the in-body microcomputer μC1 in the subroutine LENS COMMUNICATION VI of the subroutine RCV, and the subroutine FOCUS DETECTION CALCULATION is executed (steps #450 to #465). At the next step #478, since the flag AWNF has been set, the result of the determination becomes "Yes", and the process proceeds to step #480, where the subroutine AW-MODE PROCESS (the process in the auto wide mode) is executed.

Figure 24:
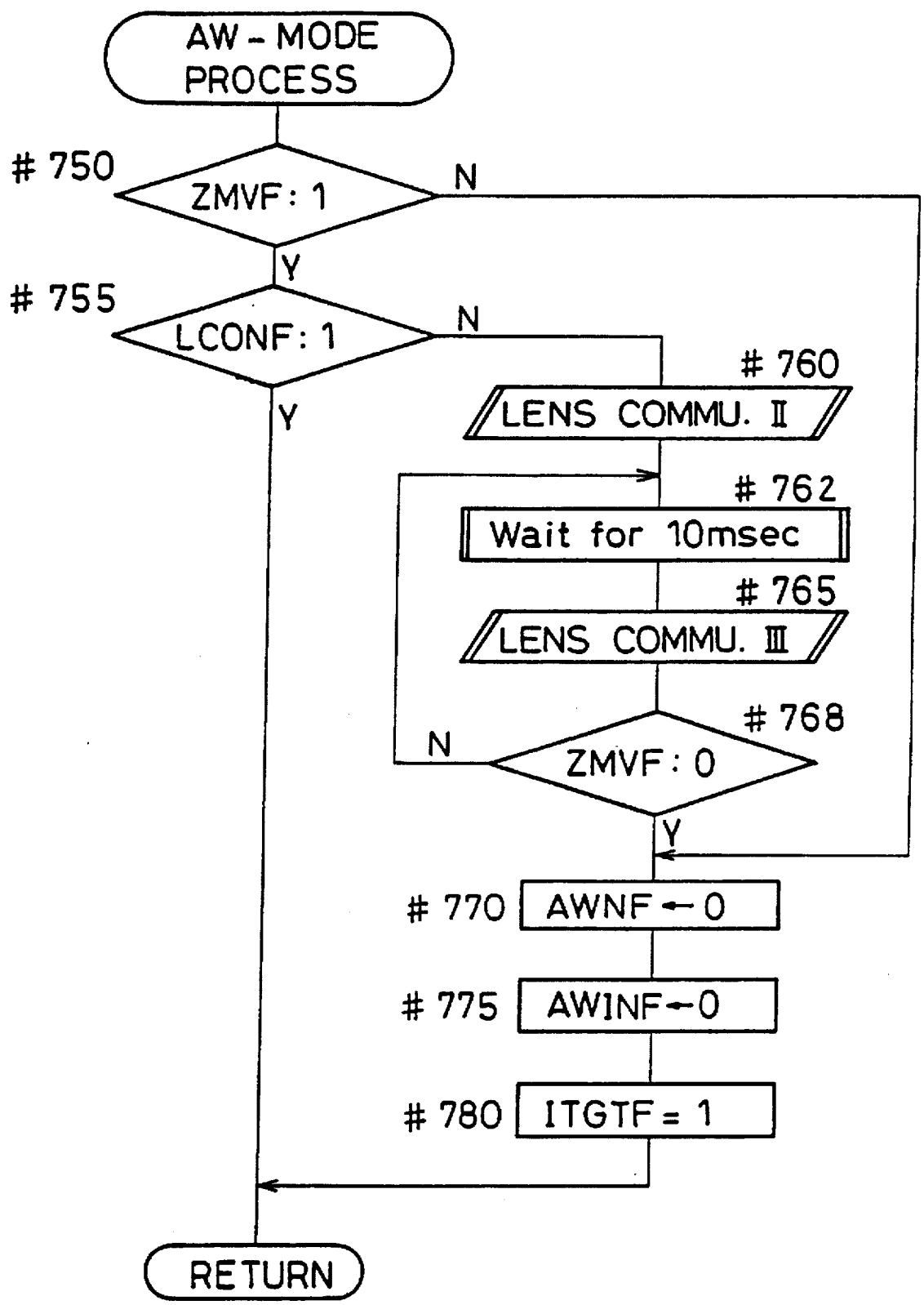

The subroutine AW-MODE PROCESS shown in FIG. 24 will be described. When the subroutine AW-MODE PROCESS is called, first, whether or not a flag ZMVF, showing that the AF lens unit is being moved, of the lens condition data transmitted from the in-lens microcomputer μC2 in the above-described subroutine LENS COMMUNICATION VI has been set is determined at step #750. When the flag ZMVF has not been set, the zooming operation is determined to be completed (that is, the focal point cannot be detected even if the auto wide mode has been set). Then, the flag AWNF, showing that the present mode is the auto wide mode, is reset, the flag AWINF, showing that the auto wide mode has been inhibited, is set, the flag ITGTF, for instructing the transmission of the data on a starting timing for the CCD integration, is reset, and the process returns (steps #770 to #780).

On the other hand, when the flag ZMVF is determined to have been set at step #750, since the zooming operation has not been completed yet, whether or not a sufficient contrast for detecting a focal point condition is obtained in a zooming operation in the auto wide mode is determined at step #755. When the flag LCONF has been set as a result of the determination at step #755, the focus detection is impossible. Therefore, the focus detection is performed again. On the other hand, when the flag LCONF has not been set, since the focus detection has become possible, a subroutine LENS COMMUNICATION II, where data instructing the stopping of the zoom lens unit (body condition data) is outputted to the in-lens microcomputer μC2, is executed at step #760. While the subroutine LENS COMMUNICATION III, where the lens condition data are inputted, is repeated at the predetermined intervals, the process waits until the flag ZNMVF, showing that the zoom lens unit is being moved, is reset (steps #762 to #768). When the flag ZMVF, of the lens condition data, transmitted from the in-lens microcomputer μC2 in the subroutine LENS COMMUNICATION III has been reset, the zoom lens unit is determined to be stopped. And the flag AWNF is reset, the flag AWINF is set, and the flag ITGTF is set to end the auto wide mode (steps #770 to #780). Then, the process returns. The flag ITGTF, for instructing the transmission of the data on a starting timing for the CCD integration, is set at step #780 in order to input the data on a position where the zoom lens unit is stopped by the execution of the subroutines TRS and RCV (steps #450 and #460) when the zooming operation is completed.

Returning to the flow chart shown in FIG. 15, the description of the subroutine AF CONTROL will be continued. In the auto wide mode, while the above-described subroutine AW-MODE PROCESS (step #480) is being executed, the focus detection is repeated by repeating the loop consisting of steps #55 and #60 (see FIG. 10) after steps #501, #508 and #510 are executed while the focus detection is impossible. When the focus detection becomes possible in the auto wide mode, after the zoom lens unit is stopped in the subroutine AW-MODE PROCESS (step #480), the process returns to the regular focus detection. Then, a sequence for focusing is executed (steps #520 to #528).

In the above-described subroutine AF CONTROL (shown in FIG. 15), when the flag S2ONF, showing that the sequence from S2ON is being executed, has been set, the result of the determined at step #485 is "Yes", and the process proceeds to step #490. The sequence from S2ON will be described later since the sequence is executed only in the wide view mode.

Now, the effects obtained by executing the auto wide sequence will be described. When a magnification of an image of an object is so large that it is situated out of the focus detection areas a to d as shown in FIG. 9A, by repeating the focus detection while the magnification of an image of the object is being decreased by moving the zoom lens unit in the WIDE direction, the object becomes caught by the focus detection area as shown in FIG. 9B, which enables the focus detection. In photographing the face, etc. of a person (not shown), when a magnification of the image is too high, the focus detection areas catch a cheek, etc. where the contrast is low, so that the focus detection becomes impossible. However, by slightly moving the zoom lens unit with WIDE direction, a contrast of a certain value or more is obtained, so that the focus detection sometimes becomes possible. Since the target focal length $f_t$ for zooming is decided considering the present focal length $f_n$ (in this embodiment, the target focal length $f_t$ is set to a half the present focal length $f_n$) in the auto wide sequence, the problem that a change of an angle of view is too large (for example, a change of the focal length from 200 mm to 28 mm, by which a user would be perplexed) when the zooming operation is completed is not caused even when the focal length detection is impossible in the focus detection in the auto wide mode.

Figure 14:
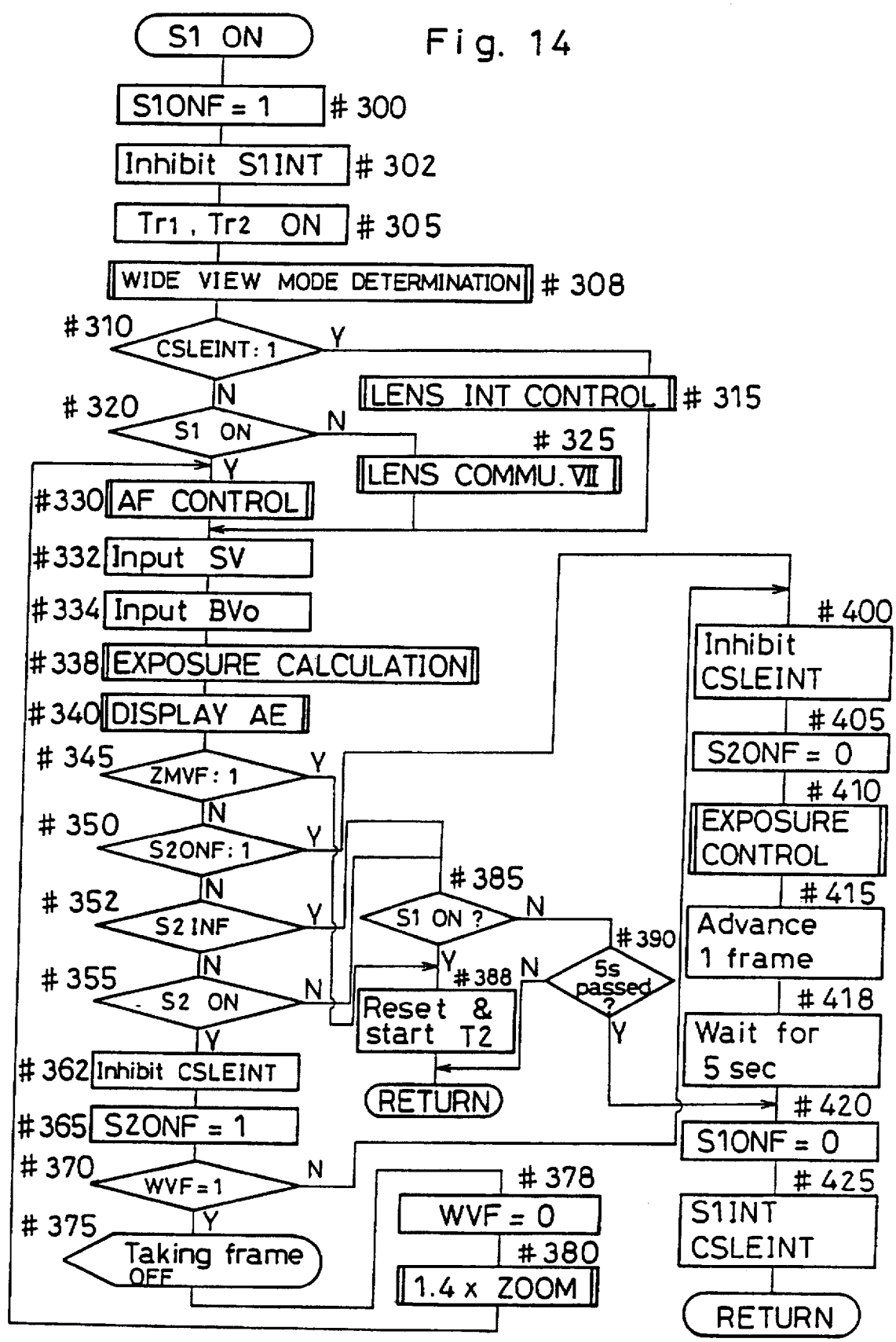
FIG. 14 is a flow chart showing a subroutine S1ON.

Returning to the flow chart shown in FIG. 14, the process proceeds to step #332 after the subroutine AF CONTROL shown in FIG. 15 is executed at step #330.

Figure 25:
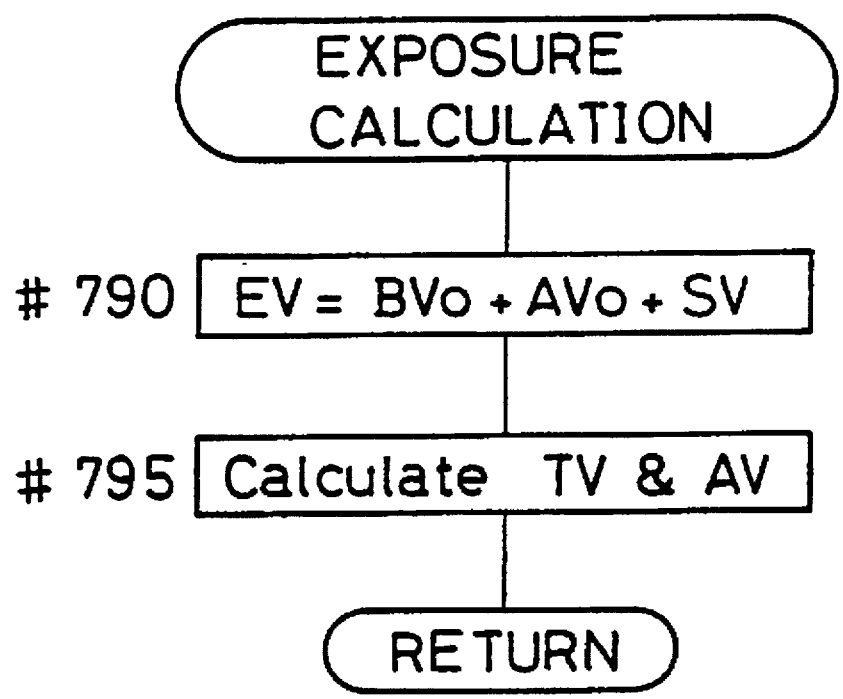
FIG. 25 is a flow chart showing a subroutine EXPOSURE CALCULATION.

When the process returns from the subroutine AF CONTROL, a film sensitivity SV and an object brightness value $BV_o$ measured in an exposure measurement at open aperture are inputted, and a subroutine EXPOSURE CALCULATION (shown in FIG. 25) is executed (steps #332 to #338). When the subroutine EXPOSURE CALCULATION is called, first, an exposure value EV is obtained by an equation $EV=BV_o+AV_o+SV$, where $AV_o$ represents an aperture value. From the exposure value EV, the shutter speed TV and the aperture value AV are obtained by calculation based on a predetermined AE (auto exposure) program diagram, and the process returns (steps #790 and #795). The AE program chart will not be described in this specification or shown in a figure, since it bears no direct relation to the present invention.

Figure 26:
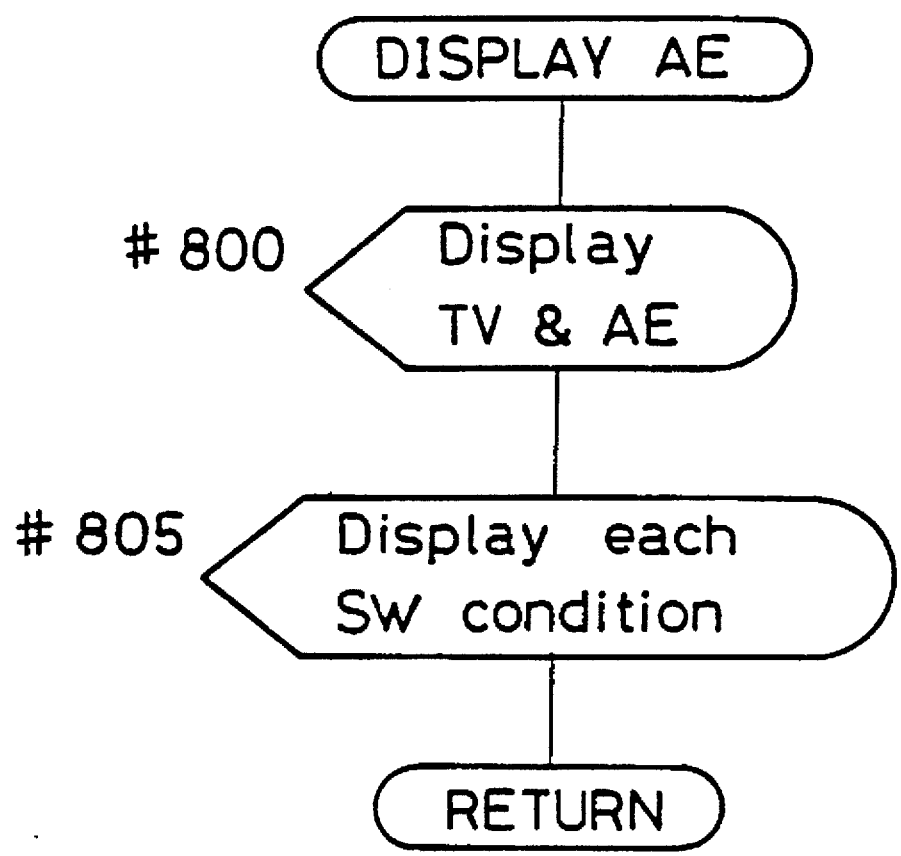
FIG. 26 is a flow chart showing a subroutine DISPLAY AE.

After returning from the subroutine EXPOSURE CALCULATION, the process proceeds to step #340, where a subroutine DISPLAY AE (shown in FIG. 26) is executed. In the subroutine DISPLAY AE, data on the shutter speed TV, the aperture value AV, whether the auto wide switch $S_{AW}$ is ON or OFF, and whether the wide view mode has been set or not, etc. are serially outputted to the display control circuit DISPC. Based on the above data, the display control circuit DISPC displays predetermined information on the display portion DISPI (the display portion 14 shown in FIG. 2) provided on top of the camera body and on the display portion DISPII (see FIG. 5) provided in the finder (steps #800 and #805). The content of the display will not be described in this specification, since it bears no relation to the present invention.

Returning to the flow chart shown in FIG. 14, the description of the subroutine S1ON will be continued. After the above-mentioned display of the information with respect of the auto exposure is completed, whether or not the flag ZMVF, showing that the zoom lens unit is being moved, has been set is determined at step #345. When the flag ZMVF is determined to have been set, the power zoom is being performed. Therefore, the process proceeds to step #388 without performing the determinations from step #350 with respect to the exposure control. After a timer T2 is reset and re-started at step #388, the process returns. The timer T2 is used for continuing the display on the camera body and in the finder for five seconds after the preparation switch S1 is turned off or a power zoom operation is stopped.

On the other hand, when the flag ZMVF is determined not to have been set at step #345, the process proceeds to step #350, where whether or not the flag S2ONF, showing that the sequence from S2ON is being executed, has been set is determined. When the flag S2ONF is determined to have been set, the process proceeds to step #400, where a process for the exposure control is executed. (The process from step #400 will be described later.) Since the flag S2ONF has not been set at first, the process proceeds to step #352, where whether or not the flag S2INF, showing that the release switch S2 is ineffective, has been set is determined. The flag S2INF, which is set in the subroutines IN-FOCUS and OUT-OF-FOCUS, is set to inhibit the release when the AF lens unit is out-of-focus or when the contrast is low. When the flag S2INF has been set, without performing the determination of whether the release switch S2 is ON or OFF being performed, the process proceeds to step #385, where whether or not the preparation switch S1 is ON is determined. When the preparation switch S1 is determined to continue to be ON, preparation operations for photographing are being performed. Therefore, after the timer T2 is reset and re-started, the process returns (step #388). When the preparation switch S1 is determined to be OFF, whether or not five seconds or more have passed since the timer T2 started is determined at step #390. When five seconds or less are determined to have passed, the process returns without resetting the flag S1ONF, and the subroutine S1ON is again executed (steps #60 and #55 shown in FIG. 10). On the other hand, when more than five seconds are determined to have passed, it is determined that the user has lost the intention to take a picture, and therefore, the flag S1ONF is reset to stop the subroutine S1ON (step #420). Then, the interrupts S1INT and CSLEINT are permitted to enable the subroutine S1ON to start when the preparation switch S1 is again turned on, or when the next power zoom operation is started, and the process returns (step #425).

When the flag S2INF is determined not to have been set at the above-mentioned step #352, the process proceeds to step #355, where whether or not the release switch S2 is ON is determined. When the release switch S2 is determined not to be ON, the processes from step #385 are executed similarly to the case where the release switch S2 is made ineffective (S2INF-1).

On the other hand, when the release switch S2 is determined to be ON, the process proceeds to step #362, where the interrupt CSLEINT is inhibited so that an interrupt by the power zoom from the in-lens microcomputer μC2 is not received. After the flag S2ONF is set to show the execution of the sequence from S2ON (step #365), the process proceeds to step #370, where whether or not the flag WVF, showing that the present mode is the wide view mode, has been set is determined. When the flag WVF is determined not to be being set, the processes from step #400 are executed to perform the regular exposure control. The process from step #400 will be described later when the wide view mode is described.

When the flag WVF is determined to have been set at step #370, in order to perform a zooming of 1.4×, first, the taking frame FD2 displayed in the finder is erased, and then, the flag WVF, showing that the present mode is the wide view mode, is reset to execute a subroutine 1.4× ZOOM (step #375 to #380). It is in order to prevent the repetition of the zooming of 1.4× every time the release switch S2 is turned on that the flag WVF is reset at step #378.

Figure 27:
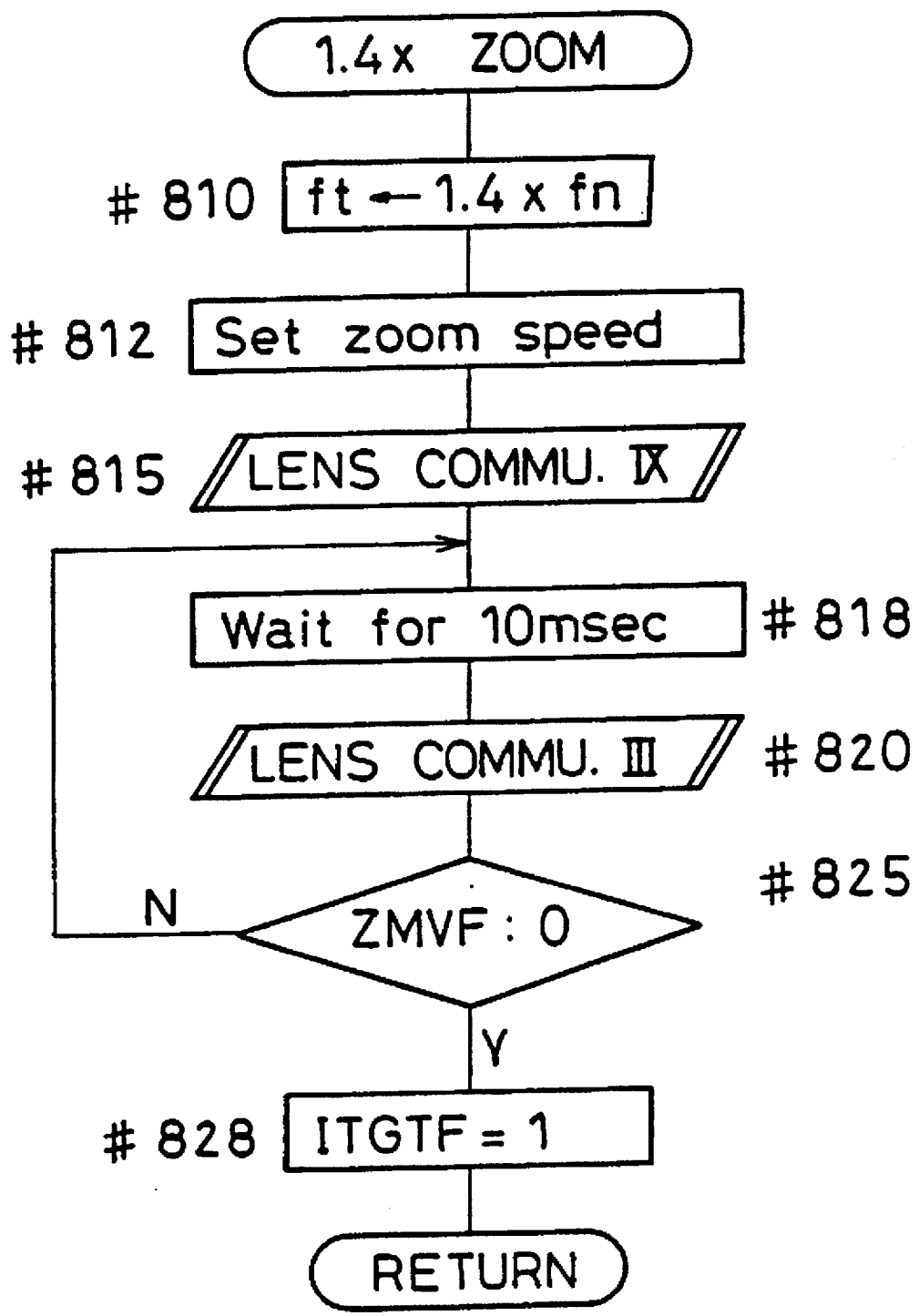
FIG. 27 is a flow chart showing a subroutine 1.4× ZOOM.

The above-mentioned subroutine 1.4× ZOOM is shown in FIG. 27. When the subroutine 1.4× ZOOM is called, first, the target focal length $f_t$ is set to 1.4 times the present focal length in $f_n$ (step #810). Then, an appropriate zoom speed for zooming in the wide view mode is set. In order to transmit the above-described target focal length $f_t$ and zoom speed to the in-lens microcomputer μC2, a subroutine LENS COMMUNICATION IX is executed (steps #810 to #815).

Figure 38:
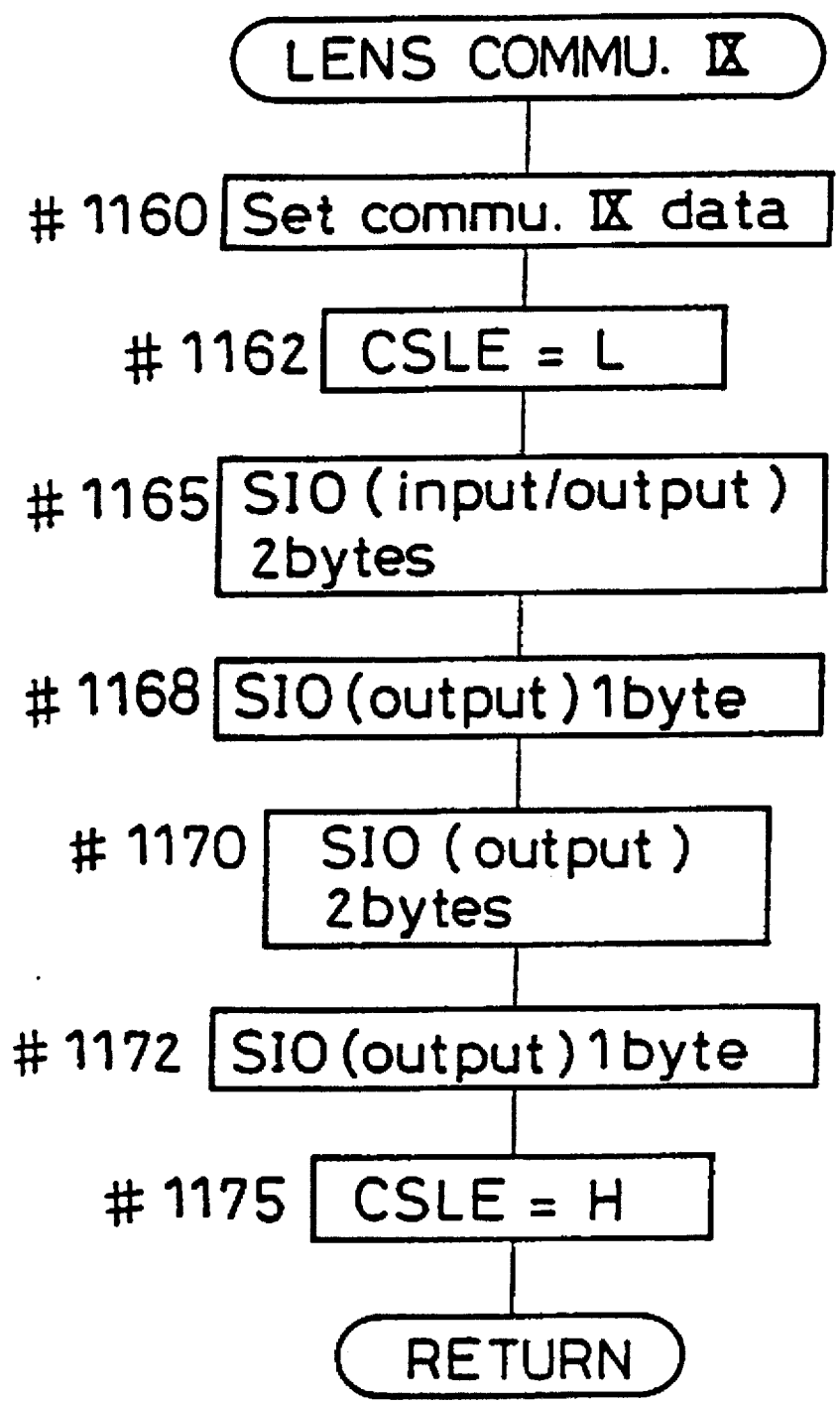

The subroutine LENS COMMUNICATION IX is shown in FIG. 38. When the subroutine is called, first, the data showing that the present mode is Mode IX are set, the level of the terminal CSLE is changed to low, and a two-byte serial input/output is performed to determine the types of the camera body and lens (step #1160 to #1165). Then, one-byte data are serially outputted to the in-lens microcomputer μC2 to show that the present mode is Mode IX, and after a serial output of two-byte data to inform about the condition of the camera body and a serial output of one-byte data to transmit the target focal length $f_t$ are performed to the in-lens microcomputer μC2, the level of the terminal CSLE is changed to high, and the process returns (steps #1168 to #1175).

Returning to the flow chart shown in FIG. 27, the description of the subroutine 1.4× ZOOM will be continued. After the target focal length $f_t$ is transmitted in the above-described subroutine LENS COMMUNICATION IX, while the subroutine LENS COMMUNICATION III is repeated at 10-msec intervals, the process waits until the flag ZMVF, showing that the zoom lens unit is being moved, is reset (steps #818 to #825). When the flag ZMVF is reset, it is determined that the zoom lens unit has been moved, from the position where the present focal length $f_N$ is obtained, until the target focal length $f_t$ is realized and has stopped. Then, the flag ITGTF, for instructing the inputting of the lens data changed in the zooming operation, is set, and the process returns (step #828).

Returning to the flow chart shown in FIG. 14, the description of the subroutine S1ON will be continued. When the process returns from the subroutine 1.4× ZOOM at step #380, the zooming of 1.4× has been completed. Therefore, in order to improve the accuracy of the focus detection after the zooming, a sequence for a focus detection (from step #330) is executed.

Now, a change of a defocus amount by the zooming of 1.4× will be described. By the Newton's approximation formula, the relation between a defocus amount and a focal length is expressed as follows:

$$x \cdot D = f^2 \quad (1)$$

where:

x represents a defocus amount [mm] from infinity;

D represents a distance [mm] to an object; and f represents a focal length [mm] of a taking lens unit.

After the zooming of 1.4× is performed, the focal length f'=1.4f. Therefore, by replacing the f of the equation (1) with f', $$x \cdot D = (1.4f)^2 = 1.96 f^2 \quad (2)$$

is obtained. Thus, if it is considered that the distance D to an object is fixed, the defocus amount $x$ from infinity is enlarged approximately twice.

In order to avoid the deterioration of the focusing accuracy (focus detection accuracy), the sequence for the focus detection from step #330 is executed. When the subroutine AF CONTROL (see FIG. 15) is again called in the sequence for the focus detection, since the flag ITGTF, for instructing the transmission of the data on a starting timing for the CCD integration, has been set, the subroutine LENS COMMUNICATION IV is executed in the subroutine TRS at step #450. After the CCD integration and data dump, the subroutine LENS COMMUNICATION VI is executed to input the lens data changed in the zooming operation, and the focus detection is performed by use of the lens data (steps #450 to #465). Then, the process proceeds to step #478. Since the flag AWNF, showing that the present mode is the auto wide mode, has not been set, the process proceeds directly to step #485. Since the flag S2ONF, showing that the sequence from S2ON is being executed, has been set, the result of the determination at step #485 is "Yes", and the process proceeds to step #490. At step #490, whether or not the contrast is low in the focus detection is determined. When the contrast is determined not to be low, the process returns; when it is determined to be low, a subroutine S2 LOW CONTRAST is executed (step #495).

Figure 28:
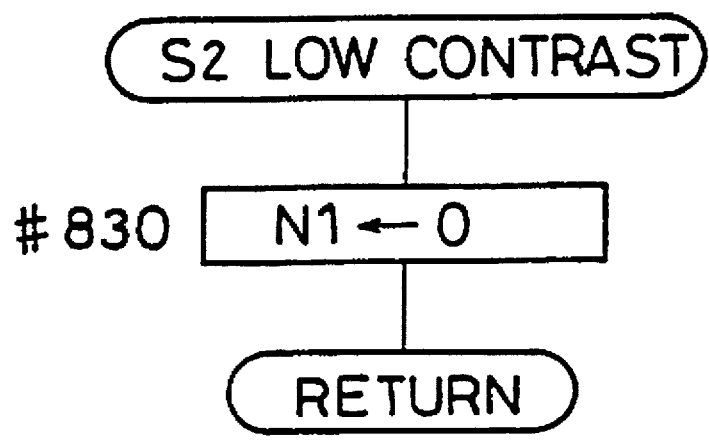

The subroutine S2 LOW CONTRAST is shown in FIG. 28 When the subroutine S2 LOW CONTRAST is called, the AF lens unit drive pulse count N1 is set to 0, and the process returns (step #830). This indicates that the AF lens unit is not moved during the release operation. Although the AF lens unit is moved during the release operation in order to improve the accuracy of focusing when a focal point can be detected, it is not moved during the release operation when a focal point cannot be detected.

Returning to the flow chart shown in FIG. 14, the description will be continued from where the process returns from the subroutine AF CONTROL (step #330) in the sequence for the focus detection. After the focus detection, the luminance on the image plane has been changed. Therefore, after the process returns from the subroutine AF CONTROL, the focus detection is performed and the information on the detection is displayed (steps #332 to #340). Since the flag S2ONF has been set at this time, the result of the determination at the succeeding step #350 is "Yes", and the process proceeds to step #400, where the exposure control is started.

When the sequence for the exposure control is started, first, the interrupt CSLEINT is inhibited so that the interrupt of the power zoom by the in-lens microcomputer μC2 is not executed, and the flag S2ONF is reset (steps #400 and #405). Then, a subroutine EXPOSURE CONTROL is executed (step #410).

Figure 29:
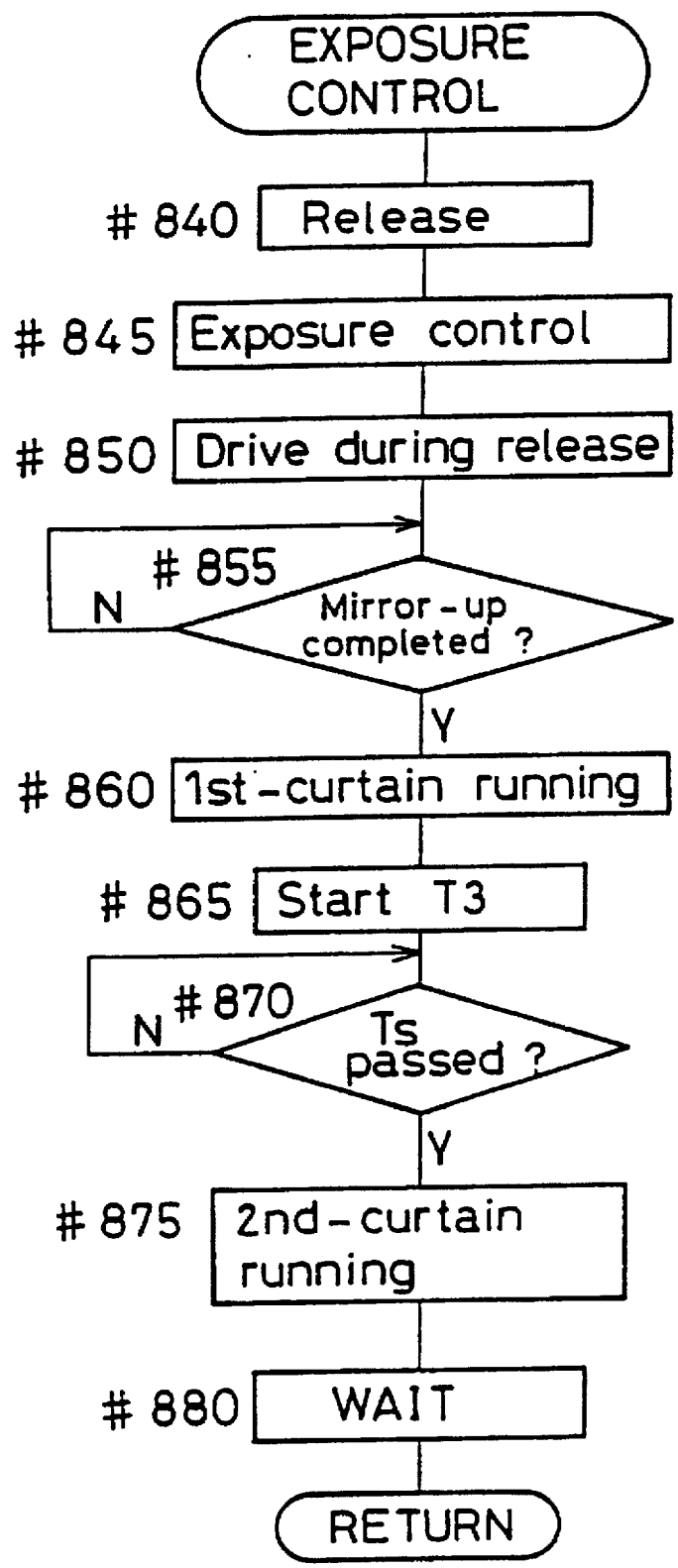
FIG. 29 is a flow chart showing a subroutine EXPOSURE CONTROL.

The subroutine EXPOSURE CONTROL is shown in FIG. 29. When the subroutine EXPOSURE CONTROL is called, first, a predetermined control signal is outputted in order to control the release (step #840). Thereby, engaged portions (not shown) are disengaged, and the release operations such as the mirror-up operation is performed. Then, the aperture is closed until the control aperture value AV is realized (step #845). During the release operation, the AF lens unit is moved by the amount corresponding to the defocus amount obtained in the last focus detection, and the process waits until the AF lens unit is stopped (step #850). Then, at step #855, the process waits until the mirror-up operation is completed, and when the mirror-up operation is completed, the first curtain running of the focal plane shutter is effected (step #860). Then, a timer T3 for counting the exposure time is started, and the process waits until an actual exposure time $T_S$, corresponding to the shutter speed TV, passes (steps #860 to #870). After the exposure time $T_S$ have passed, the second-curtain running of the shutter is allowed. And, after waiting until the running of the second curtain is completed, the process returns (steps #875 and #880).

Returning to the flow chart shown in FIG. 14, the description of the subroutine S1ON will be continued. When the process returns from the above-described subroutine EXPOSURE CONTROL (step #410), the film is advanced by one frame for the next photographing. After the process waits for five seconds, the flag S1ONF is reset to show that the photographing is completed (steps #415 to #420). Then, the interrupts S1INT and CSLEINT are permitted to enable interrupt by the power zoom or by the turning on of the taking switch S1 (step #425).

Now, the effects of the wide view mode will be described.

Firstly, an area larger than the taking area can be viewed since the taking frame FD2 is displayed within the finder (see FIG. 5). Consequently, it becomes easier to grasp a taken scene. Especially, when a picture of a moving object is taken, the wide view mode is convenient since it becomes easier to follow the object. Secondly, even when the eye point is high, it becomes possible to view the whole taking area. Thirdly, if the taking frame FD2 is formed with a member such as liquid crystal by which the taking frame FD2 can be turned on or off, the wide view mode can be set when it is necessary or when the user wants to set it.

Returning to the flow chart shown in FIG. 10, the case where the main switch $S_M$ is determined not to be ON at step #20 will be described. When the switch $S_M$ is not ON, the process proceeds to step #80, where interrupts other than the interrupt SMINT by the turning on of the main switch $S_M$ are inhibited. Then, at step #85, whether or not the flag RSTF, showing that the battery has been attached, has been set is determined. When the flag RSTF has not been set, it is determined that this flow is executed by the turning off of the main switch $S_M$. Accordingly, a flag SMOFF showing the execution of this flow is set, and the subroutine AF LENS UNIT MOVE-IN is executed (steps #87 and #90). In the subroutine AF LENS MOVE-IN, the AF lens unit is moved to the nearest position, (which will not be described here since it has already been described). Then, whether or not the lens is of old type is determined at step #92. When it is not of old type, the subroutine ZOOM LENS UNIT MOVE-IN is executed (step #100). By executing the subroutines AF-LENS UNIT MOVE-IN and ZOOM LENS UNIT MOVE-IN, the AF lens unit and the zoom lens unit are moved to the most moved-in position, at which the size (length) of the whole camera system including the lens is minimum. Then, after the subroutine LENS COMMUNICATION III is executed, whether or not the in-body microcomputer µC1 can enter the sleep condition is determined based on data inputted from the in-lens microcomputer µC2 (steps #105 and 110). When the in-body microcomputer µC1 enters the sleep condition, the power supply from the lens to the zoom motor M3 is cut off. Therefore, since the in-body microcomputer µC1 cannot enter the sleep condition when the lens controls the moving-in of the zoom lens unit, the process waits for 50 msec at step #115, and returns to step #105. Then, the subroutine LENS COMMUNICATION III is again executed, and the determination of step #110 is repeated. When the control of the moving-in of the zoom lens unit by the in-lens microcomputer µC2 is completed, it is determined that the in-body microcomputer µC1 can enter the sleep condition at step #110. Then, the level of the power control terminals PW1 and PW2 is changed to low to turn off the transistors Tr1 and Tr2 for supplying power to the circuits on the camera side and to the zoom motor M3; the level of the terminal PW0 is changed to low to turn off the DC/DC converter DD; and the interrupts other than the interrupt SMINT by the turning on of the main switch $S_M$ are inhibited. Thereafter, the process enters the sleep (halt) condition (steps #120 to #130).

When the flag RSTF has been set at step #85, or when the lens is determined to be of old type at step #92, the process proceeds to step #93, where the flag RSTF, showing that the battery has been attached, is reset. Then, the process executes steps from #120 to enter the sleep (halt) condition.

Next, the software employed for the in-lens microcomputer µC2 will be described.

When the lens is not attached to the camera body, the lens attachment detection switch $S_{LE}$, shown in FIG. 4, is turned on, and the level of the reset terminal RE2 of the in-lens microcomputer µC2 is maintained to be low. Therefore, the circuits on the lens side are not activated. When the lens is attached to the camera body, the lens attachment detection switch is turned off, and a signal, for changing the level of the reset terminal RE2 from low to high, is inputted, whereby the in-lens microcomputer µC2 executes the routine RESET shown in FIG. 39. In the routine RESET, firstly, the ports and resisters are reset (step #L5), at which the entering of an APZ mode and sleep condition is enabled. Then, the subroutine ZOOM LENS UNIT MOVE-IN is executed (step #L15). The above-mentioned APZ mode is a mode where the zoom lens unit is automatically moved until the focal length instructed by the in-body microcomputer µC1 is realized.

Figure 40:
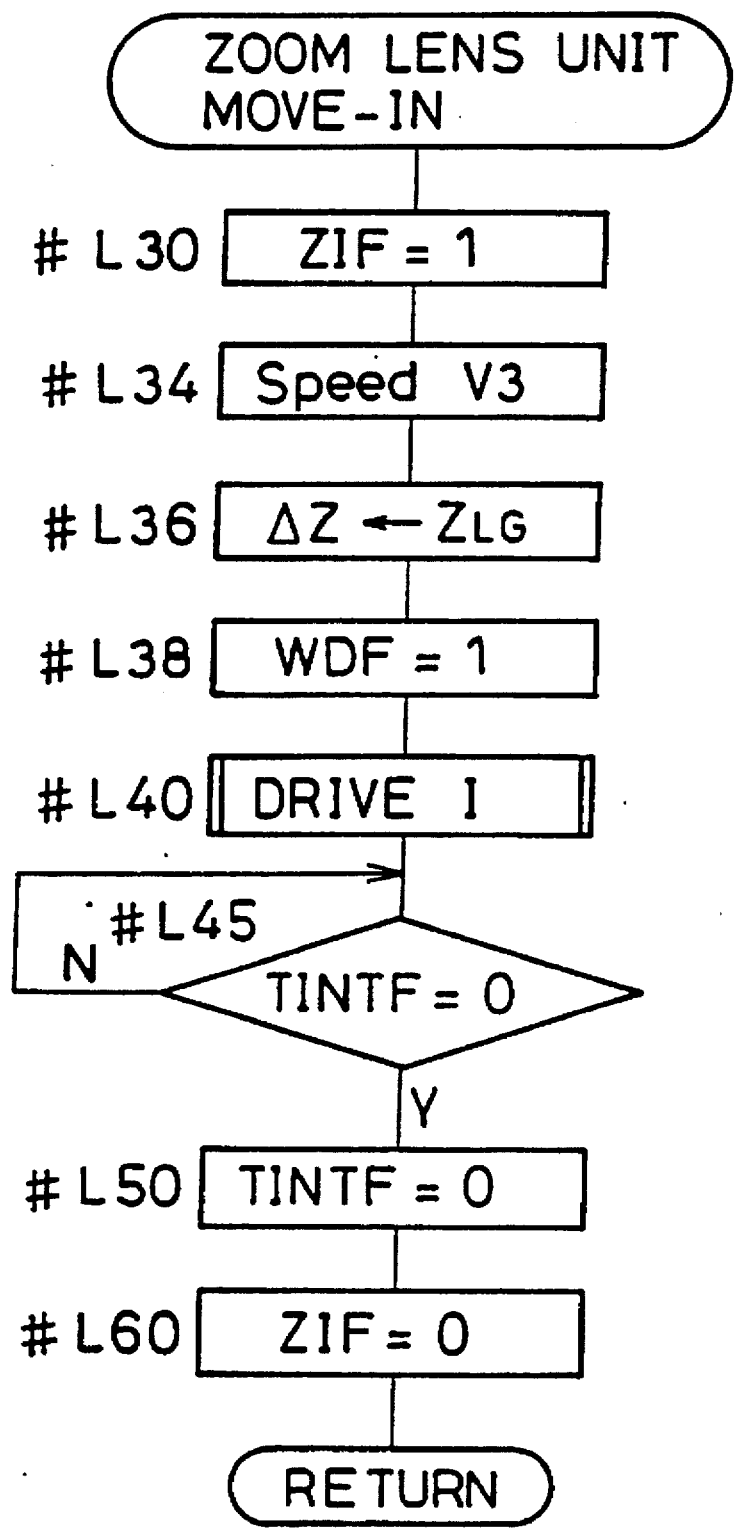

The above-mentioned subroutine ZOOM LENS UNIT MOVE-IN is shown in FIG. 40. When the subroutine ZOOM LENS UNIT MOVE-IN is called, first, a flag ZIF showing the zoom lens unit move-in mode is set, and the speed of the moving-in of the zoom lens unit is set to the maximum speed V3. Then, after a large value $Z_{LC}$ is set as the movement amount, a flag WDF, showing that the zoom lens unit is moved in the WIDE direction, is set, and the subroutine DRIVE I is executed to move the zoom lens unit (steps #L30 to #L40). The subroutine DRIVE I will be described later. Subsequently, at step #L45, the process waits until a flag TINTF, showing that the timer interrupt is applied, is set. The timer interrupt is generated when the zoom lens unit reaches the endmost position.

Figure 41:
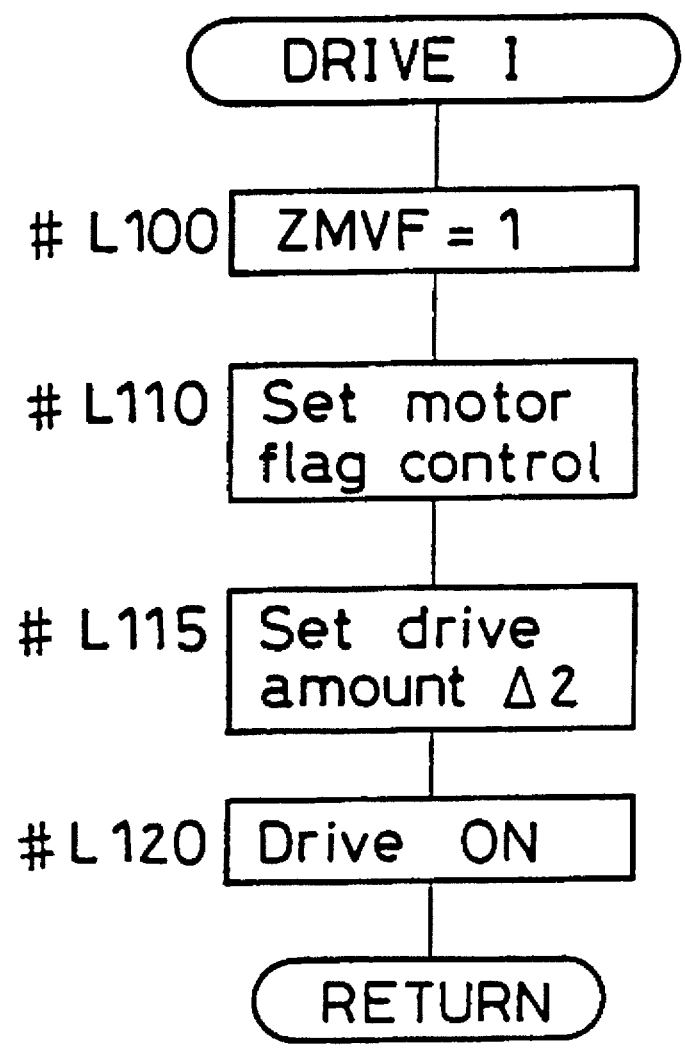
FIG. 41 is a flow chart showing a subroutine DRIVE I for starting the driving of the zoom lens unit.

Now, the above-mentioned subroutine DRIVE I will be described referring to FIG. 41. In this subroutine, the zoom lens unit is moved by the zoom motor M3 (see FIG. 4). When the subroutine DRIVE I is called, first, the flag. ZMVF, showing that the zoom lens unit is being moved, is set (step #L100). Then, the flags for controlling the motor are set, and a drive amount (zoom drive pulse count) ΔZ is set. Thereafter, the power supply to the motor is started, and the process returns (steps #L110 to #L120). The module for driving the zoom lens unit (not shown since it bears no direct relation to the present invention) controls the movement of the zoom lens unit by use of the counter and timer interrupts, similarly to the above-described module for driving the AF lens unit. That is, the counter interrupt is applied every time the pulse, showing that the zoom lens unit is being moved, is transmitted from the zoom encoder ENC3 (see FIG. 4) which detects the rotation amount of the zoom motor M3, and while controlling the zoom speed by use of the counter interrupt, the module pulse-drives the zoom lens unit through the zoom motor M3 by the amount ΔZ. After the pulse-driving by the amount ΔZ is completed, the power supply to the zoom motor M3 is stopped, and the flag ZMVF is reset. Moreover, when the pulse generation from the encoder ENC3 is stopped even if the zoom motor M3 is supplied with power before the pulse-driving of the zoom lens unit, by the amount Δ is completed, the timer interrupt is generated. By the timer interrupt, it is determined that the zoom lens unit has reached the endmost position, and the subroutine STOP ZOOM LENS UNIT is executed. After the timer interrupt is inhibited, the flag TINTF is set.

Figure 42:
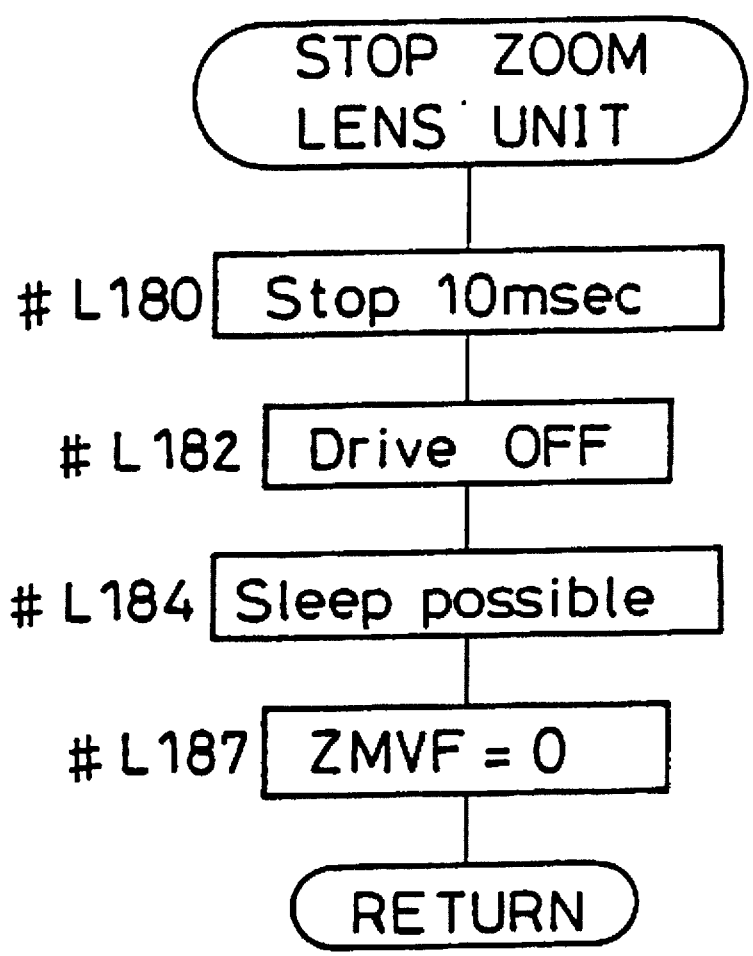
FIG. 42 is a flow chart showing a subroutine STOP ZOOM LENS UNIT.

The above-mentioned subroutine STOP ZOOM LENS UNIT is described referring to FIG. 42. When the subroutine STOP ZOOM LENS UNIT is called, first, stop signals are outputted to the motor drive circuit MD3 for 10 msec (step #L180). Thereafter, drive off signals are outputted to permit the sleep condition, the flag ZMVF, showing that the zoom lens unit is being moved, is set, and the process returns (steps #182 to #187).

Returning to the flow chart shown in FIG. 40, the description of the subroutine ZOOM LENS UNIT MOVE-IN will be continued from seep #L45. After the zoom lens unit is stopped and the flag TINTF showing the timer interrupt is set as described above, the result of the determination at step #L45 is "Yes", and the process proceeds to step #L50, where the above flag TINTF is reset. Then, the flag ZIF, showing that the zoom lens unit is being moved-in, is set, and the process returns (step #L60).

Figure 39:
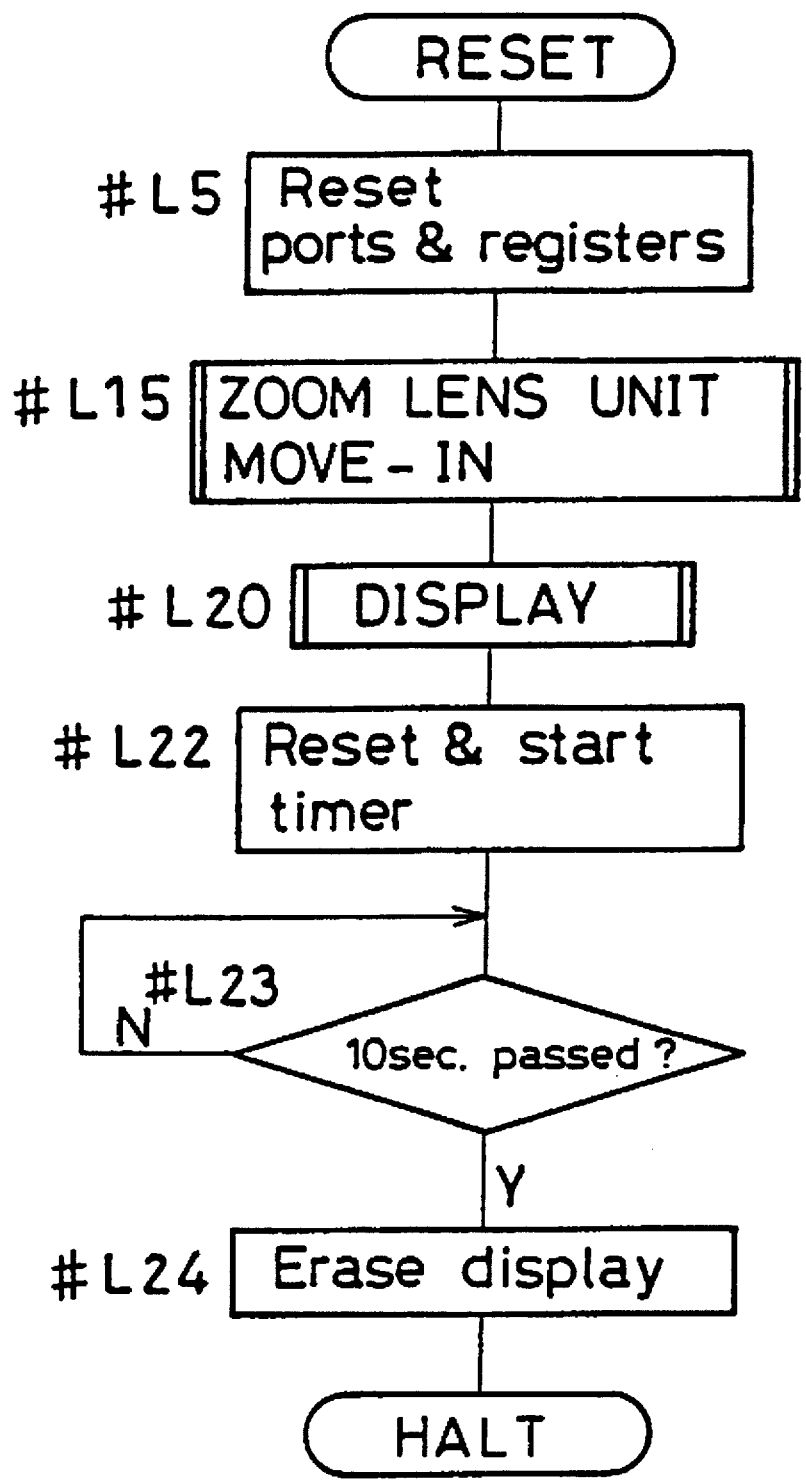
FIG. 39 is a flow chart showing a routine RESET of the in-lens microcomputer μC2 of the camera system.

Returning to the flow chart shown in FIG. 39, the description of the subroutine RESET will be continued from the step #L20. After the moving-in of the zoom lens unit is completed, the subroutine DISPLAY for displaying the information on the lens is executed. Then, after a timer T for maintaining the power source is reset, it is re-started, and the process waits for 10 seconds. After the 10 seconds, the display is erased, and the process halts (steps #20 and #L24).

Figure 43:
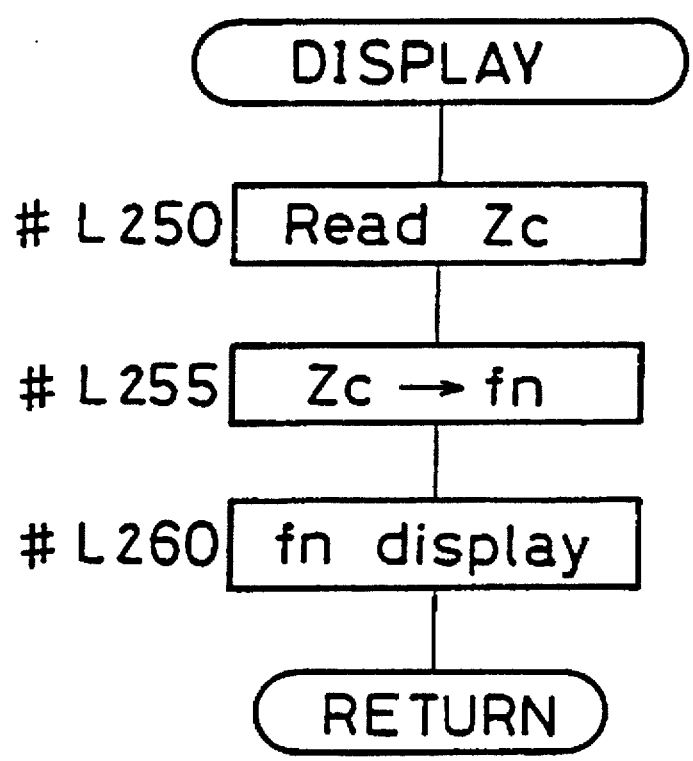
FIG. 43 is a flow chart showing a subroutine DISPLAY for displaying the information on the lens.

The above-mentioned subroutine DISPLAY is shown in FIG. 43. When the subroutine DISPLAY is called, a count value Zc of a zoom counter ZC for counting the pulses generated by the zoom encoder ENC is read. Then, the correct present focal length $f_n$ is obtained from the count value Zc. After the present focal length $f_n$ is displayed, the process returns (steps #L250 to #L260).

Figure 44:
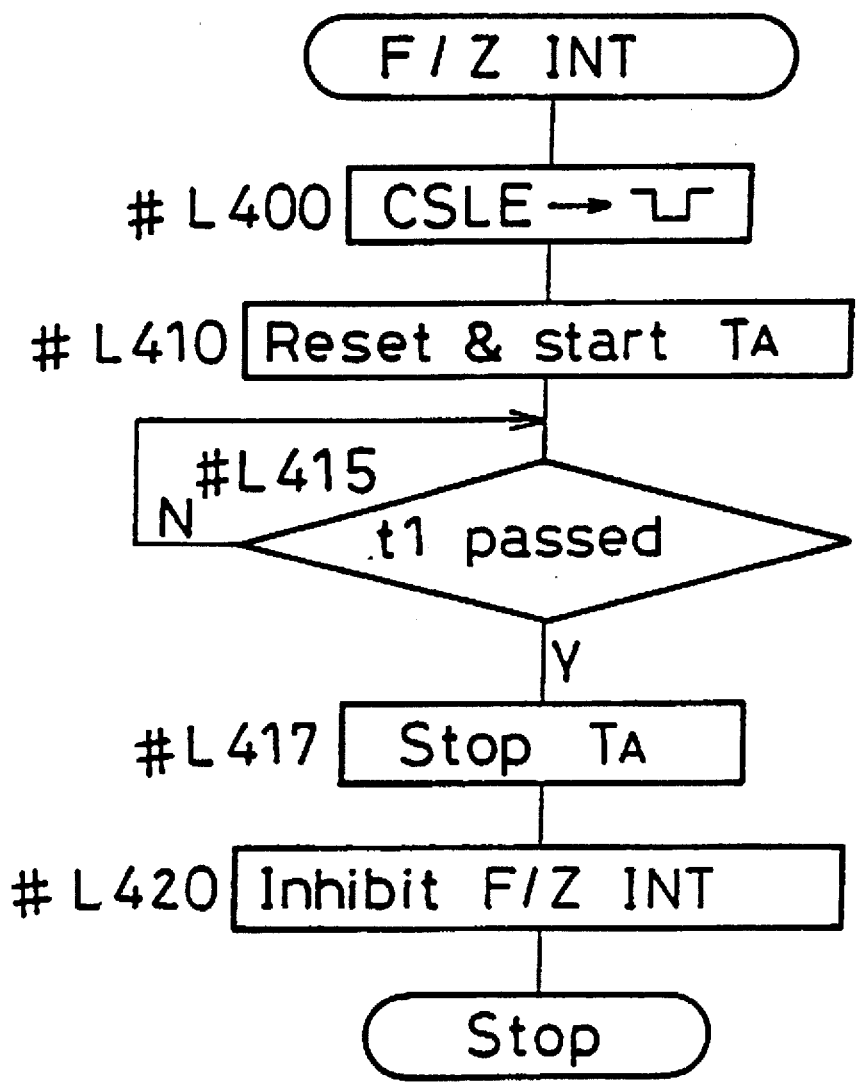
FIG. 44 is a flow chart showing a subroutine F/INT.

Next, the processes in the power zooming operation will be described. If the operation ring (zoom ring) 80 is operated when the in-body and in-lens microcomputers µC1 and µC2 are stopped or when a body of old type is used and the in-lens microcomputer µC2 is halted, a subroutine F/ZINT is executed. The subroutine F/ZINT is shown in FIG. 44. When the interrupt F/ZINT is generated, the in-lens microcomputer µC2 firstly changes the level of the terminal CSLE low for an instant to execute an interrupt to the in-body microcomputer µC1 (step #L400). Then, a timer TA is reset and re-started, and the process waits until the timer TA counts a time $t_1$ (steps #L410 and #L415). It is in order to determine whether or not the lens is of old type at the in-body microcomputer µC1 that the process waits until the timer TA counts the time $t_1$. When the lens is not of old type, after the above interrupt to the in-body microcomputer µC1 is applied, the level of the terminal CSLE is changed to low by the in-body microcomputer µC1 to perform the data communication (lens communication). In response to this, by the in-lens microcomputer µC2, a CS interrupt (to be described later) is executed and another flow is executed before the timer TA counts the time $t_1$. When the main switch $S_M$ on the camera body is OFF, the above-mentioned data communication (lens communication) is not executed. Also, when the camera body is of old type, the data communication (lens communication) is not executed. Because of this, the CS interrupt is not applied even if the level of the terminal CSLE is changed to low for an instant at step #L400, and the timer TA completes counting the time $t_1$. When the timer TA is determined to complete counting the time $t_1$ at step #415, the timer TA is stopped, the F/ZINT interrupt generated by the operation of the operation ring 80 is inhibited, and the process halts (steps #L417 and #L420).

Next, the processes when the CS interrupt is applied will be described. When a signal whose level is changed from high to low is transmitted from the in-body microcomputer µC1 to the terminal CSLE of the lens, the in-lens microcomputer µC2 executes a subroutine CS INTERRUPT shown in FIG. 45. In the subroutine, first, the F/ZINT interrupt generated by the operation of the operation ring (zoom ring) 80 is inhibited, and in response to the clocks generated from the in-body microcomputer µC1, the two-byte serial data communication (serial input/output) is performed. From the communication data, whether or not the camera body is of old type is determined. When the camera body is of old type, a six-byte serial data communication is performed to transmit the lens data to the in-body microcomputer µC1. Then, the process waits until the level of the signal sent to the terminal CSLE is changed to high, and halts when it is changed to high (steps #L565 to #L575). Although a flow chart responding to this communication for the in-body microcomputer µC1 is not shown since the new camera body is described in this embodiment, the above-described steps #L565 to #L575 enables the employment of the new lens for the old camera body. On the other hand, when the camera body is determined not to be of old type at step #L565, the data showing the communication mode is inputted from the in-body microcomputer µC1 though the one-byte serial data communication, and the communication mode is determined (steps #L585 and #L590). Then, according to the result of determination of the communication mode, the following processes (the processes respectively corresponding to the lens communications I to IX in the in-body microcomputer µC1) are executed.

When the communication mode is Mode I: the two-byte body condition data (Table 3) are serially inputted; the process waits until the level of the signal sent to the terminal CSLE is changed from low to high; when the level is changed to high, after the subroutine ZOOM LENS UNIT MOVE-IN is executed, the subroutine DISPLAY is executed; and the process returns (steps #L600 to #L615). Before the process returns, the interrupt F/ZINT is permitted. It is in order to confirm that the communication between the in-lens microcomputer µC2 and in-body microcomputer µC1 is completed that the process waits until the level of the signal sent to the terminal CSLE is changed from low to high. Thereby, the ocher processes are prevented from being executed during the communication between the in-lens microcomputer µC2 and in-body microcomputer µC1. The above-described confirmation of completion of the communication and the permission of the F/ZINT interrupt are performed similarly in the other communication modes.

When the communication mode is Mode II: after the two-byte data, the same as those inputted in Mode I, are inputted, the process waits until the level of the signal sent to the terminal CSLE is changed from low to high; when the level is changed to high, after the subroutine STOP ZOOM LENS UNIT (shown in FIG. 42) is executed, the subroutine DISPLAY (shown in FIG. 43) is executed; and the process returns (steps #L620 and #L635). The communications in Mode II is executed when the in-body microcomputer µC1 commands the in-lens microcomputer µC2 to stop.

When the communication mode is Mode III: the lens condition data (Table 2) are set to serially output the two-byte data: the process waits until the level of the signal sent to the terminal CSLE is changed from low to high; and when the level is changed to high, the process returns (steps #L640 to #L650). The communications in Mode III is executed when the in-body microcomputer µC1 detects the condition (being driven, halting, etc.) of the lens.

When the communication mode is Mode IV, which is a mode for calculating the lens data at the present focal length $f_n$, the lens data is transmitted to the in-body microcomputer µC1 in the succeeding Mode VI. Therefore, when the communication mode is Mode IV: the two-byte body condition data (Table 3) are serially inputted; the process waits until the level of the signal sent to the terminal CSLE is changed from low to high; and when the level is changed to high, the lens data changed in a zooming operation is calculated, and the process returns (steps #L660 to #L670).

Figure 46:
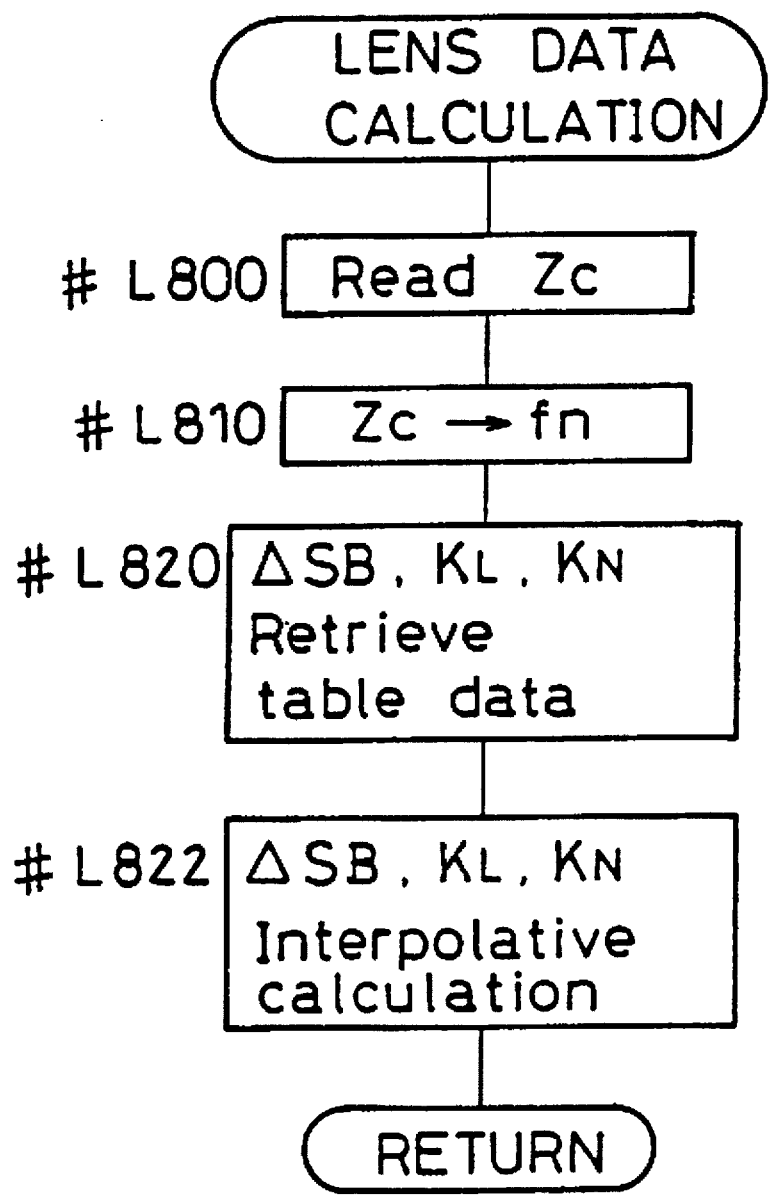
FIG. 46 is a flow chart showing a subroutine LENS DATA CALCULATION.

A subroutine LENS DATA CALCULATION is shown in FIG. 46. When the subroutine LENS DATA CALCULATION is called, first, the count value Zc of the zoom counter is read-in and converted into the present focal length $f_n$ (steps #L800 to #L810). Thereafter, the lens data which have direct influence on the focus detection value, that is, the optical position difference ΔSB between the film surface and AF sensor surface, the drive amount converting coefficient $K_L$ and the distance converting coefficient $K_N$ are obtained. In order to obtain these lens data, the table is retrieved where the lens data situated at every 20 pulses of the zoom counter are stored (step #L820). Then, by performing an interpolative calculation by use of the lens data obtained in the retrieval, lens data with high accuracy are obtained (step #L822).

When the communication mode is Mode V, which is a mode where after the lens data at the present focal length $f_n$ are calculated similarly in Mode IV, the zoom lens unit is moved until the target focal length $f_t$ instructed from the in-body microcomputer μC1 is realized: three byte-data consisting of the two-byte body condition data (Table 3) and the one-byte data on the target focal length $f_t$ are serially inputted; the process waits until the level of the signal sent to the terminal CSLE is changed from low to high; when the level is changed to high, the lens data changed in a zooming operation is calculated; a subroutine APZ is executed; and the process returns (steps #L680 to #L695). The subroutine APZ will be described later in the description of Mode IX.

When the communication mode is VI, which is a mode where the lens data calculated in Mode IV or V are transmitted to the in-body microcomputer μC1 after the communications in these Modes IV and V are performed: after the two-byte lens condition data (Table 2) are serially outputted, the lens data changed in a zooming operation and calculated in Mode IV or V, that is, four-byte data consisting of the present focal length $f_n$, the optical position difference ΔSB between the film surface and AF sensor surface, the drive amount converting coefficient $K_L$, and the distance converting coefficient $K_N$ are serially outputted (steps #L700 to #L712); the process waits until the level of the signal sent to the terminal CSLE is changed from low to high; and when the level is changed to high, the process returns (step #L715).

When the communication mode is Mode VII, where all the data that are particular to the lens are transmitted to the in-body microcomputer μC1: after the two-byte lens condition data (Table 2) are serially outputted, nine-byte data consisting of the minimum and maximum focal lengths $f_{min}$ and $f_{max}$ of the lens and the conventional lens data such as $AV_o$, $AV_{MAX}$, $K_L$, $f_n$, $L_{ON}$, $K_N$, and ΔSB are serially outputted (steps #L720 to #L732); the process waits until the level of the signal sent to the terminal CSLE is changed from low to high; and when the level is changed to high, the process returns (step #L735).

When the communication mode is Mode VIII, where the data on the permission of zooming against the F/ZINT interrupt applied by the power zooming operation (zoom ring operation) is transmitted from the in-body microcomputer μC1 to the in-lens microcomputer μC2: after the two-byte body condition data (Table 3) are serially inputted, the process waits until the level of the signal sent to the terminal CSLE is changed from low to high; when the level is changed to high, a subroutine MPZ is executed; and the process returns (steps #L740 to #L750).

Figure 47:
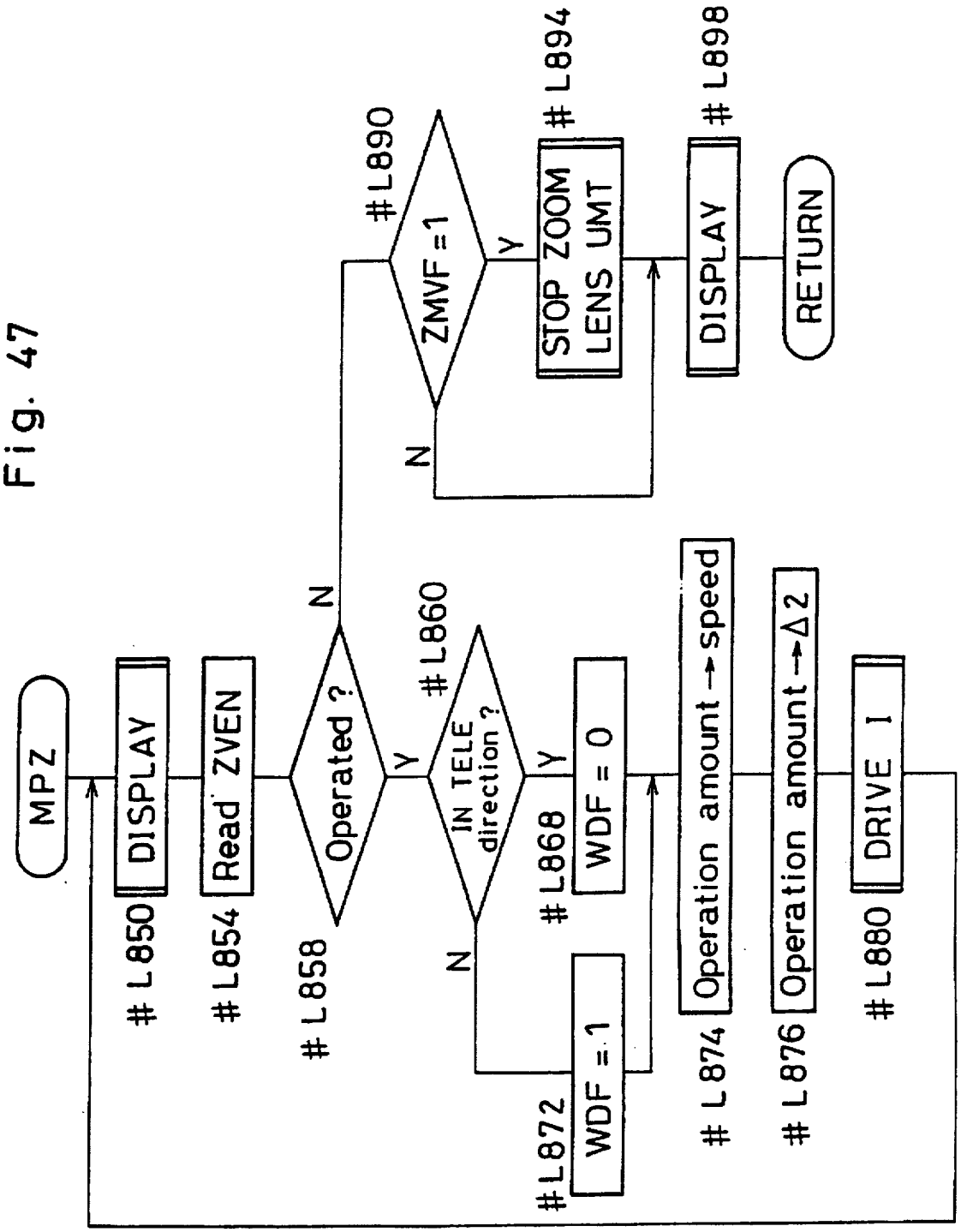
FIG. 47 is a flow chart showing a subroutine MPZ for performing a zooming operation according to the operation of the zoom ring.

The subroutine MPZ is shown in FIG. 47. When the subroutine is called, first, the focal length is displayed, the value of the encoder pattern ZVEN (see FIG. 4) arranged on the circumference of the zoom ring is read-in, and whether or not the zoom ring has been operated is determined (steps #L850 to #L858). When the zoom ring has no been operated, the process proceeds to step #L890, where whether or not the flag ZVMF, showing that the zoom lens unit is being moved, has been set is confirmed. When the flag ZMVF has been set, the zoom lens unit is stopped. When it has not been set, only the display is performed without the subroutine STOP ZOOM LENS UNIT being executed, and the process returns (steps #L890 to #L898). On the other hand, when the zoom ring is determined to have been operated at step #858, the process proceeds to step #860, where whether or not the zoom ring has been turned in the TELE direction (the telephoto direction) is determined. When the zoom ring has been turned in the TELE direction, the flag WDF showing the zooming operation in the WIDE direction is reset; when the zoom ring has not been turned in the TELE direction, the flag WDF is set (steps #L860 to #L872). Then, the operation amount of the zoom ring is read, and according to the operation amount, one of the zoom speeds V1 to V3 is set. Further, after the zoom drive pulse ΔZ in accordance with the operation amount is set, the subroutine DRIVE I is called to start the driving of the zoom lens unit (steps #L874 to #L880). After the driving is started, steps from #L850 to #L880 are repeated. When it is determined that the operation amount of the zoom ring has not existed at step #L858, the zoom lens unit is stopped. Then, the display is performed, and the process returns (steps #L890 to #L898).

When the communication mode is IX, which is the APZ mode where the lens data changed in a zooming operation are not required to be transmitted to the in-body microcomputer μC1 in the succeeding serial data communication (The APZ mode is a mode for automatically moving the zoom lens unit until the focal length instructed by the in-body microcomputer μC1 is realized.): three-byte data consisting of the two-byte body condition data (Table 3) and one-byte data representing the target focal length $f_t$ are serially inputted; the level of the signal sent to the terminal CSLE is changed from low to high; when the level is changed to high, the subroutine APZ is executed; and the process returns (steps #L760 to #770).

Figure 48:
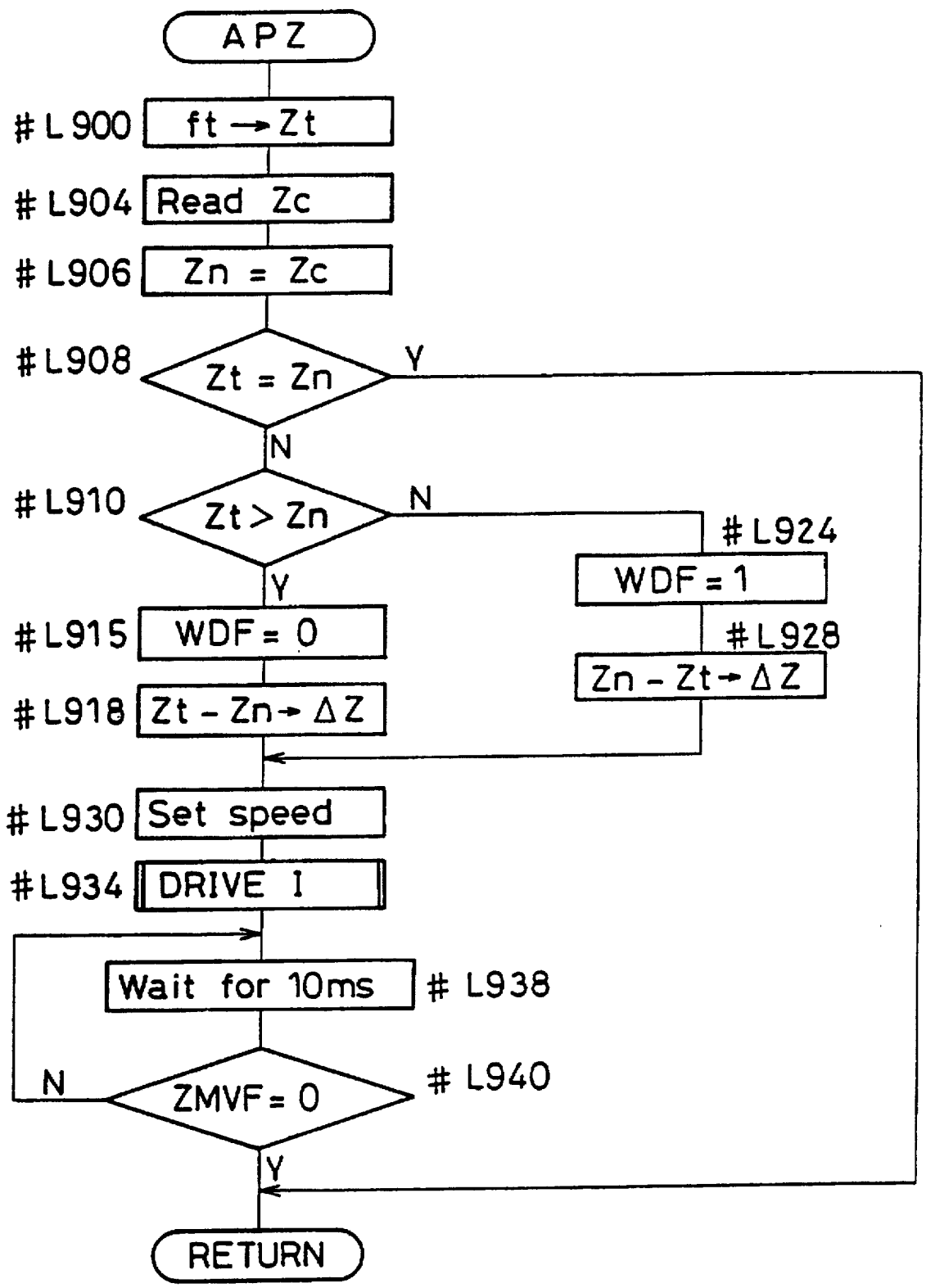
FIG. 48 is a flow chart showing a subroutine APZ for performing a zooming operation according to the instruction of the camera body.

The subroutine APZ is shown in FIG. 48. When the subroutine is called, first, after the target focal length $f_t$ sent from the in-body microcomputer μC1 is converted into a target zoom counter value $Z_t$, a zoom counter value $Z_c$ at that point of time is read-in, and is set as the present zoom counter value $Z_n$ (steps #L900 to #L906). Then, comparing the target zoom counter value $Z_t$ with the present zoom counter value $Z_n$, the zooming direction is determined. However, since the zooming operation is not required when the $Z_t$ coincides with the $Z_n$, the process returns without moving the zoom lens unit (step #L908). When the $Z_t$ does not coincides with the $Z_n$, the process proceeds to step #L910, where whether or not the $Z_t$ is larger than $Z_n$ is determined. When the $Z_t$ is larger than the $Z_n$ the flag WDF showing the zooming in the WIDE direction is reset, and the zoom drive pulse count ΔZ is obtained by $Z_t$-$Z_n$ (steps #L912 to #L918). On the other hand, when the $Z_t$ is not larger than the $Z_n$, the flag WDF is set, and the zoom drive pulse count ΔZ is obtained by $Z_n$-$Z_t$ (steps #920 to #L928). After the zoom drive pulse count ΔZ is obtained, the speed sent as the body condition data (Table 3) is set as the drive speed, and the subroutine DRIVE I is called to start to move the zoom lens unit (steps #L930 and #L934). Here, the zoom speed in the APZ mode can be controlled by the in-body microcomputer μC1, since the speed sent from the in-body microcomputer μC1 is set as the drive speed. After the driving is started, the process waits while detecting every 10 msec. if the flag ZMVF, showing that the zoom lens unit is being moved, has been reset. When the flag ZMVF is reset, the process returns (steps #L938 to #L940). The flag ZMVF is reset, as described above, by the counter or timer interrupt for controlling the driving of the zoom lens unit when the driving is completed.

When the communication in Mode III, for detecting the lens condition while the zoom lens unit is being moved, is generated in the above-described subroutine APZ (shown in FIG. 48) and subroutine MPZ (shown in FIG. 47), the CS interrupt is given priority, since the above communication is responded while the zoom lens unit is being moved.

Figure 45A:
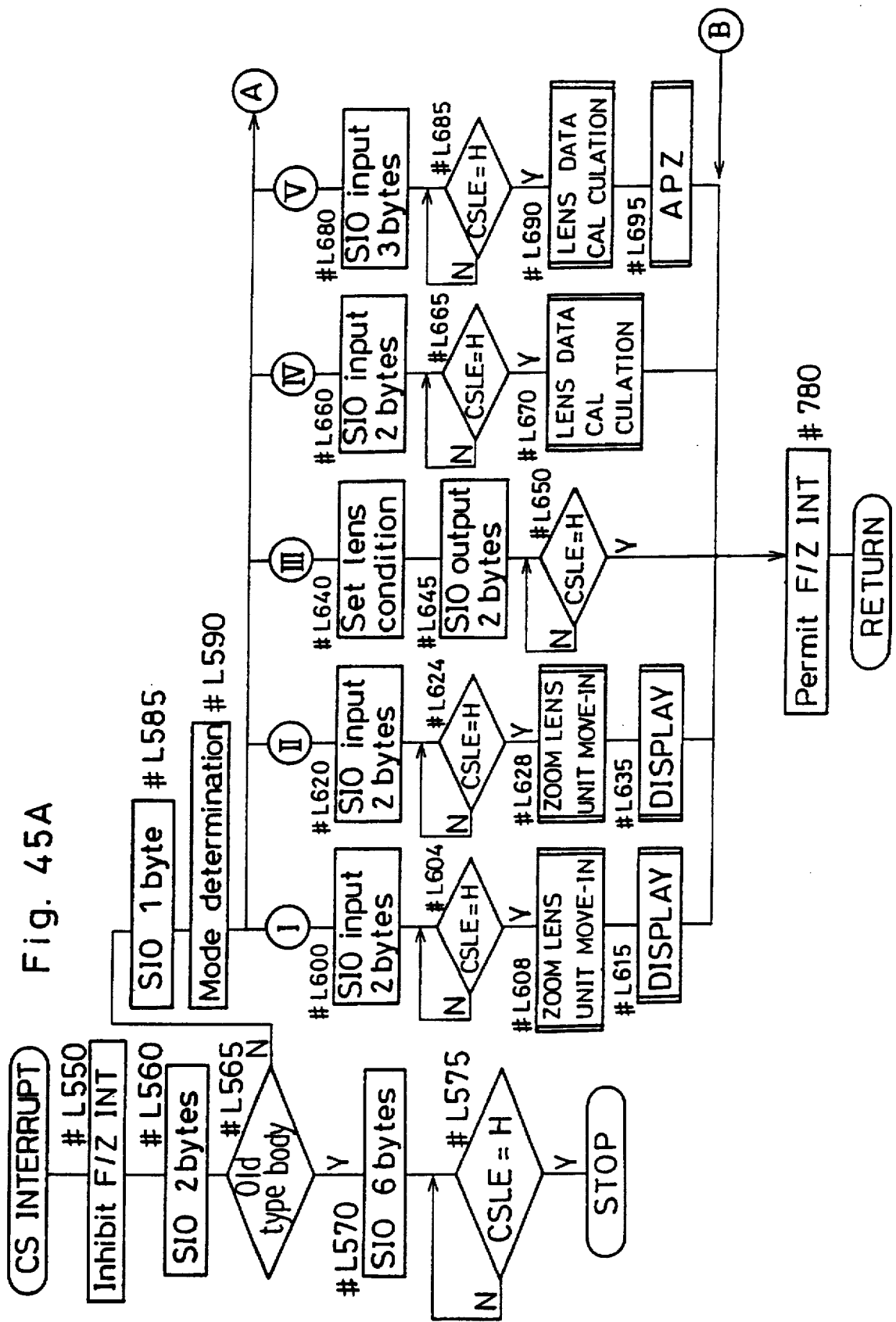
FIG. 45 is a flow chart showing a subroutine CS INTERRUPT.
Figure 45B:
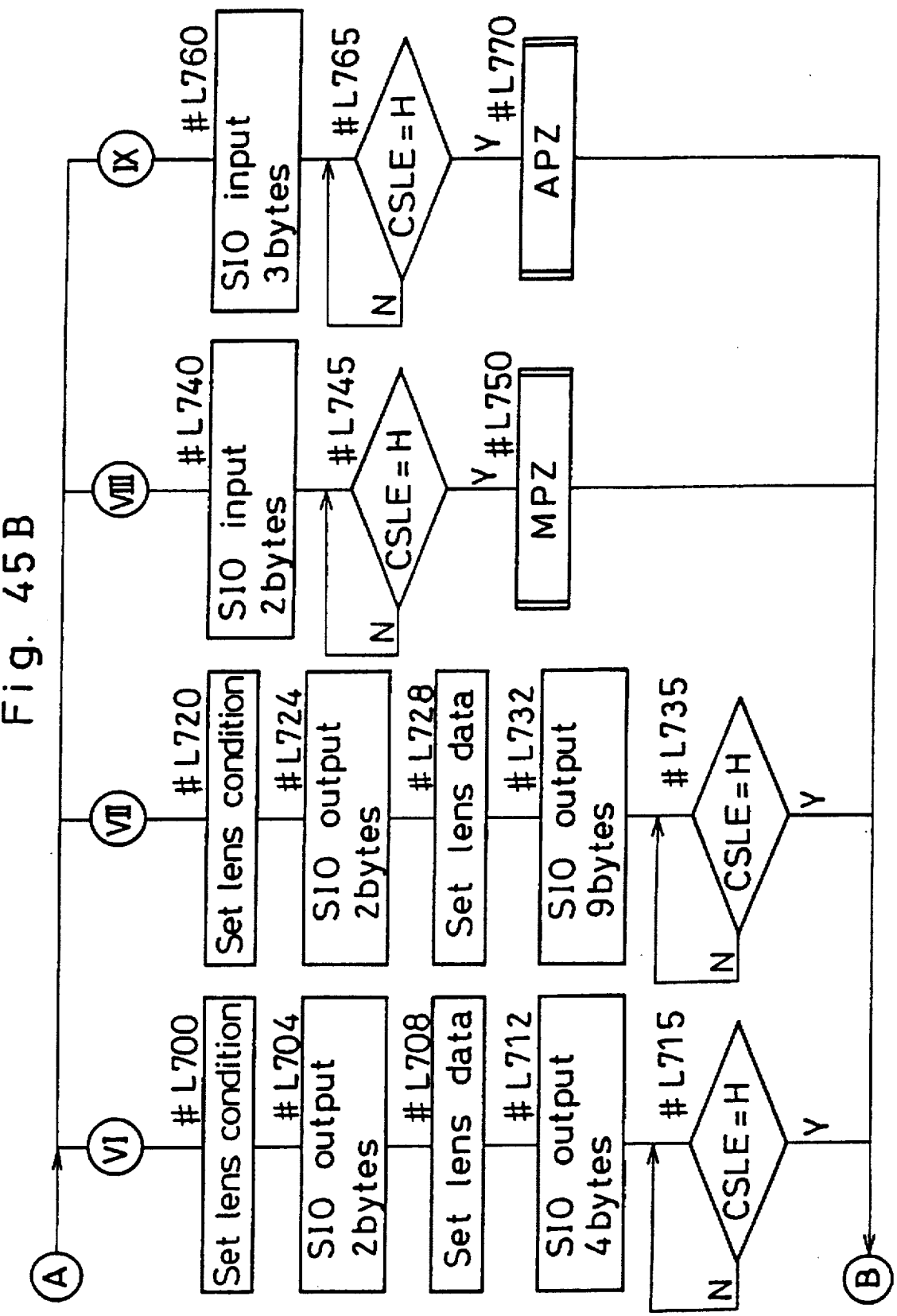

Moreover, as described in the description of the communication in Mode I, when the process returns after performing the serial communications in Modes I to IX and accompanying calculations and zooming operations, the process returns after permitting the F/ZINT interrupt in order to enable the power zoom (step #L780 shown in FIG. 45).

Now, the description of the structure and operations of the present embodiment is finished.

As described above, according to the present embodiment, when the preparation switch (focus detection starting switch) S1 is turned on, the focus detection (focus detection) is performed (steps #450 to #465 shown in FIG. 15). When the focus detection is impossible (steps #605 and 606 shown in FIG. 19), the low contrast scanning is performed (step #505 shown in FIG. 15, and the loop consisting of steps #55→#60→#55 shown in FIG. 10). When the focus detection is enabled during the low contrast scanning, the AF lens unit is moved until the in-focus condition is obtained (steps #520 to #528 in FIG. 15). Then, the photographing operation can be performed in the condition where the angle of view does not change.

On the other hand, in the case where the auto wide function is ON by the operation of the auto wide switch $S_{AW}$, when the focus detection is still impossible after the low contrast scanning (steps #890, #700, and #705 shown in FIG. 22) and the preparation switch S1 is continuously ON (step #385 shown in FIG. 14), the auto wide is started (step #515 shown in FIG. 15). When the focus detection is enabled during the auto wide, the AF lens unit is moved until the in-focus condition is obtained (steps #520 to #528 shown in FIG. 15), and the exposure control operation is performed (steps #400 to #425 shown in FIG. 14). Thereby, the focus detection is enabled within a given range even when an object is situated outside the focus detection area or when the contrast of the object is not sufficient.

Figure 23:
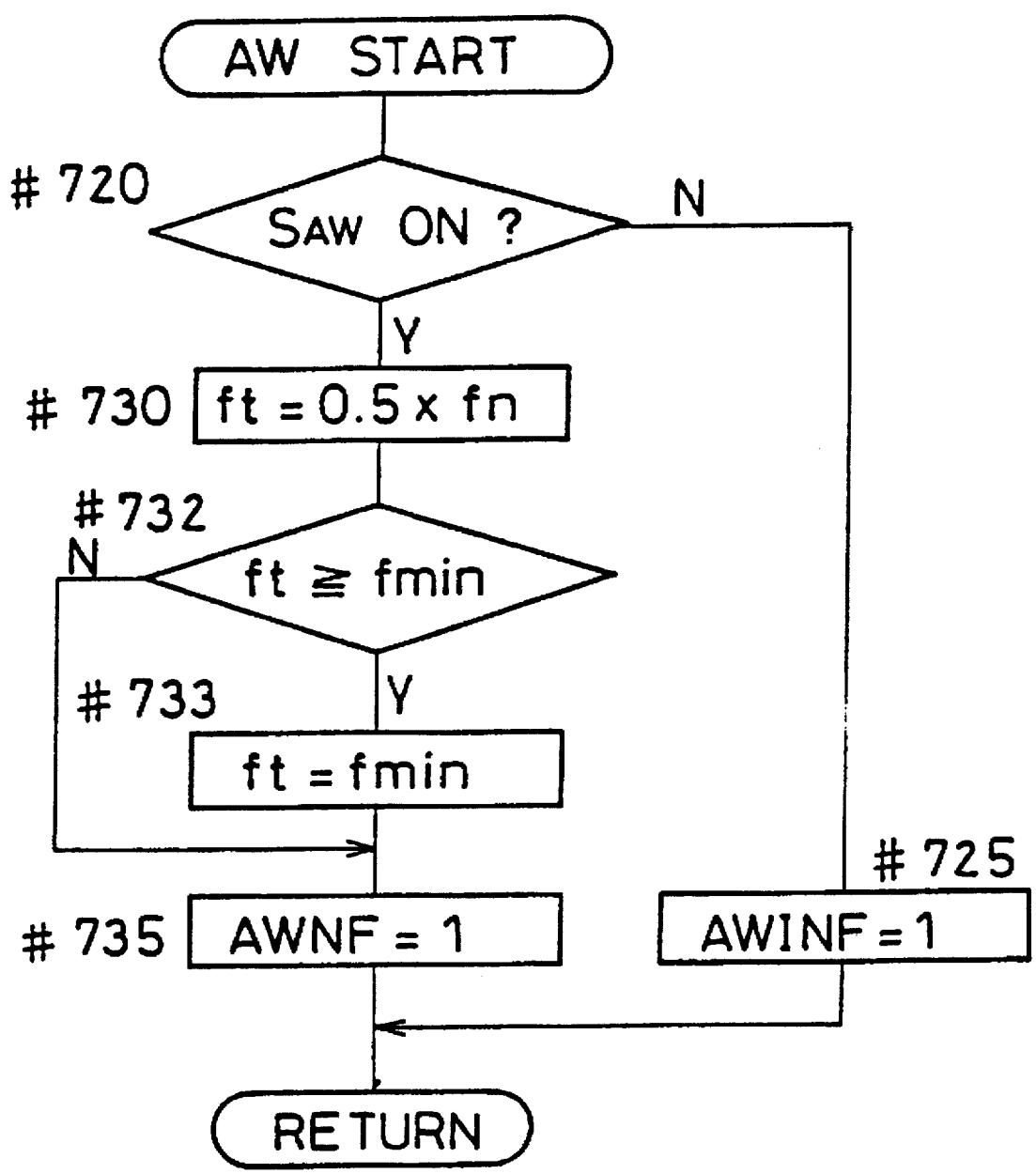

At this time, although the angle of view is changed by the zooming operation in photographing, a focal length ($f_t=0.5\times f_n$) which does not give the user inconvenience caused by a change of the angel of view is set as a target focal length $f_t$ for a zooming operation in the auto wide mode based on the present focal length $f_n$ (step #730 in FIG. 23). Then, when the target focal length $f_t$ is smaller than the minimum focal length $f_{min}$, the target focal length $f_t$ is re-set to the minimum focal length $f_{min}$ (step #733 in FIG. 23), and the focus detection is performed while the lens is being moved in the WIDE direction within a possible range.

As described above, the present embodiment, where the zooming operation is performed to enable the focus detection only when the driving of the AF lens cannot cope with it, is designed so as to prevent the change of the angle of view as much as possible, unlike the conventional camera systems where the angle of view is always changed since the focus detection is enabled only by the zooming operation.

Furthermore, when a zooming operation is performed, the target focal length for the zooming operation is set to a focal length which does not give the user inconvenience caused by a change of the angle of view.

In the above description of the embodiment, the single-lens reflex camera is taken as an example. However, the wide view function and the auto wide function described therein can similarly be realized in a camera, such as the lens shutter camera, etc., which has a separately provided finder optical system. Further, the similar functions can also be realized in the film camera for which film is used as the photographing medium and in the electronic still camera for which the CCD and the MOS-IC are used.

Next, the other embodiments where a part of the construction is added or changed (hereinafter referred to as variation) based on the above-described embodiment (hereinafter referred to as basic embodiment) will be described.

Variation 1

Figure 49:
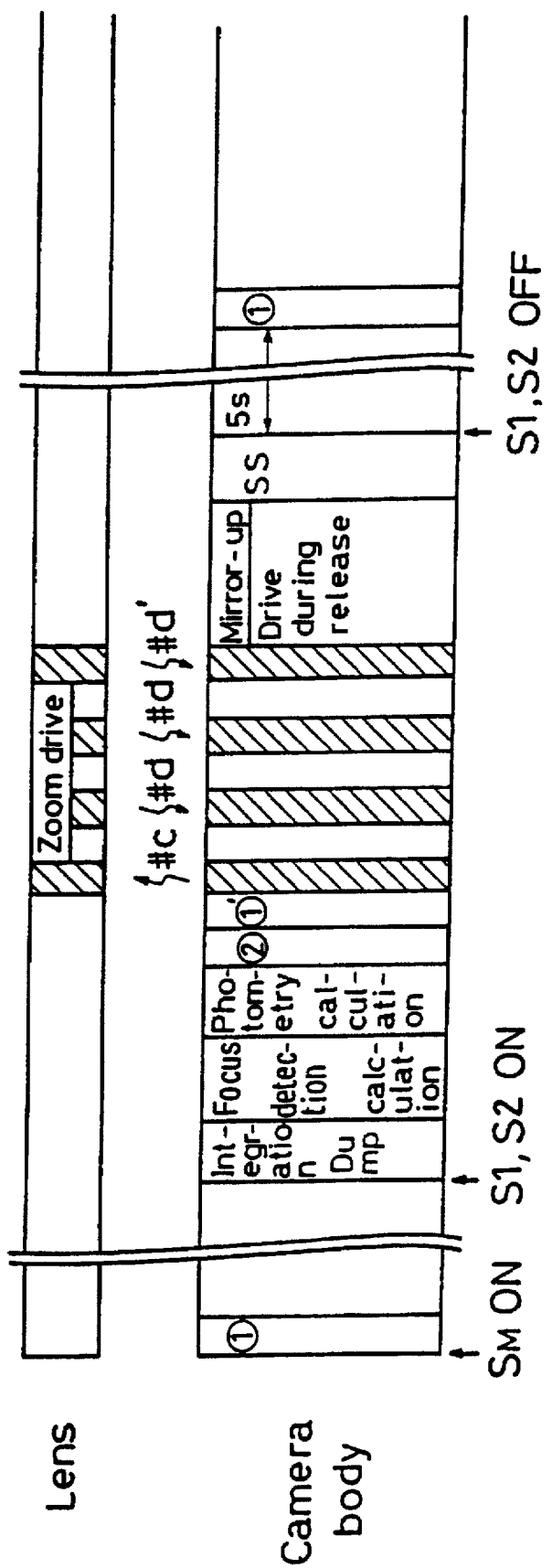
FIG. 49 is a sequence chart schematically showing an operation sequence of the variation 1 in the wide view mode.

The object of the variation 1 is to reduce the time required for the operations from the turning on of the release switch S2 to the exposure in the wide view mode. The sequence chart in the wide view mode of the variation 1 is shown in FIG. 49. In the figure, the communications #c, #d and #d' between the in-lens microcomputer μC2 and in-body microcomputer μC1 correspond to the communications #c, #d and #d' shown in FIGS. 6 and 7.

In the sequence of the variation 1, where high speed is given priority for the operations from the turning on of the release switch S2 to the exposure, the sequence of the release is executed without the focus detection being performed after the zooming up. That is, at the in-body microcomputer μC1, when the lens condition data for notifying the completion of the zooming is received from the in-lens microcomputer μC2 through the communication #d', the mirror-up operation is immediately performed for the exposure without the focus detection being performed. Thus, the time required for the operations from the turning on of the release switch S2 to the exposure can be reduced.

Variation 2

The object of the variation 2 is to prevent pictures from being taken under the out-of-focus condition in the wide view mode. The variation 2 will be described referring to FIGS. 50A and 50B.

Figure 50A:
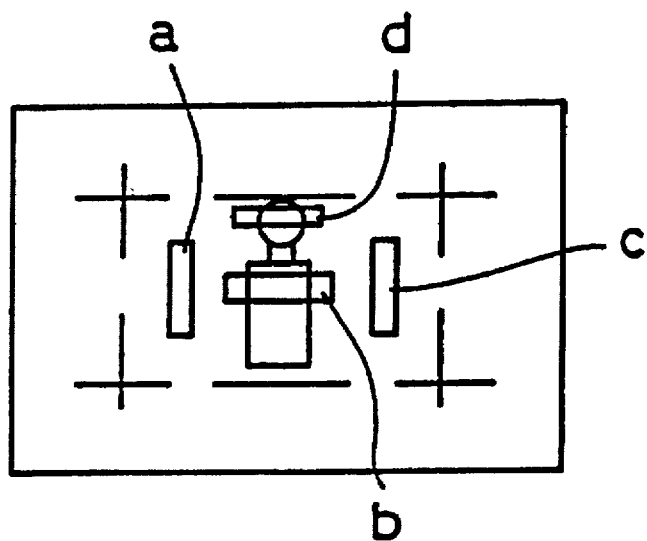
FIGS. 50A and 50B show views through the finder of the variation 2 in the wide view mode.

Now, it is assumed that a picture of a person is taken in the wide view mode, that the finder view as shown in FIG. 50A is obtained before the release, and that the focus detection is performed for the focus detection area d. In this case, after the zooming up at the release, the finder view as shown in FIG. 50 B is obtained. If the the focus detection is performed for the focus detection area d at this point of time, the throat of the person is focused on after the zooming up, although the face of the person is focused on before the zooming up. Because of this, the taken picture is slightly out of focus.

Figure 55:
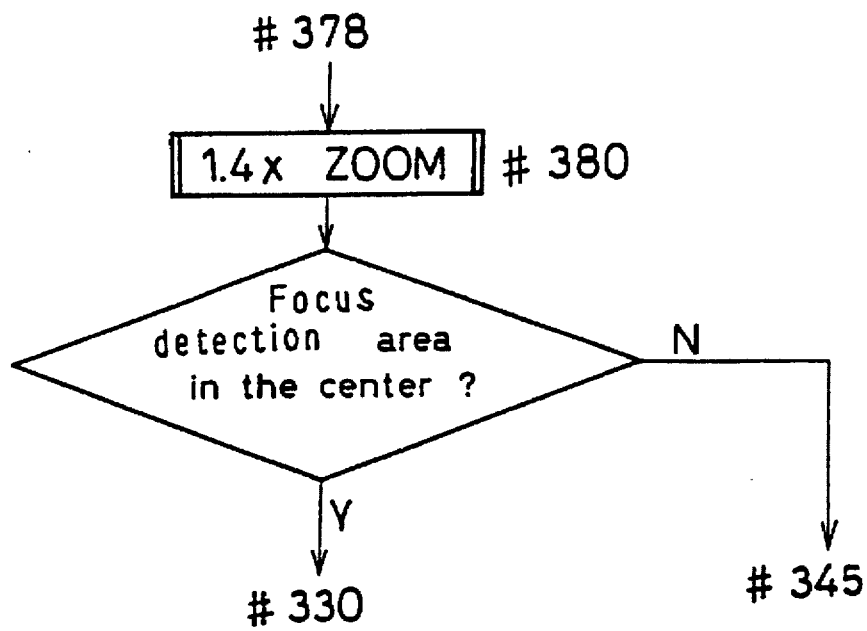
FIG. 55 is a flow chart for explaining a variation 2.

To prevent this, in the sequence, in the wide view mode, of the variation 2, although the focus detection is performed after the zooming up when the focus detection before the zooming up is performed for the focus detection area b which is located in the center of the finder, it is not performed after the zooming up when the focus detection before the zooming up is performed for any of the focus detection areas a, c and d which are not located in the center of the finder. That is, after step #380 is executed, whether or not the focus detection area selected at step #602 is situated in the center is determined as shown in FIG. 55. When it is situated in the center, the process proceeds to step #330, where the focus detection is performed again. When it is not situated in the center, the process proceeds to step #345. Thus, the out-of-focus picture as described above can be prevented.

Variation 3

Figure 50B:
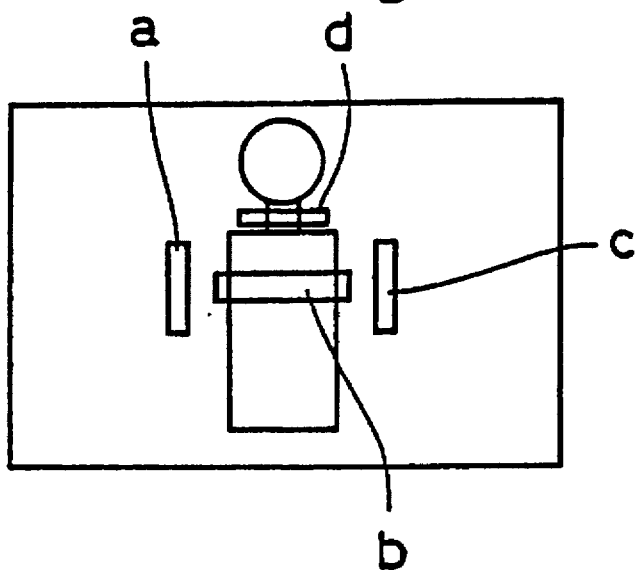

The object of the variation 3 is, similar to the variation 2, to prevent a picture from being taken under the out-of-focus condition when the finder views as shown in FIGS. 50A and 50B are obtained.

Figure 56:
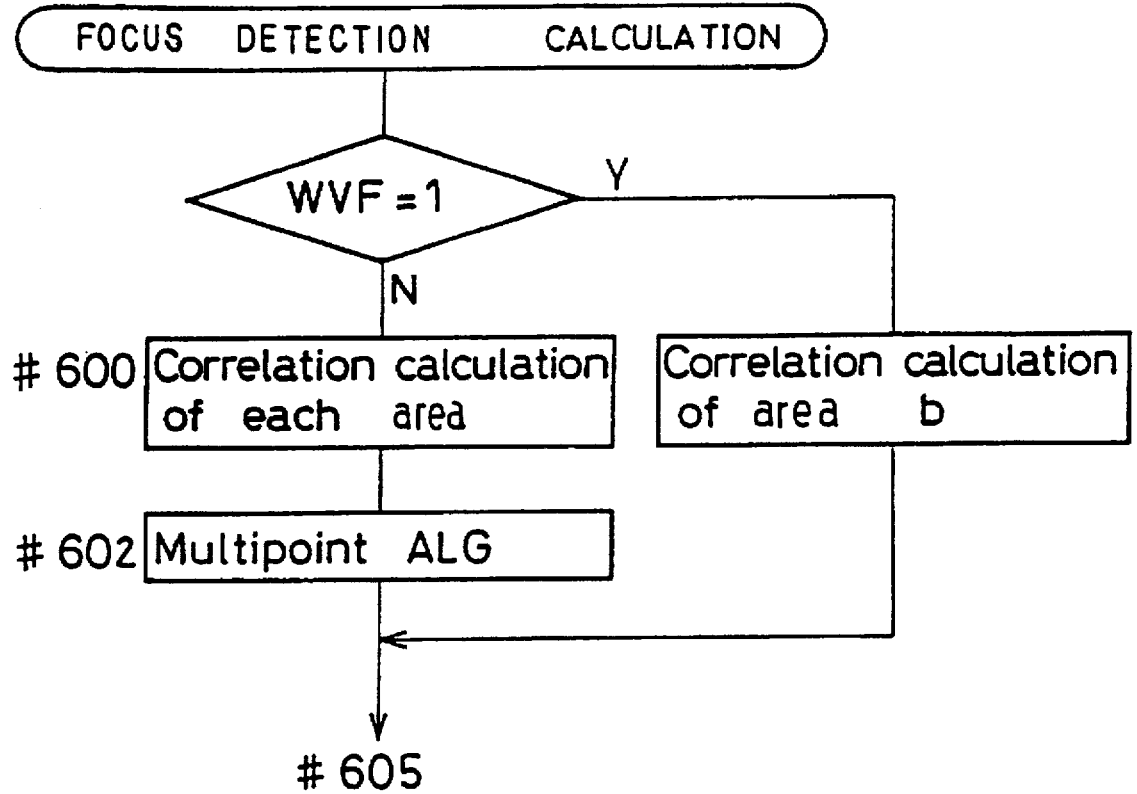
FIG. 56 is a flow chart for explaining a variation 3.

In the variation 3, when the wide view mode is set, the focus detection area used for the focus detection is limited to the focus detection area b which is located in the center of the finder. Than is, this variation is made by changing the above-described subroutine FOCUS DETECTION shown in FIG. 19 so that a correlation calculation is performed only with respect to the area b when the flag WVF is set as shown in FIG. 56. Thus, since the part of the object for which the focus detection is performed is not changed after the zooming up at the release, the object does not become out of focus at the focus detection after the zooming up.

Variation 4

The variation 4 is designed for coping with the case where even if having the same actual taking area (film frame), slides and standard-sized pictures are slightly different in the area of the image plane which is finally printed out.

Figure 51:
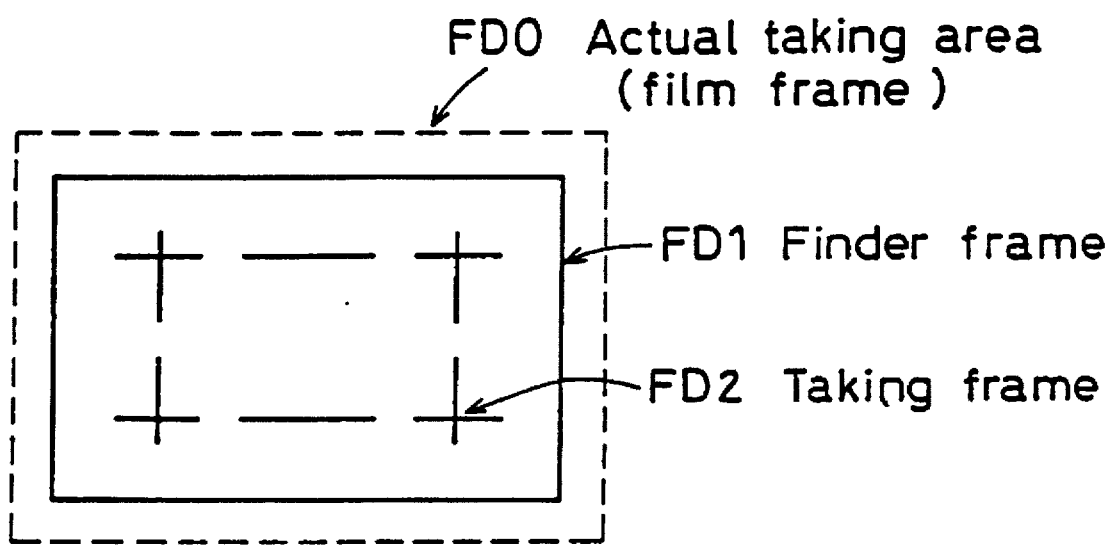
FIG. 51 shows the relation among a finder frame, a taking frame and an actual taking area of a single-lens reflex camera.

The relation among the finder frame, taking frame and actual taking area (film frame) of a single-lens reflex camera having a finder field rate of approximately 93% at a normal operation is shown in FIG. 51. In the above-described basic embodiment, corresponding to that the finder field rate before the release in the wide view mode is 140%, the zooming up of 1.4× is performed so that the taking area viewed within the taking frame FD2 before the release coincides with the area viewed within the finder frame FD1 during the release. The zooming up of 1.4× is preferable for photographing of standard-sized pictures, because the area of an image plane which is finally printed out almost coincides with the taking area viewed within the taking frame FD2 before the release since although the actual taking area is slightly larger than the taking area viewed within the taking frame FD2 before the release, the periphery of the image plane is cut off in printing. However, in photographing slides, if only the zooming up of 1.4× is performed, the scenery, etc. located outside the taking area viewed within the taking frame FD2 before the release is also taken, and the image plane including the scenery outside the taking area is finally printed out.

Figure 57:
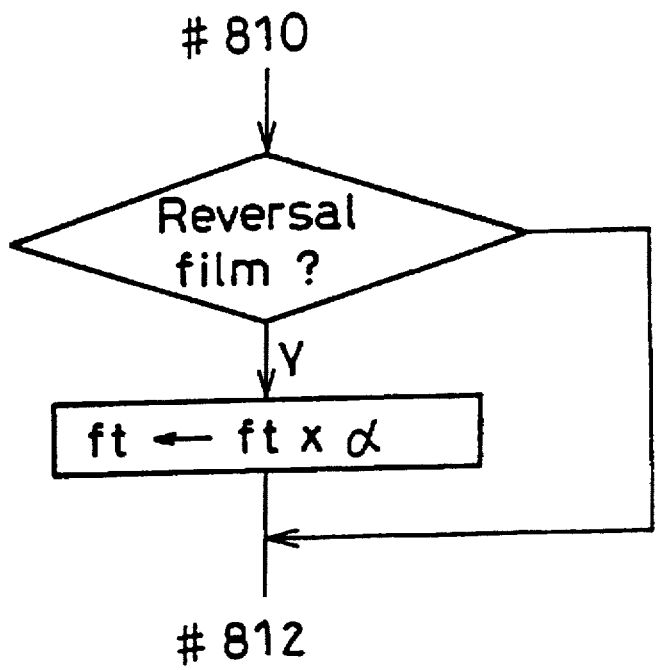
FIG. 57 is a flow chart for explaining a variation 4.

To prevent this, the variation 4 is so constructed as to perform the zooming up, in photographing slides in the wide view mode, so that the taking area viewed within the finder frame FD2 before the release coincides with the actual taking area FD0 at the release (considering errors, so that it coincides with an area slightly smaller than the actual taking area FD0). That is, in this variation, as shown in FIG. 57, whether or not the film is a reversal film is determined after step #810, and when it is the reversal film, the target focal length $f_t$ is set to $\alpha$ times ($\alpha > 1$). Thus, in photographing slides, the taking area viewed within the finder frame FD2 before the release also coincides with the area of the image plane finally printed out into a slide.

Variation 5

The variation 5 is, similarly to the variation 4, designed for coping with the photographing of both slides and standard-sized pictures with respect to the magnification of the zooming up.

In the variation 5, the kind of the film is read to detect whether the film is the negative film or the reversal film. Specifically, the latitude coded on the film as a part of the DX code is detected to determine whether the film is the negative film or the reversal film. When the film is the negative film, the zooming up is performed so that the taking area viewed within the finder frame FD2 before the release coincides with the taking area viewed within the finder frame FD1 at the release. On the other hand, when the film is the reversal film, the zooming up is performed so that the area viewed within the finder frame FD2 before the release coincides with the actual taking area FD0 at the release. Thus, in the photographing of both slides and standard-sized pictures, the taking area, viewed within the taking frame FD2 before the release in the wide view mode, almost coincides with the area of the image plane finally printed out into a slide or a standard-sized picture.

Variation 6

In the variation 6, similarly to the variation 1, the sequence in the wide view mode is partly modified.

In the above-described basic embodiment, when the wide view switch $S_{WV}$ is turned on, the taking frame FD2 is displayed within the finder frame FD1 without the angle of view being changed, and the person and scenery located in the taking frame FD2 are taken. In this sequence, for example, if the wide view switch $S_{WV}$ is turned on when the user wishes to confirm the scenery, etc. located slightly outside while confirming a moving object, etc. through the finder in the normal view mode, the taking frame FD2 is displayed within the finder, and only the objects, located within an area smaller than the taking area before the wide view switch $S_{WV}$ is turned on, is taken.

To overcome such problem, the variation 6 adopts a sequence where when the wide view switch $S_{WV}$ is turned on, after the zooming down is performed so that the taking area, viewed within the finder frame FD1 before the turning on, coincides with the taking area viewed within the taking frame FD2 after the turning on, the taking frame FD2 is displayed and the wide view mode is set. For example, when the finder field rate before the release in the wide view mode is 140%, after the zooming down of approximately 0.7× is performed, the taking frame FD2 is displayed and the wide view mode is set.

The sequence will hereinafter be described referring to FIGS. 52 and 53.

Figure 13:
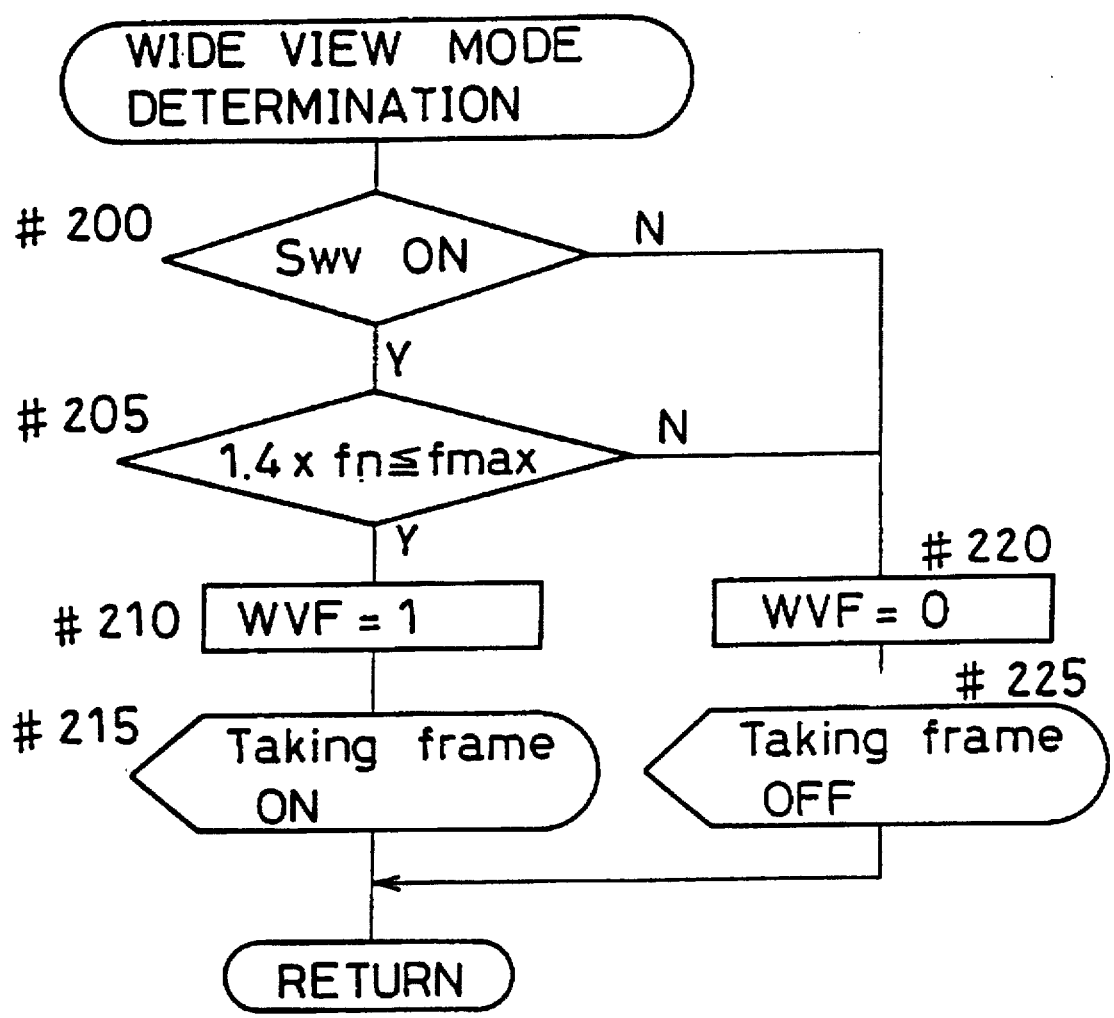
FIG. 13 is a flow chart showing a subroutine WIDE VIEW MODE JUDGMENT.
Figure 52:
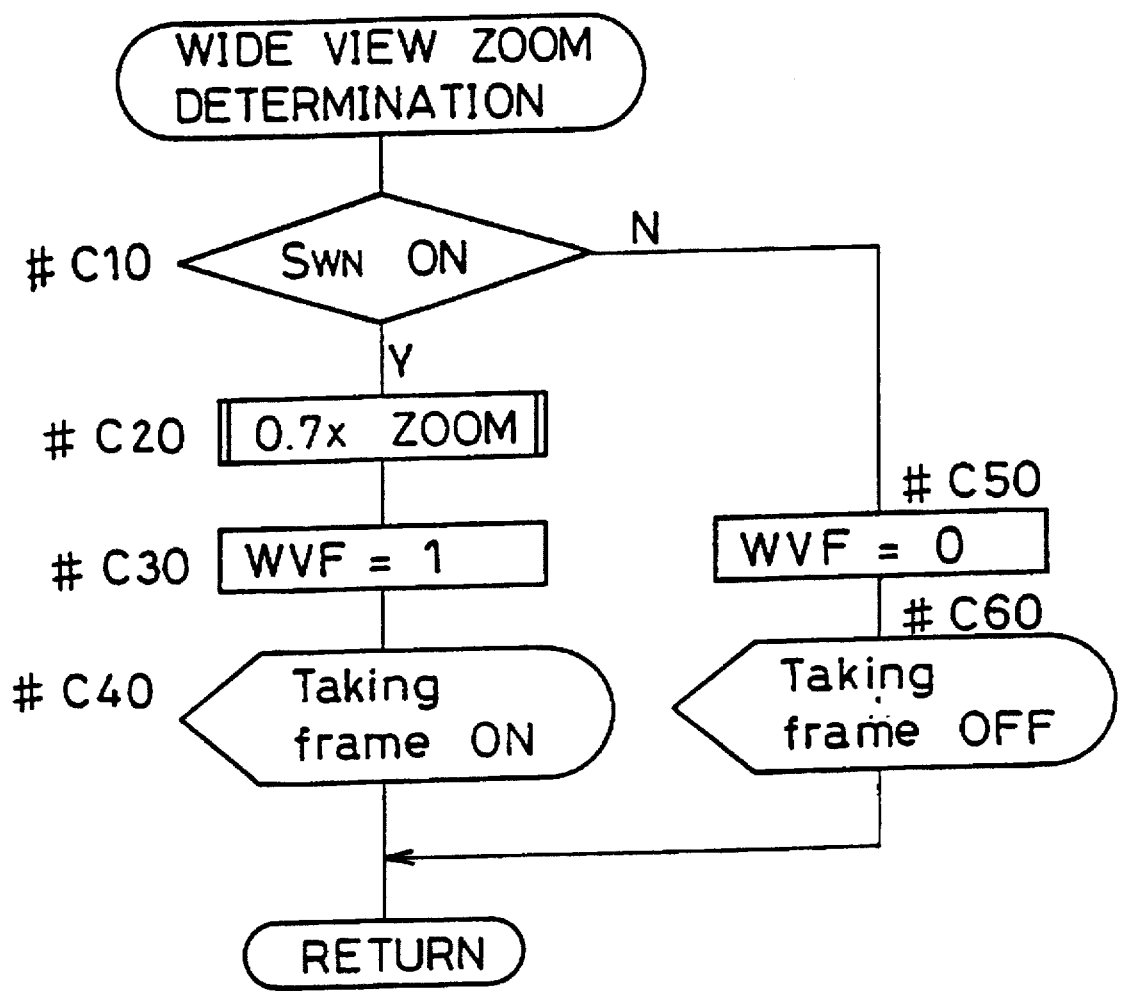
FIG. 52 is a flow chart showing a subroutine WIDE VIEW ZOOM JUDGMENT used in the variation 6.
Figure 53:
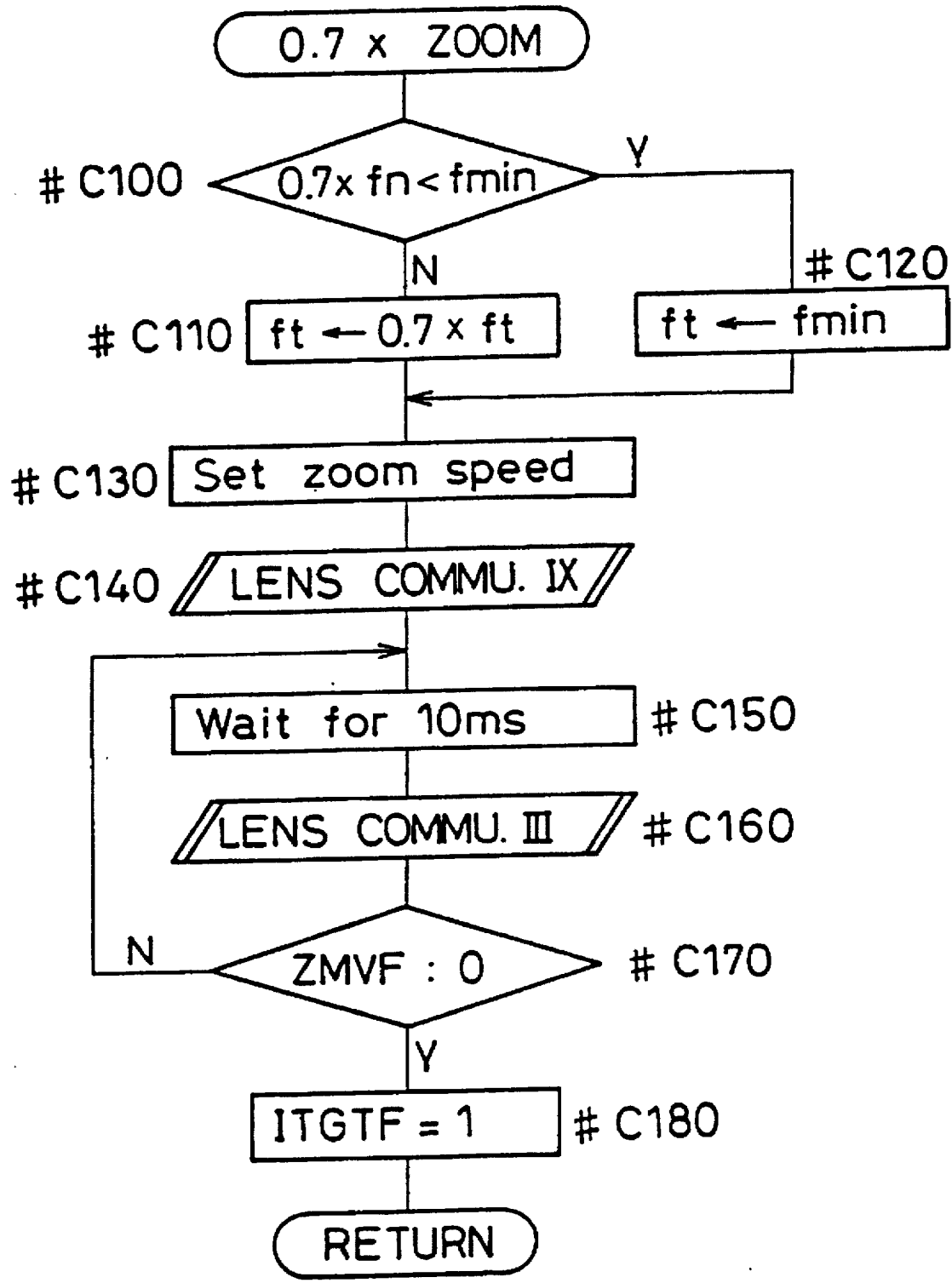
FIG. 53 is a flow chart showing a subroutine 0.7× ZOOM called in the subroutine WIDE VIEW ZOOM JUDGMENT.

The variation 6 adopts a subroutine shown in FIG. 52 in place of the subroutine WIDE VIEW ZOOM DETERMINATION, of the above-described basic embodiment, shown in FIG. 13. When the subroutine shown in FIG. 52 is called, first, whether or not the wide view switch $S_{WV}$ is ON is determined. When it is not ON, the flag WVF, showing that the wide view mode is effective, is reset, the taking frame FD2 is erased, and the process returns (steps #C10, #C50, #C60). On the other hand, when the wide view switch $S_{WV}$ is determined to be ON at step #C10, a subroutine for performing the zooming down of 0.7× so that the taking area, viewed within the finder frame FD1 before the turning on, coincides with the taking area viewed within the taking frame FD2 after the turning on (step #C20). Then, the flag WVF, showing that the wide view mode is effective, is set, the taking frame FD2 is displayed within the finder, and the process returns (steps #C30 and #C40).

Next, the subroutine 0.7× ZOOM DOWN shown in FIG. 53 will be described. When the subroutine 0.7× ZOOM DOWN is called, first, whether or not the value 0.7 times the present focal length $f_n$ is smaller than the focal length $f_{min}$ at the shortest focal length condition is determined at step #C100. When it is not smaller, the value 0.7 times the present focal length $f_n$ is set as the target focal length $f_t$ (step #C110). When it is smaller, the focal length $f_{min}$ at the shortest focal length condition is set as the target focal length $f_t$ (step #C120). Then, after setting the zoom speed and executing the lens communication IX to transmit that the zooming is to be performed, the process waits, while repeating the lens communication III for detecting the lens condition at 10 msec intervals, until the zoom lens unit is stopped and the flag ZMVF is reset (steps #C130 to #C170). When the zoom lens unit is stopped, the flag ITGTF, for instructing the transmission of the data on a timing of the starting of the integration, is set so that in the next focus detection, the focus detection calculation is performed by receiving the lens data changed in a zooming operation, and the process returns (step #C180).

By adopting the above-described sequence, when the wide view switch $S_{WV}$ is turned on, the area larger than the taking area viewed within the finder before the turning on can be confirmed within the finder, and the area which coincides the taking area viewed within the finder before the turning on can be taken after the turning on.

Variation 7

In the variation 7, the sequence of the auto wide mode of the basic embodiment is partly modified.

In the above-described basic embodiment, the zoom lens unit is stopped so that the process returns to the normal focus detection when the focus detection becomes impossible in the auto wide mode, and the sequence for focusing is executed at the focal length where the focus detection is enabled. However, according to the individuality of the user and the taken scenery, the change of the angle of view cannot be allowed at times.

Figure 58:
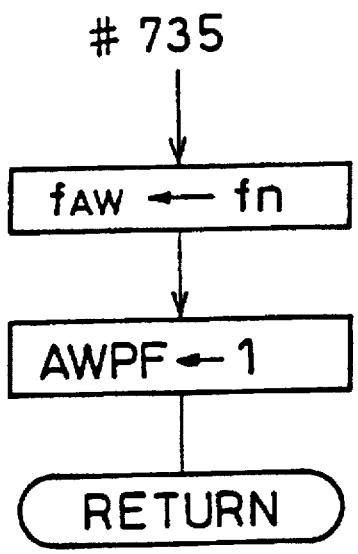
FIGS. 58 and 59 is a flow chart for explaining a variation 7.
Figure 59:
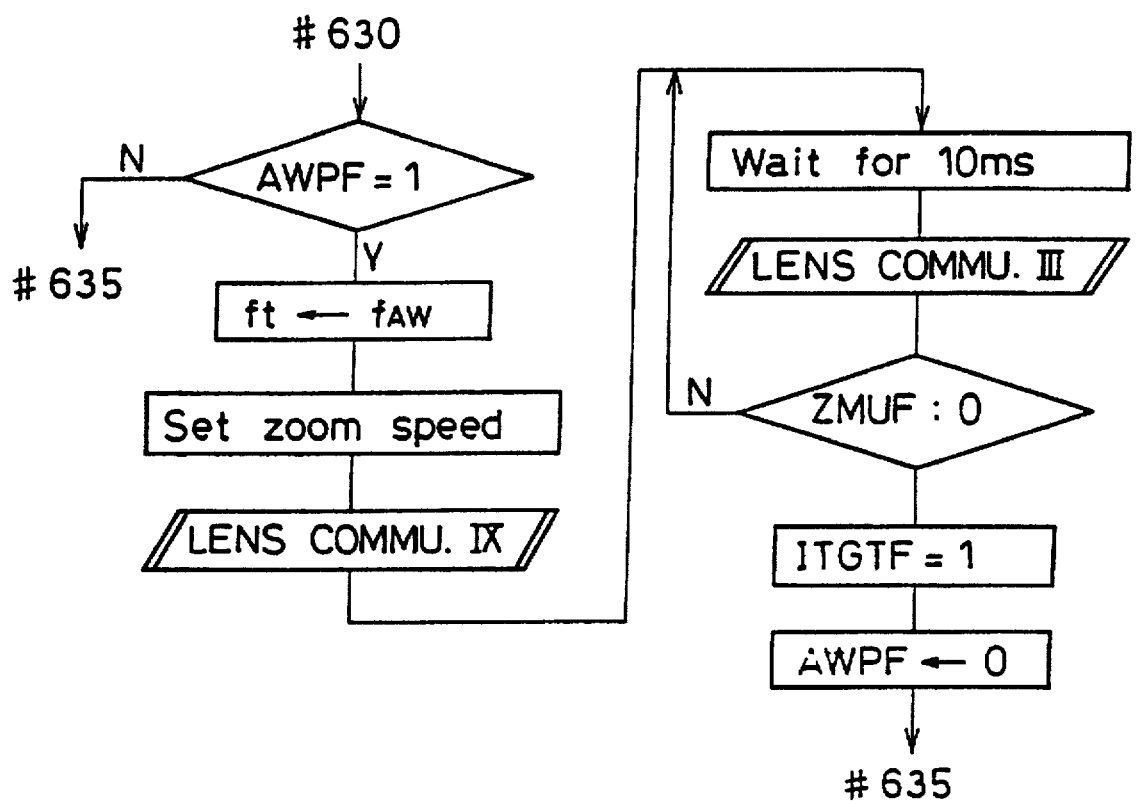

To overcome such problem, the variation 7 adopts a sequence where the AF lens unit is moved for focusing on an object at the point of time when the focus detection becomes impossible in the auto wide mode, and thereafter, a mode where the AF lens is no moved (AF lock mode) is set and only the zoom lens unit is returned to the position where it starts to move in the auto wide mode. That is, as shown in FIG. 58, the focal length at the point of time is stored as a focal length $f_{AW}$ after step #735. Then, as shown in FIG. 59, whether or not an auto wide operation has been performed is determined after step #630 of the subroutine IN-FOCUS. When it has been performed, the above-described focal length $f_{WA}$ is set to the target focal length $f_r$. The description of the following steps is omitted since they are the same as steps from #812 of the subroutine 1.4× ZOOM. Thus, the user can take pictures in accordance with his or her intention, since the angle of view is not changed.

Variation 8

In the variation 8, the focus detection is facilitated in the auto wide mode.

In the above-described basic embodiment, the sequence of the auto wide is started after the low contrast scanning is completed (step #502 shown in FIG. 15), and the position of the AF lens unit at the time of the starting of the auto wide is set at infinity (steps #690 to #705 shown in FIG. 15). Under the above condition, the focus detection becomes impossible, for example, for an object located the closest to the camera since the defocus amount is excessive especially at the longest focal length condition.

Figure 60:
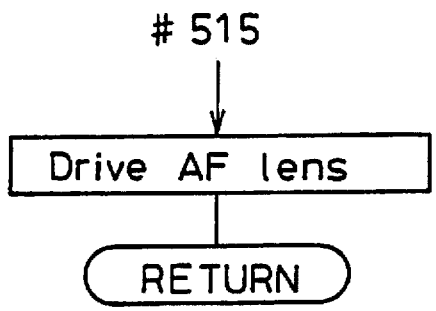
FIG. 60 is a flow chart for explaining a variation 8.

To overcome such problem, the variation 8 is designed so that the AF lens unit is set at the middle between the position where the AF lens unit is in focus on an object at infinity and the position where it is in focus on an object located the closest to the camera, at the focal length at the time of the starting of the auto wide. That is, in this variation, as shown in FIG. 60, the AF lens is moved to a position between the infinity position and the nearest position after step #515. Thus, the focus detection in the auto wide mode is facilitated since the defocus amount for objects both on the near side and at infinity is not remarkably large.

Further, for an object for which the focus detection is impossible even after the low contrast scanning is performed at the longest focal length condition, which is frequently located on the near side, the AF lens unit can also be set, at the time of the starting of the auto wide, at a specified position such as a move-out position corresponding to, for example, the object distance of 2.5 m.

Variation 9

The variation 9 is designed for coping with the case where the time required for the CCD integration increases in the focus detection (focus detection) performed in the zooming operation.

In the above-described basic embodiment, the data on a staring timing of the CCD integration is transmitted from the in-body microcomputer µC1 to the in-lens microcomputer µC2 (lens communications IV and V), and the in-lens microcomputer µC2 performs the calculation of the lens data based on the lens condition (focal length) at the time of the receiving of the data from the in-body microcomputer µC1 to prepare for the next request for the input of the lens data (the lens communication VI by the CS interrupt) from the in-body microcomputer µC1. Although the CCD integration and the calculation of the lens data are synchronously performed by this, when the time required for the CCD integration increases, the difference between the calculated lens data and the lens data at a real time increases even if the lens data are transmitted at the point of the time when the CCD integration is started.

To cope with the case where a long time is required for the CCD integration, in the variation 9, the data on the timings of the starting and finishing of the CCD integration are respectively transmitted from the in-body microcomputer µC1 to the in-lens microcomputer µC2 at the times of the starting and finishing of the CCD integration, the in-lens microcomputer µC2 calculates the lens data based on the lens condition at the middle point of the times between the starting and finishing of the CCD integration, and transmits the lens data to the in-body microcomputer µC1 after the data dump is completed. Thus, the accuracy of the focus detection is increased since the difference decreases between the middle point of the time for the CCD integration and the point of the time when the lens data is calculated.

TABLE 1

| Mode | Direction | Byte number | Content |
|---|---|---|---|
| I | B → L | 5 | move in zoom lens unit |
| II | B → L | 5 | stop zoom lens unit |
| III | B ← L | 5 | transmit lens condition |
| IV | B → L | 5 | starting timing for the CCD integration |
| V | B → L | 6 | IV + move zoom lens unit until specified focal length is realized |
| VI | B ← L | 9 | transmit lens data on starting timing of CCD integration |
| VII | B ← L | 14 | transmit all lens data |
| VIII | B → L | 5 | permit power zoom drive |
| IX | B → L | 6 | move zoom lens unit until specified focal length is realized |

TABLE 2

| Name | Meaning |
|---|---|
| RQZMF | 1: driving of zoom lens unit is requested |
|  | 0: driving of zoom lens unit is not requested |
| ZMVF | 1: zoom lens unit is moving |
|  | 0: zoom lens unit is stopped |
| STRF | 1: starting timing of zooming |
|  | 0: |
| WDF | 1: zooming in WIDE direction |
|  | 0: zooming in TELE direction |
| TEDF | 1: longest focal length condition |
|  | 0: |
| WEDF | 1: shortest focal length condition |
|  | 0: |
| SLPF | 1: sleep OK at the in-body microcomputer µ C1 |
|  | 0: sleep not OK at the in-body microcomputer µ C1 |
| ZPNGF | 1: zoom position is inaccurate |
|  | 0: |
| OKCF | 1: calculation is completed |
|  | 0: calculation is in progress |
| TFSF | 1: high-speed zooming in TELE direction is in progress |
|  | 0: |
| TSSF | 1: low-speed zooming in TELE direction is in progress |

TABLE 2-continued

| Name | | Meaning |
|---|---|---|
| WFSF | 0: 1: | high-speed zooming in WIDE direction is in progress |
| WSSF | 0: 1: 0: | low-speed zooming in WIDE direction is in progress |

TABLE 3

| Name | | Meaning |
|---|---|---|
| ZSTPF | 1: 0: | stop zooming |
| WRESF | 1: 0: | reset WIDE direction |
| ATCF | 1: 0: | perform auto compact |
| ITGTF | 1: 0: | calculate lens data since starting timing for CCD integration comes |
| MZOKF | 1: 0: | power zoom is OK / power zoom is not OK |
| ZMV3 | 1: 0: | zoom speed 3 |
| ZMV2 | 1: 0: | zoom speed 2 |
| ZMV1 | 1: 0: | zoom speed 1 |
| WVF | 1: 0: | wide view mode is ON / wide view mode is not ON |
| AWNF | 1: 0: | auto wide mode is ON / auto wide mode is not ON |
| AFMVF | 1: 0: | AF lens unit is moving / AF lens unit is stopped |

TABLE 4

| Name | | Meaning |
|---|---|---|
| AFEF | 1: 0: | in-focus condition / out-of-focus condition |
| CSLEF | 1: | interrupt from the in-lens microcomputer μ C2 has been applied |
| | 0: | interrupt from the in-lens microcomputer μ C2 has not been applied |
| LEEDF | 1: | AF lens unit has reached the endmost position as detect ion result of timer interrupt |
| | 0: | AF lens unit has not reached the endmost position as detect ion result of timer interrupt |
| LMVF | 1: 0: | AF lens unit is moving / AF lens unit is not moving |
| LSNF | 1: 0: | low contrast scanning is in progress / low contrast scanning is not in progress |
| LSINF | 1: 0: | low contrast scanning is inhibited / low contrast scanning is not inhibited |
| AWNF | 1: 0: | auto wide mode is ON / auto wide mode is not ON |
| AWINF | 1: 0: | auto wide mode is inhibited / auto wide mode is not inhibited |
| WVF | 1: 0: | wide view mode is in progress / wide view mode is not in progress |
| RSTF | 1: | routine RESET due to battery attachment has been executed |
| | 0: | routine RESET due to battery attachment has not been executed |
| SMOFF | 1: 0: | main switch OFF flow is executed / main switch OFF flow is not executed |
| S1ONF | 1: 0: | subroutine S1ON is executed / subroutine S1ON is not executed |
| S2ON | 1: 0: | sequence from S2ON is in progress / sequence from S2ON is not in progress |
| S2INF | 1: 0: | S2 is inhibited / S2 is not inhibited |
| LCONF | 1: | focus detection is impossible |

TABLE 4-continued

| Name | | Meaning |
|---|---|---|
| | 0: | focus detection is possible |
| WDF | 1: 0: | zooming operation in WIDE direction / zooming operation in TELE direction |
| ZIF | 1: 0: | zoom lens unit is moved in / zoom lens unit is not moved in |
| ZMVF | 1: 0: | zoom lens unit is moving / zoom lens unit is not moving |
| WEDF | 1: 0: | shortest focal length condition / not shortest focal length condition |
| TEDF | 1: 0: | longest focal length condition / not longest focal length condition |

TABLE 5

| Variable | Meaning |
|---|---|
| $f_t$ | target focal length [mm] |
| $f_n$ | present focal length [mm] |
| $Z_t$ | counter value (pulse count) of target focal length |
| $Z_n$ | counter value (pulse count) of present focal length |
| $Z_e$ | count value (pulse count) of zoom encoder ENC3 by zoom counter ZC |
| $\Delta Z$ | zoom drive pulse count |
| N | drive amount (pulse count) of AF lens unit |
| N1 | drive amount (pulse count) of AF lens unit obtained by defocus amount |
| $N_F$ | move-out amount (pulse count) of AF lens unit from infinity |
| $N_{LG}$ | large value (pulse count) |
| T1 | timer for timer interrupt |
| T2 | timer for maintaining power source |
| T3 | timer for counting exposure time |
| TA | timer for judging if camera body is of old type |
| V1 to V3 | zoom speed |

Next, another embodiment of the present invention will hereinafter be described with respect to a single-lens reflex camera system shown in FIGS. 61 to 82D.

In a taking lens having a power zooming function, it is possible to make it easy to grasp the condition around an object other than in an exposure controlling operation by automatically performing a zooming operation in the WIDE direction by a predetermined amount from an angle of view which is actually taken into a picture, or to perform a pseudo-increase of an object distance range where a focus detection is possible. And thereafter, by automatically performing a zooming operation in the TELE direction just before a release operation, it is possible to take a picture at the original angle. This function will hereinafter be referred to as "virtual wide function."

In using the virtual wide function, when a focal length of a taking lens is originally set to a focal length almost the same as the minimum focal length, a zooming operation cannot be performed in the WIDE direction by a predetermined amount even if a finder field is tried to be increased by the virtual wide function.

The hereinafter described embodiment is provided with a function to warn a user when the virtual wide mode cannot be set.

Figure 61:
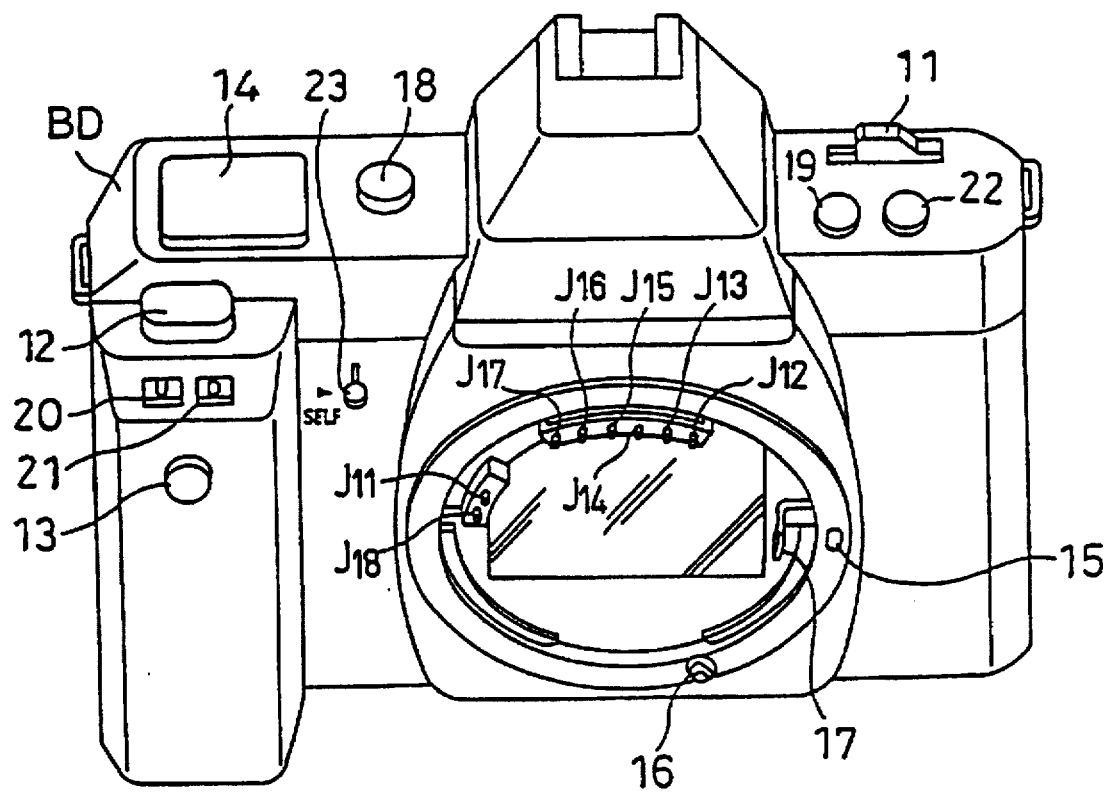
FIG. 61 is a perspective view of an appearance of a body of a single-lens reflex camera which is another embodiment of the present invention.
Figure 62:
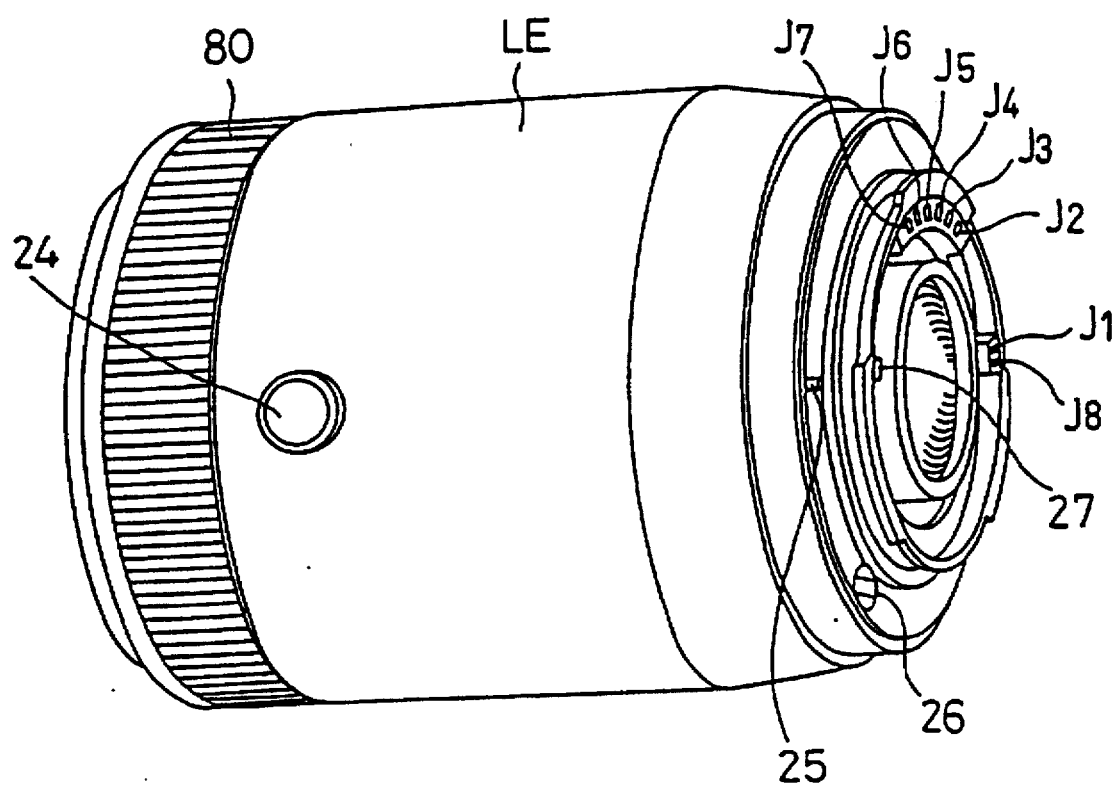
FIG. 62 is a perspective view of an appearance of an interchangeable lens of the single-tens reflex camera shown in FIG. 61.

FIG. 61 shows an appearance of a camera body BD in which the present invention is incorporated. FIG. 62 shows an appearance of an interchangeable lens LE interchangeably attached to the camera body BD. The name and function of each portion will briefly be described in the following. The portions which are the same as those shown in FIGS. 2A and 4 are represented by the same numbers, and the description thereof is omitted.

13' is an AE lock key. An AE lock is performed while the key 13' is being operated.

14 is an on-body display portion for displaying a shutter speed, an aperture value, etc. The content of the display will be described later with reference to FIGS. 81A and 81C. The view-finder display will be described later with reference to FIGS. 82A to 82D.

18 is a push switch for changing over an ON/OFF of a virtual wide function. The virtual wide function is a function where a view-finder field is made larger than a field which is actually taken into a picture by increasing a focal length of a taking lens approximately 7 times toward the shorter focal length side and the original focal length is employed in a taking operation. In the virtual wide, the size of the view-finder field is approximately 140%, and the field which is actually taken into a picture is displayed by a field frame display with liquid crystal. The virtual wide will hereinafter be referred to as "V. wide", "VWD", or "VW".

19 is a P reset switch which is operated for an initial setting of each mode.

20 is an up switch key, and 21 is a down switch key. Theses switches 20 and 21 are operated for changing an AE mode and for setting a combination of a shutter speed and aperture value in a P mode and a shutter speed in an S mode.

22 is a switch key which is operated when the AE mode is changed.

23 is a self mode setting switch key. A self mode is set by moving an operation member 23 to the arrow, and a self taking operation starts when the release switch S2 is turned on.

Next, the name and function of each portion of the interchangeable lens LE will be described.

24 is a release switch which has the same function as that of the second-stroke depression of the release switch 12 on the camera body side. When the release switch 24 is depressed, a switch $S_{RE}$ (to be described later) is turned on.

Next, a circuit arrangement of this camera system will be described.

Figure 63:
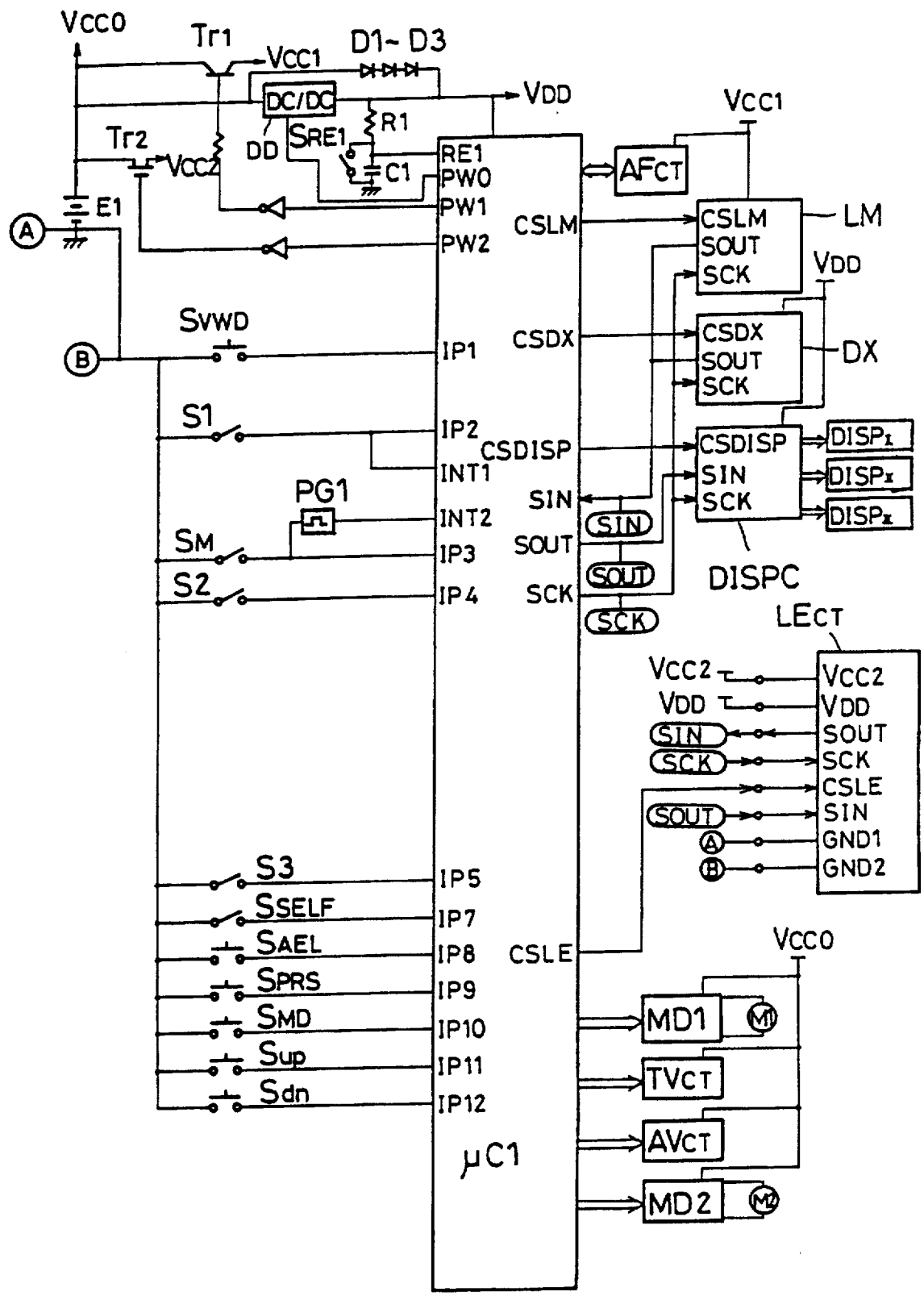
FIG. 63 is a block circuit diagram showing a circuit arrangement of the camera body shown in FIG. 61.

FIG. 63 is a circuit diagram of an in-body circuit incorporated in the camera body BD.

DISPC represents a display control circuit for receiving display data and a display control signal from the in-body microcomputer μC1 and making give a predetermined display an display portion DISPI (corresponding to the display portion 14 in FIG. 61) on the upper surface of the camera body, a display portion DISPII outside of the image plane of the finder and a plane display portion DISPIII within the image plane of the finder.

Next, switches will be described.

$S_{VWD}$ represents a normally-open push switch for changing over ON/OFF of the virtual wide mode. The switch $S_{VWD}$ is turned on when the above-described push switch 18 for setting the virtual wide function is pushed.

$S_{SELF}$ represents a self mode setting switch for setting a self mode. The self mode setting switch $S_{SELF}$ is turned on when the switch key 23 is operated.

$S_{AEL}$ represents an AE lock switch, which interlocks with the operation of the switch key 13.

$S_{PRS}$ represents a Preset switch, which interlocks with the operation of the switch key 19.

$S_{MD}$ represents an AE mode changing switch, which interlocks with the operation of the switch key 22.

$S_{up}$ and $S_{dn}$ respectively represent an up switch and a down switch, which interlock the operations of the switch, keys 20 and 21, respectively.

Figure 64:
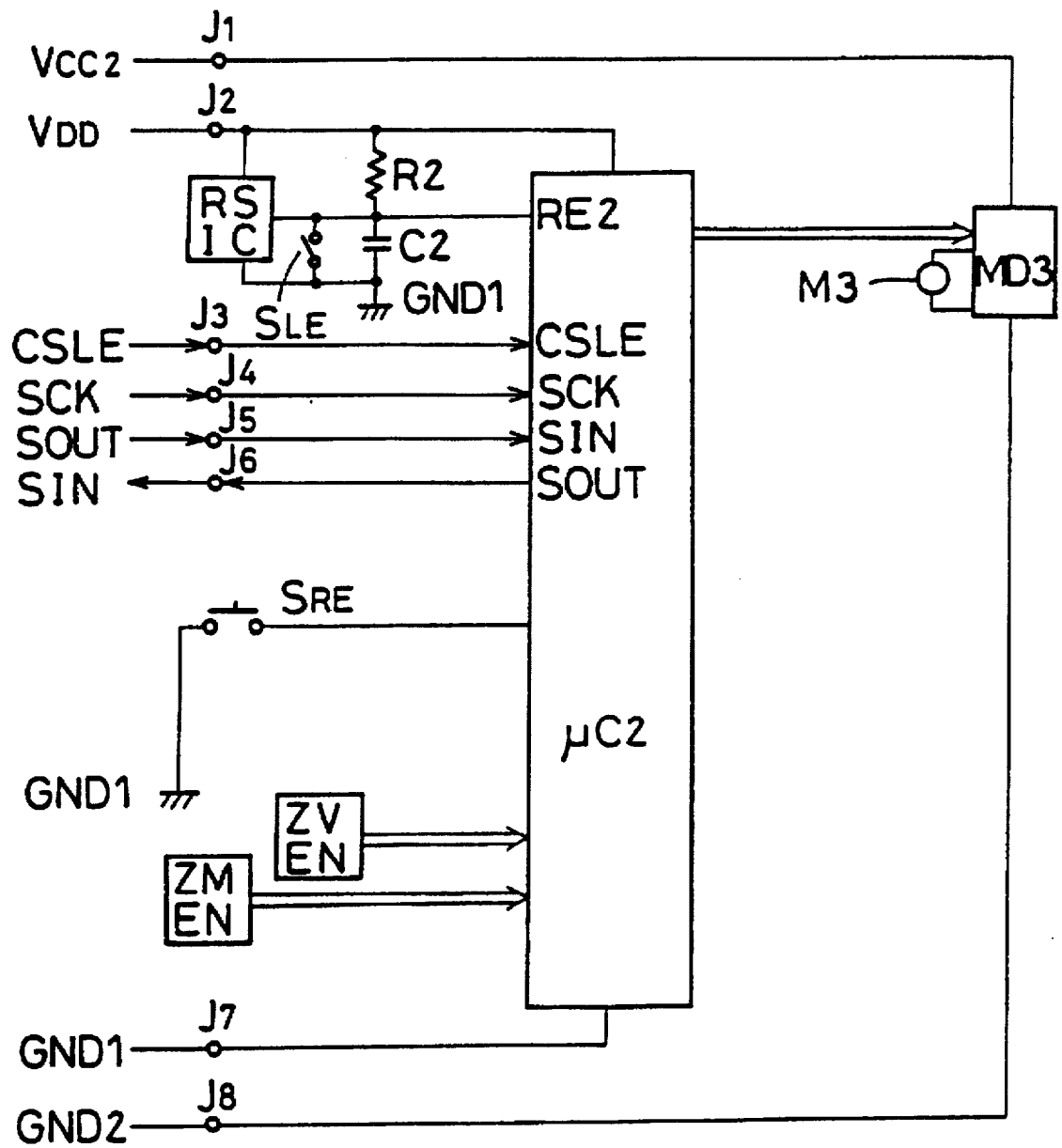
FIG. 64 is a block circuit diagram showing a circuit arrangement of the interchangeable lens shown in FIG. 62.

FIG. 64 is a circuit diagram of the in-lens circuit $LE_{CT}$ incorporated in the interchangeable lens LE.

ZMEN represents a zoom encoder for showing an absolute position of the zoom ring 80. In this embodiment, a lens having a focal length of $f_{min}$=35 mm to $f_{max}$=200 mm is employed.

$S_{RE}$ represents a release switch turned on when the key 24 is depressed.

Completing the description of the hardware employed for the present invention, the software employed for the present embodiment will hereinafter be described.

Firstly, software of the in-body microcomputer μC1 will be described.

When the battery E1 is attached to the camera body BD, the battery attachment detection switch $S_{RE1}$ (see FIG. 63) is turned off. Consequently, the condenser μC1 for resetting is charged through the resistance R1, so that a reset signal whose level changes from low to high is inputted to the reset terminal RE1 of the in-body microcomputer μC1 which controls the entire camera system. By inputting this reset signal, the in-body microcomputer μC1 activates the DC/DC converter DD as well as starts to generate a clock with the hardware incorporated in the in-body microcomputer μC1. Thereby, the in-body microcomputer μC1 is supplied with the voltage $V_{DD}$ sufficient for the driving, and thereafter executes a routine RESET shown in FIG. 85. Although the in-body microcomputer μC1 stops to generated a clock and halts the operation of the DC/DC converter in the halt condition (to be described later), in a control by an interrupt from the halt condition, the in-body microcomputer μC1 starts to generate a clock and activates the DC/DC converter DD with the hardware incorporated in the in-body microcomputer μC1 similarly to the above-described case when the battery is attached.

Figure 65:
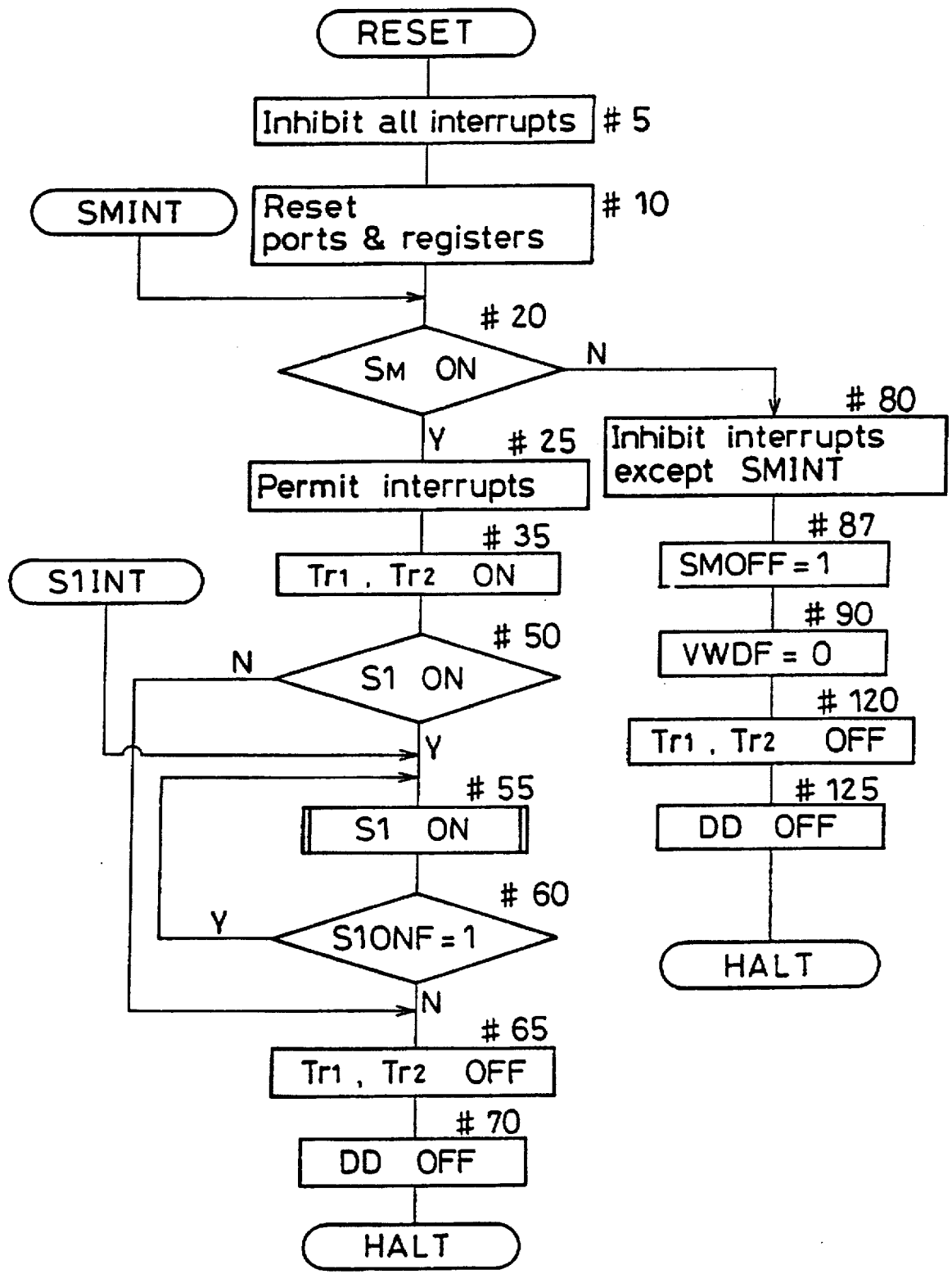
FIGS. 65 to 80 are flow charts of the operations of the camera body and the interchangeable lens shown in FIGS. 61 and 62.
Figure 67:
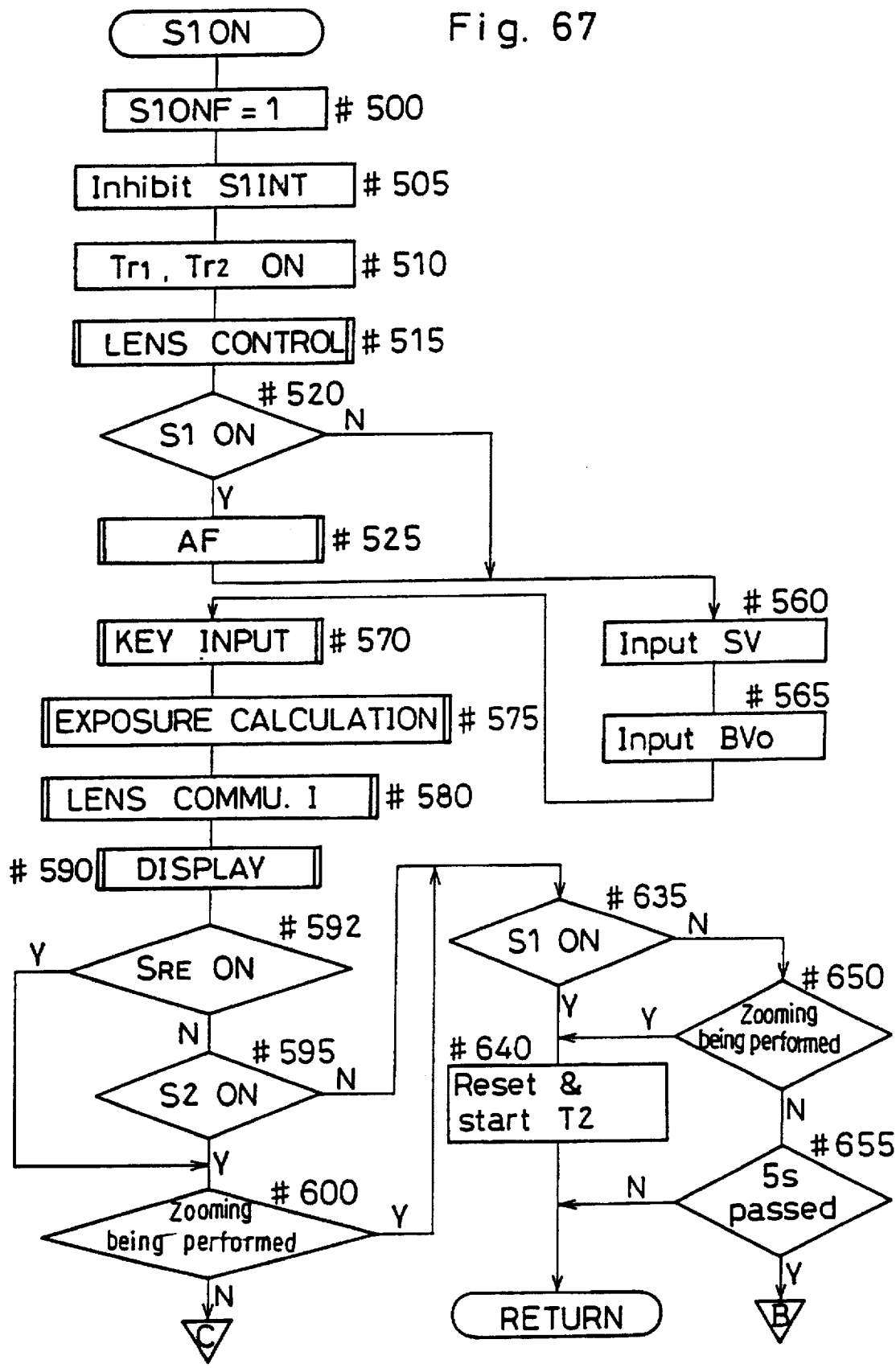

In the routine RESET shown in FIG. 65, firstly, all the interrupts are inhibited, and various ports and registers are reset (steps #5 and #10). Then, whether or not the main switch $S_M$ is ON is determined (step #20). When the main switch $S_M$ is turned from on to off, or from off to on, an interrupt SMINT by the operation of the main switch $S_M$ is executed from step #20. When the main switch $S_M$ is ON at step #20, all the interrupts are permitted (step #25), the levels of the power control terminals PW1 and PW2 (output ports) are changed to high, respectively, to activate the transistors Tr1 and Tr2 for supplying electric power to each circuit and to the in-lens microcomputer μC2 (step #35), and the process proceeds to step #50. At step #50, whether or not the taking preparation switch S1 is ON is determined. When the switch S1 is not ON at step #50, the process proceeds to step #65, where the levels of the power control terminals PW1 and PW2 are changed to low, respectively, to disable the power transistors Tr1 and Tr2. Thereafter, the process proceeds to step #70, where the level of the power control terminal PW0 is changed to low to stop the operation of the DC/DC converter DD. When the taking preparation switch S1 is ON at step #50, a subroutine S1ON is executed at step #55. Thereafter, whether or not a flag S1ON, set for 5 seconds after the taking preparation switch is turned on or off, has been set is determined (step #60). When it has been set, the process proceeds to step #55, and when it has not been set, to step #65. In the interrupt S1INT executed when the taking preparation switch S1 is turned from off to on, the processes from step #55 are executed The above-mentioned subroutine S1ON is shown in FIG. 67. When the subroutine is called, firstly, a flag S1ONF showing that the process has passed through this flow is set, the interrupt S1INT is inhibited, the levels of the power control terminals PW1 and PW2 are changed to high to activate the power transistors Tr1 and Tr2, and a subroutine LENS CONTROL is executed (steps #500 to #515).

Figure 69:
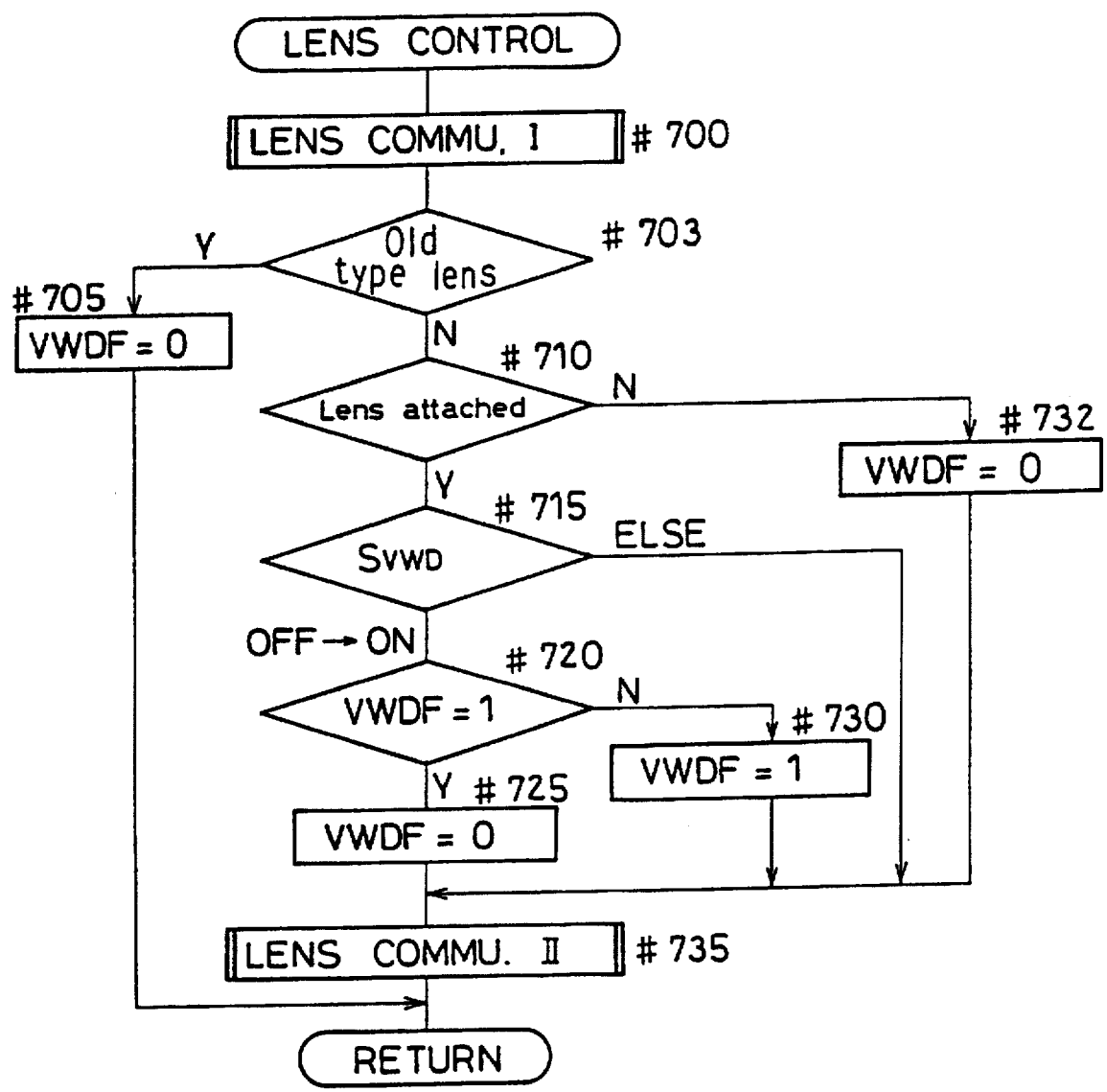

The subroutine LENS CONTROL is shown in FIG. 69. When the subroutine is called, firstly, a subroutine LENS COMMUNICATION I is executed, and predetermined data are transmitted from the in-lens microcomputer μC2 (step #700). Now, the lens communication I will be described.

Figure 66:
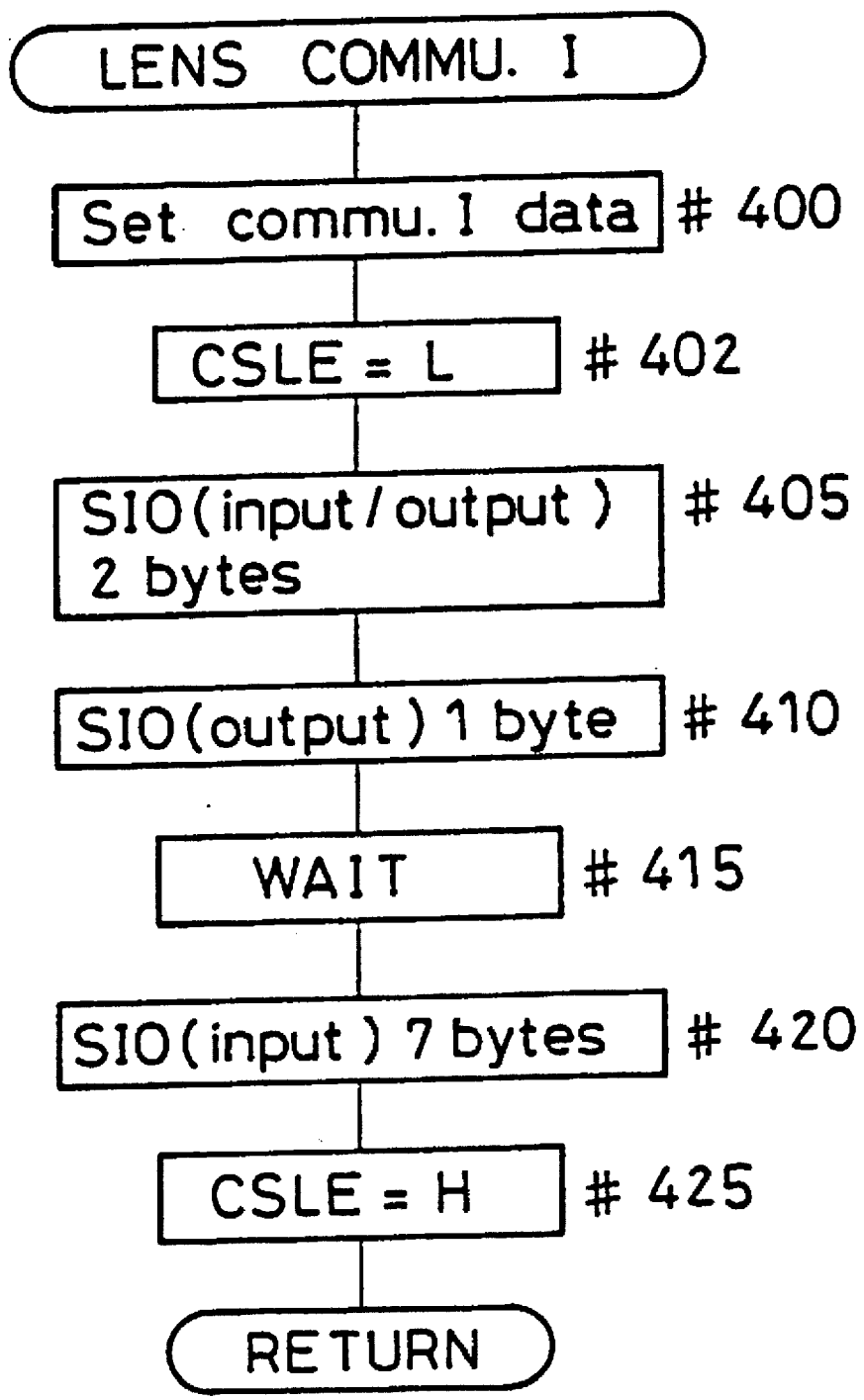

The lens communication I, which is one of the communication modes employed for the present invention, is a communication with lens where data are transmitted from the in-lens microcomputer μC2. The subroutine LENS COMMUNICATION I is shown in FIG. 66. When the subroutine is called, firstly, data showing that the communication mode is Mode I are set, the level of the terminal CSLE is changed to low, and the in-lens microcomputer μC2 is notified that the data communication will be performed (steps #400 and #402). Then, a 2-byte serial communication is performed (step #405). At this time, while serially outputting data to each other, the in-body microcomputer μC1 and the in-lens microcomputer μC2 simultaneously, serially input the data transmitted from the other. At the first byte, data showing the type of the camera body are outputted by the in-body microcomputer μC1. At this time, the in-lens microcomputer μC2 outputs meaningless data $FF_H$ (the subscript $_H$ represents a hexadecimal number), and the in-lens microcomputer μC2 and the in-body microcomputer μC1 respectively input the data transmitted from the other. At the second byte, data showing the type of the lens (new lens, old lens, etc.) are outputted by the in-lens microcomputer μC2. At this time, the in-body microcomputer μC1 outputs the meaningless data $FF_H$, and the in-lens microcomputer μC2 and the in-body microcomputer μC1 respectively input the data transmitted from the other. Then, in order to show that the present communication mode with the lens is Mode I, the first-byte data of the communication mode set as described above are outputted to the in-lens microcomputer μC2. After the process waits for a while, 7-byte data transmitted from the in-lens microcomputer μC2 are inputted, the level of the terminal CSLE is changed to high, and the process returns (steps #410 to #425).

The content of the data transmitted from the in-lens microcomputer μC2 to the in-body microcomputer μC1 is: (i) a minimum aperture value $AV_o$; (ii) a maximum aperture value $AV_{max}$; (iii) a focal length f; (iv) a lens attachment signal; (v) a condition of the release switch $S_{RE}$ on the lens side, whether or not the virtual wide is operable, whether or not the virtual wide is completed, and whether the manual zooming is halted or in progress; (vi) a minimum focal length $f_{MIN}$; and (vii) a maximum focal length $f_{MAX}$.

When the lens communication I is completed, the process returns to the flow shown in FIG. 69, where the in-body microcomputer μC1 determines whether or not the lens is of old type (step #703). When the lens is of old type, since the lens does not have a zoom drive motor and therefore the virtual wide function cannot be set, a flag VWDF showing the virtual wide function is reset, and the process returns (step #705). On the other hand, when the lens is of new type, whether or not the lens is attached to the camera body is determined (step #710). When the lens is attached, whether or not the virtual wide view switch $S_{VWD}$ is turned from off to on is determined (step #715). When the virtual wide switch $S_{VWD}$ is turned from off to on at step #715, whether or not the virtual wide mode is being operated is determined with the flag VWDF at step #720. When the virtual wide mode is being operated (that is, VWDF=1), the flag VWDF is reset at step #725 in order to cancel the virtual wide mode, and the process proceeds to step #735. When the flag VWDF has not been set, the flag VWDF is set at step #730 in order to execute the virtual wide mode, and the process proceeds to step #735. When the virtual wide switch $S_{VWD}$ is not turned from off to on at step #715, the process proceeds to step #735. When it is determined that the lens is not attached at step #710, the flag VWDF is reset at step #732, and the process proceeds to step #735. At step #735, a subroutine LENS COMMUNICATION II where data are outputted to the lens is executed, and the process returns.

Figure 72:
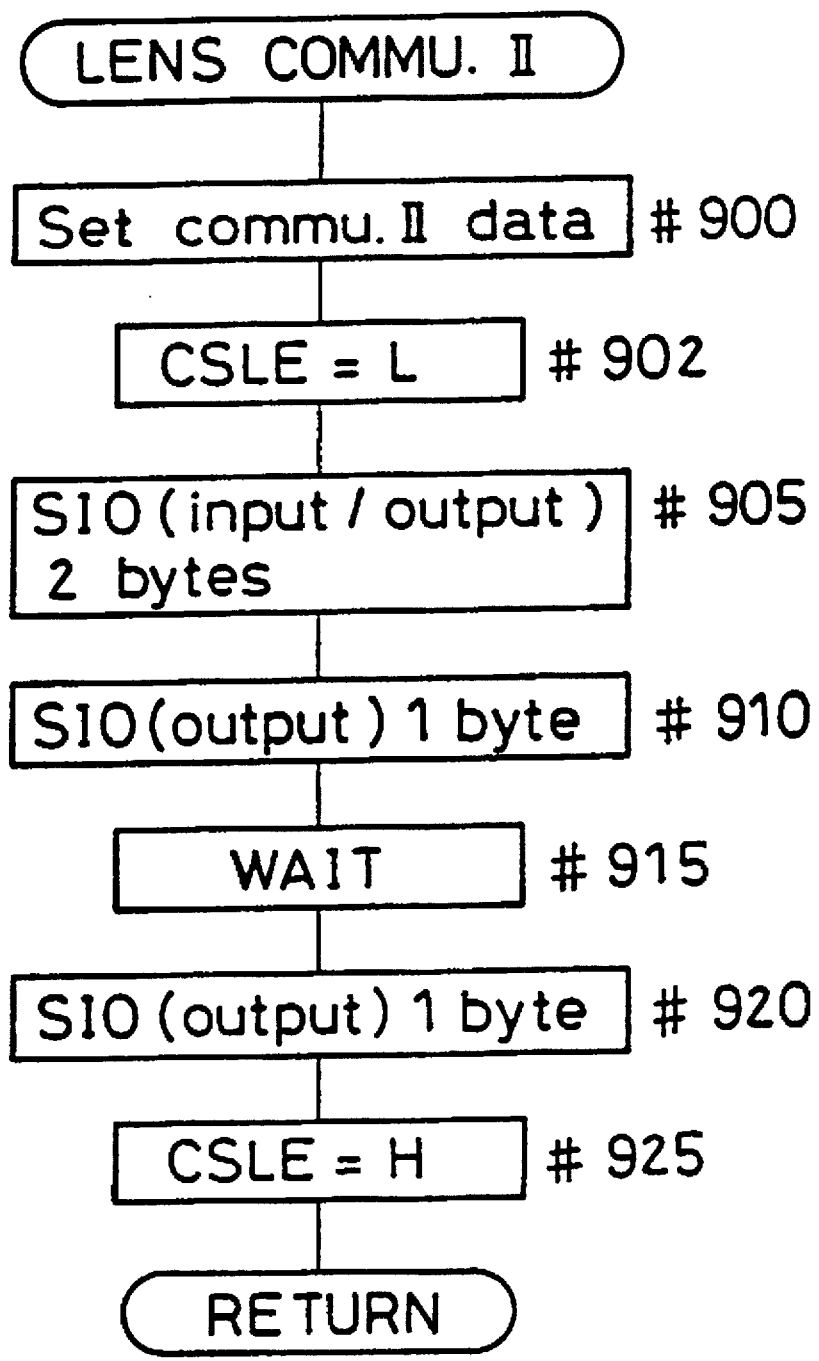

The subroutine LENS COMMUNICATION II is shown in FIG. 72. When the subroutine is called, firstly, data showing that the communication mode is Mode II are set, the level of the terminal CSLE is changed to low, and the 2-byte data communication is performed to notify the in-body microcomputer μC1 and in-lens microcomputer μC2 of the types of the lens and the camera body, respectively. Then, a 1-byte data communication is performed in order to show the communication mode (Mode II in this flow). After the process waits for a while, 1-byte data are outputted to the in-lens microcomputer μC2, the level of the terminal CSLE is changed to high, and the process returns (steps #900 to #925). The data outputted to the in-lens microcomputer μC2 include the contents of the flag VWDF showing the virtual wide and a flag ZUPF showing a zooming up.

Returning to the flow shown in FIG. 67, when the subroutine LENS CONTROL is completed, the process proceeds to step #520, where whether or not the switch S1 is ON is determined. When the switch S1 is ON, at step #525, the data of the CCD transmitted from the focus detection light receiving circuit $AF_{CT}$ are inputted, the lens driving amount is calculated based on the data, the above driving amount is outputted to the motor drive circuit MD1, and the process proceeds to step #560. When the switch S1 is not ON, the process proceeds to step #560 without performing the above-described AF operation (step #525). At step #560, a film sensitivity SV is inputted from the film sensitivity reading circuit DX. Then, at step #565, an object luminance $BV_o$ at the open aperture value is inputted from the photometric circuit LM. This data input will be described. Firstly, the level of the terminal CSDX or CSLM is changed to low, and a circuit (DX or LM) to which the data are inputted is selected. Then, the data are transmitted from the terminal SIN. After the data are inputted, the level of the terminal CSDX or CSLM is changed to high, and the data input is completed.

Next, a subroutine KEY INPUT is executed.

Figure 70:
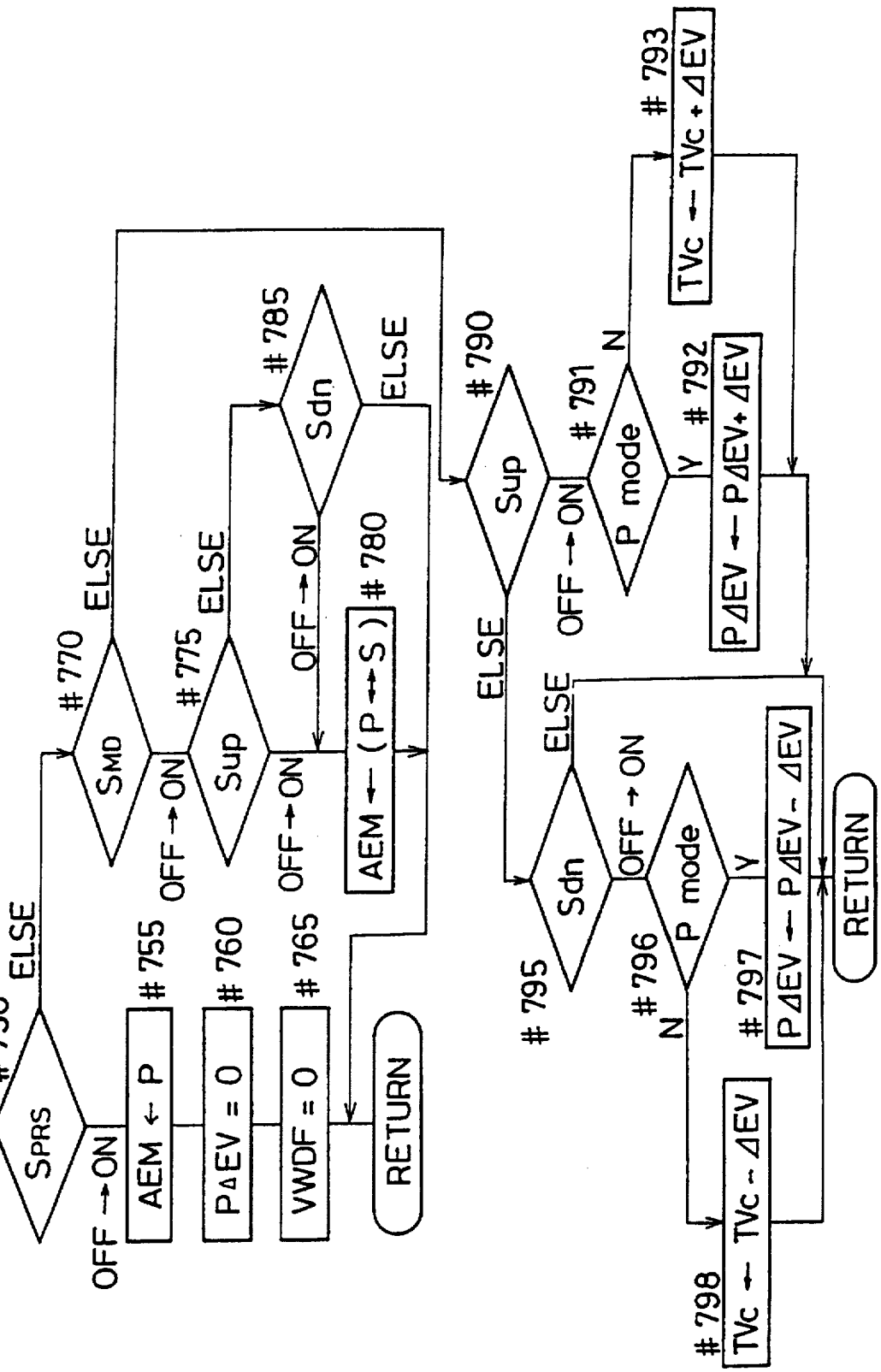

The subroutine KEY INPUT will be described referring to FIG. 70. Firstly, whether or not the P reset switch $S_{PRES}$ is turned from off to on is determined (step #750). When the switch $S_{PRS}$ is turned from off to on, the AE mode (AEM) is reset into the P (program) mode, a shift amount PΔEV of exposure value by a program shift is reset to 0, the flag VWDF showing the virtual wide mode is reset, and the process returns (steps #755 to #765). When the switch $S_{PRS}$ is not turned from off to on, the process proceeds to step #770, where whether or not the AE mode changing switch $S_{MD}$ is turned from off to on is determined. When the switch $S_{MD}$ is turned from off to on, the process proceeds to step #775, where whether or not the switch $S_{up}$ is turned from off to on is determined. When the switch $S_{up}$ is turned from off to on, determining that the up key 20 is operated, the process changes the AE mode (AEM) alternately to the P mode and the S (shutter speed priority) mode, and returns (step #780). When the switch $S_{up}$ is not turned from off to on at step #775, determining that the up key 20 is not operated, the process proceeds to step #785, where whether or not the switch $S_{dn}$ is turned from off to on is determined. When the switch $S_{dn}$ is turned from off to on, determining that the down key 21 is operated, the process changes the AE mode (AEM) alternately to the P mode and the S mode, and returns. When the switch $S_{dn}$ is not turned from off to on at step #785, the process also returns.

When the switch $S_{MD}$ is not turned from off to on at step #770, the process proceeds to steps from step #790, where whether or not the up key 20 or the down key 21 has been operated is determined by the turning from off to on of the switch $S_{up}$ and that of the switch $S_{dn}$ (steps #790 and #795). When the up switch $S_{up}$ is turned from off to on, an AE mode (AEM) determination is made. When the AE mode is the P mode, the shift amount PΔEV is set to PΔEV=PΔEV+ΔEV (ΔEV represents a predetermined amount), and when the AE mode is not the P mode, a set amount TVc of the time value is set to TVc=TVc +ΔEV. Then, the process returns in either case (steps #791 to #793). On the other hand, when the down switch $S_{dn}$ is turned from off to on, the AE mode (AEM) determination is made. When the AE mode is the P mode, the shift amount PΔEV is set to PΔEV=PΔEV−ΔEV, and when the AE mode is not the P mode, the set amount TVc of the time value is set to TVc=TVc−ΔEV. Then, the process returns in either case (steps #796 to #798). When the switches $S_{up}$ and $S_{dn}$ a have not been operated, the process immediately returns.

Figure 71:
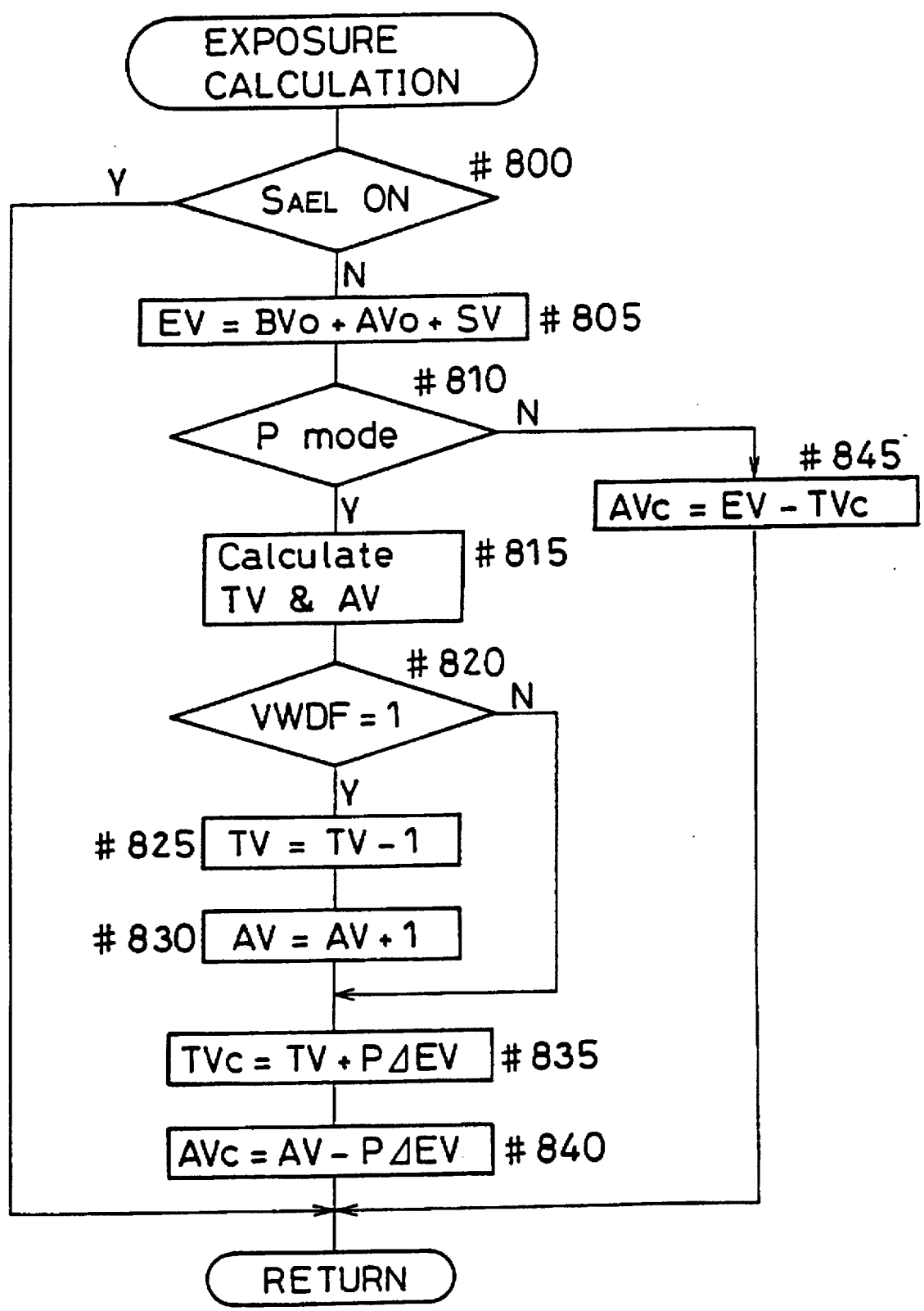

Next, at step #575 in FIG. 67, the in-body microcomputer μC1 executes a subroutine EXPOSURE CALCULATION (see FIG. 71). When the subroutine is called, firstly, whether or not the AE lock switch $S_{AEL}$ is ON is determined. When it is ON, determining that the exposure value is not changed, the process returns (step #800). When the switch $S_{AEL}$ is not ON, an exposure value EV is obtained by EV=BVo+AVo+ SV, where BVo represents an object luminance obtained by an exposure measurement at open aperture, AVo represent a minimum (open) aperture value, and SV represents a film sensitivity. Then, whether or not the AE mode is the P mode is determined. When it is the P mode, a time value TV and an aperture value AV are calculated from the above-described exposure value EV based on a predetermined AE program chart (steps #810 and #815). A specific example of this AE program chart is shown, for example, in Japanese laid-open Patent Application No. H1-129238. Then, whether or not the virtual wide mode is set is determined. When the virtual wide mode is set (that is, VWDF=1), in order to perform an exposure control so that the aperture is rather closed, the time value TV is decreased by one step (1EV) and the aperture value is increased by one step (1EV) (steps #820 to #830), and the process proceeds to step #835.

Now, the reason will be described why the exposure control is performed so that the aperture is rather closed in the virtual wide mode. It is assumed that the present mode is the virtual wide mode, that the lens is being moved (f/1.4) toward the shorter focal length side, and that a focus detection is being performed under that condition. At the shorter focal length side, since a depth of focus to an object distance is large, an in-focus condition is obtained in a wide distance range. However, when the focal length is returned to the original focal length f by a zooming up, the in-focus distance range decreases. Therefore, in a case where an in-focus condition is obtained in the vicinity of an end of an in-focus range on the shorter focal length side, the in-focus condition is lost by a zooming up. Moreover, since a focus detectable range is large on the shorter focal length side, an undesirable object is considered as an object to the focus detection, so that an in-focus condition cannot be obtained with respect to an object to be focus on, or even if an in-focus condition is obtained, there are occasions when the in-focus condition is obtained in the vicinity of an end of an in-focus range as described above. Therefore, in order to avoid an out-of-focus condition in such cases, the exposure control is performed so that the aperture is rather closed.

Returning to FIG. 71, when the AE mode is not the virtual wide mode (that is, VWDF=0) at step #820, the process also proceeds to step #835, where the shift amount PΔEV is added to the time value TV to obtain a time value TVc for the exposure control. Then, at step #840, the shift amount PΔEV is subtracted from the aperture value AV to obtain an aperture value AVc for the exposure control, and the process returns. When the AE mode is not the P mode at step #810, determining that the AE mode is the S mode, the process proceeds to #845, where the aperture value AVc for the exposure control is obtained by AVc=EV−TVc, and returns.

After a subroutine EXPOSURE CONTROL is executed, the in-body microcomputer μC1 again executes the subroutine LENS COMMUNICATION I where data are transmitted from the in-lens microcomputer μC2 at step #580 in FIG. 67, and based on the data, executes a subroutine DISPLAY shown at step #590. In the subroutine, data showing whether or not the virtual wide is operable, a field frame within an image plane, the time value TVc and the aperture value AVc for the exposure control, etc. are serially outputted to the display control circuit DISPC. In the display control circuit DISPC, based on the above-described serially inputted data, a display is given by the display portion DISPI on the camera body, by the display portion DISPII outside of the image plane of the view-finder and by the display portion DISPIII within the image plane.

Figure 81A:
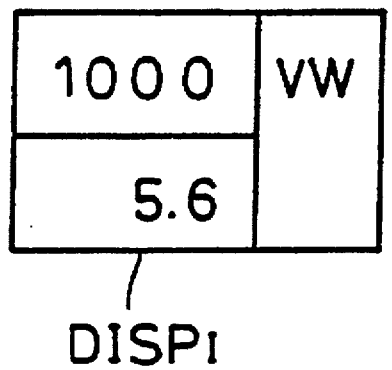
FIGS. 81A to 81C show the content of the display on the body of the single-lens reflex camera shown in FIG. 61.
Figure 81B:
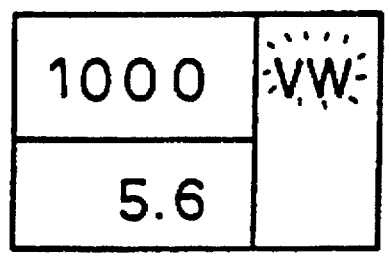
Figure 81C:
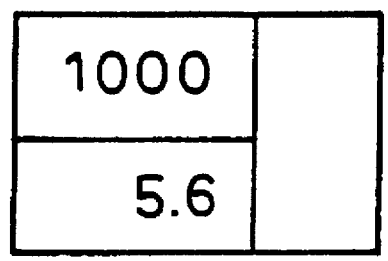
Figure 82B:
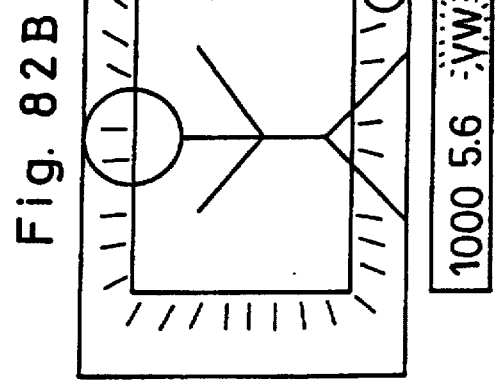
FIGS. 82A to 82D show the content of the view-finder display of the single-lens reflex camera shown in FIG. 61.
Figure 82D:
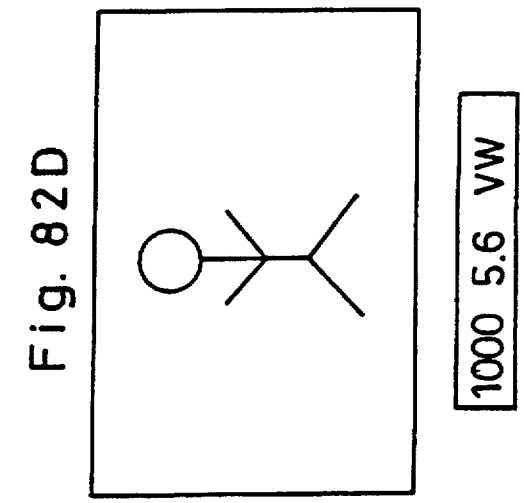
Figure 82A:
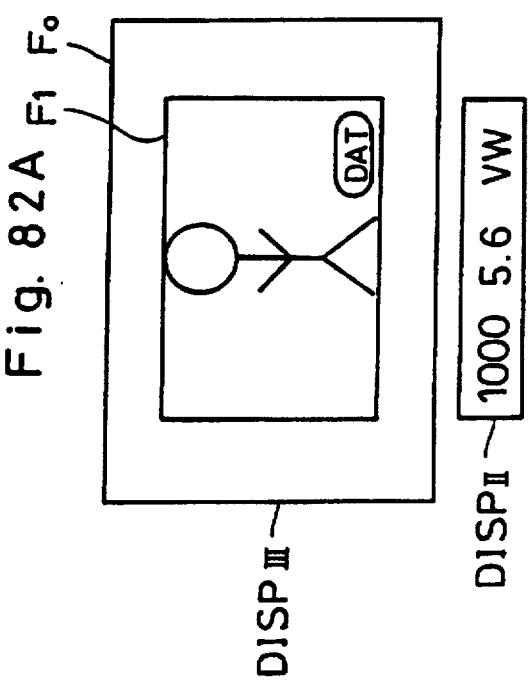
Figure 82C:
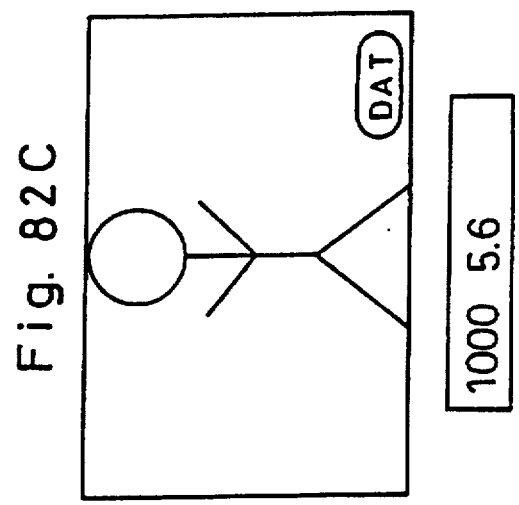

FIGS. 81A to 81C show the display portion DISPI on the camera body. FIGS. 82A to 82D show the display portion DISPII outside of the image plane of the view-finder and the display portion DISPIII within the image plane of the view-finder. FIGS. 81A and 82A show that a zooming toward the shorter focal length side is completed in the virtual wide mode. FIGS. 81B and 82B show a condition where it is warned that the mode cannot be changed to the virtual wide mode. FIGS. 81C and 82C show that the mode is not the virtual wide mode (that is, the mode is the normal mode). FIG. 82D shows that a zooming toward the shorter focal length side is being performed in the virtual wide mode.

The display portion DISPI on the camera body and the display portion DISPII outside of the image plane of the view-finder display the same information. These display portions DISPI and DISPII display "VW" representing the virtual wide mode as well as a time value and an aperture value when a zooming is completed in the virtual wide mode shown in FIGS. 81A and 82A. The display portion DISPIII displays a field frame $F_1$ actually taken into a picture in the virtual wide mode and a position of printed data "DAT" whose position is changed corresponding to the field frame $F_1$ in the virtual wide mode and a field frame $F_o$ in the normal mode. At the time of warning shown in FIGS. 81B and 82B, the field frame $F_1$ and the display "VW" representing the virtual wide mode are being turned on and off. At this time, the "DAT" is displayed at a position where data such as a date, etc. are printed out. In the normal mode shown in FIGS. 81C and 82C, a position of the printed data within the image plane, a time value and an aperture value are displayed. In FIG. 82D, where the mode is the virtual wide mode, "VW" is displayed and all the view-finder displays are turned off since a zooming operation is being performed.

Figure 73:
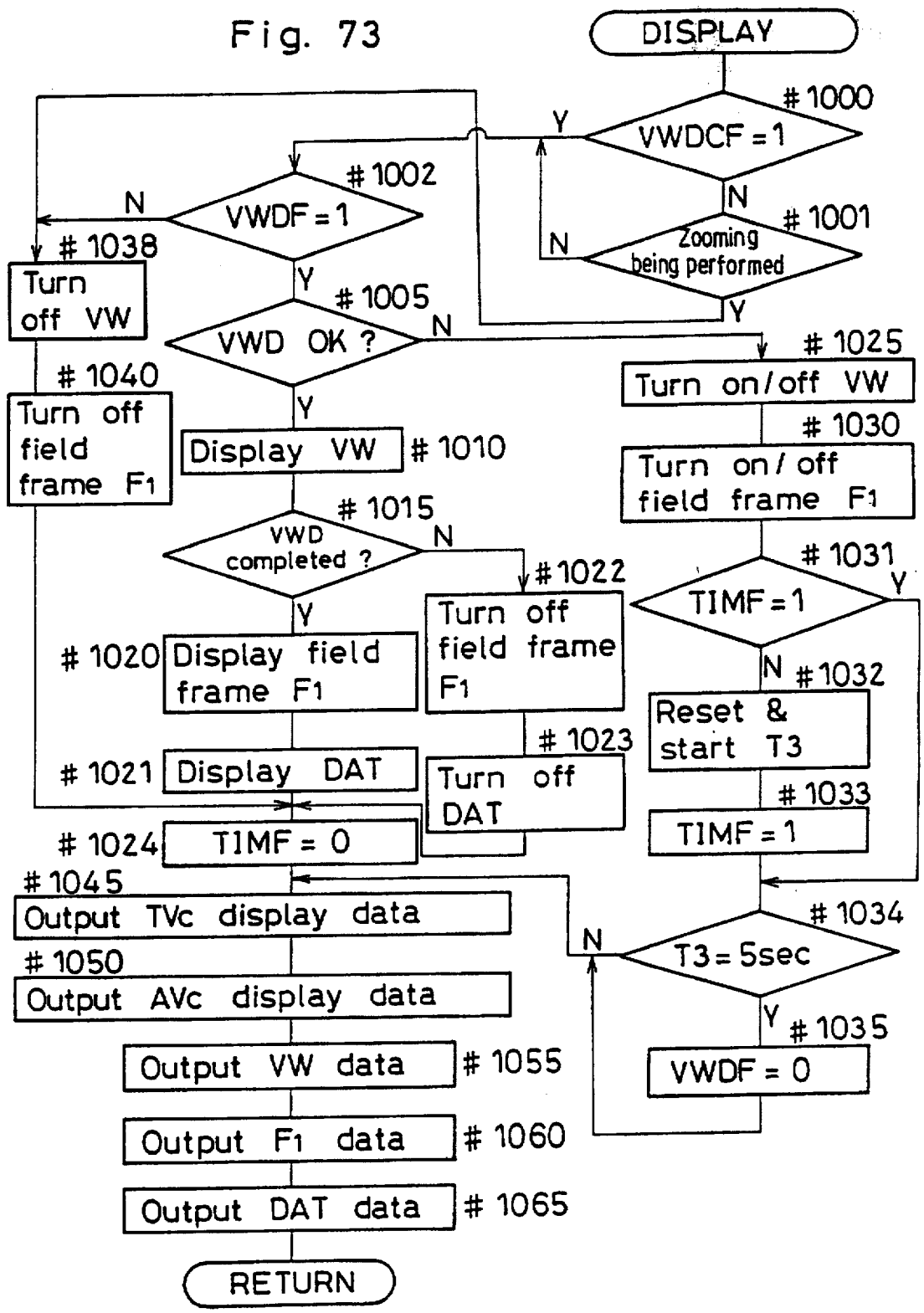

A subroutine for performing the above-described display will be described referring to FIG. 73. Firstly, whether or not the virtual wide operation is completed is determined based on the data transmitted from the in-lens microcomputer μC2. When it is not completed (that is, VWDCF≠1), whether or not a zooming operation is being performed is determined also based on the data transmitted from the in-lens microcomputer μC2 (steps #1000 and #1001). When the virtual wide operation is not completed and a zooming operation is being performed, determining that the zooming operation is being performed so as to make the virtual wide operable when it is warned that the virtual wide is not operable, the process proceeds to step #1038. When the virtual wide operation is completed, or when although the virtual wide operation is not completed, a zooming operation is not being performed, the process proceeds to step #1002, where whether or not the virtual wide mode has been set is determined by the flag VWDF. When the virtual wide mode has been set (that is, VWDF=1), whether or not the virtual wide is operable is determined by data, showing that the virtual wide is operable, transmitted from the in-lens microcomputer μC2. When the virtual wide mode is operable, a signal for displaying "VW" representing the virtual wide mode is set, and whether or not the virtual wide (VWD) is completed is determined (steps #1010 and #1015). When the virtual wide is completed, a signal for displaying the field frame $F_1$ is set (step #1020), a signal for specifying a display position of the printed data "DAT" corresponding to the field frame $F_1$ is set (step #1021), a timer flag TIMF is reset (step #1024), and the process proceeds to step #1045. When the virtual wide is not completed (that is, a zooming operation is being performed) at step #1015, a signal for turning off the field frame $F_1$ is set (step #1022), a signal for turning off the printed data "DAT" is set (step #1023), and the process proceeds to step #1024.

When the virtual wide mode is inhibited at step #1005, the field frame $F_1$ as well as the display "VW" representing the virtual wide mode is alternately turned on and off, a signal for specifying a display position of the printed data "DAT" corresponding to the field frame $F_o$ is set, and the process proceeds to step #1031. At step #1031, whether or not the timer flag TIMF has been set is determined. When the flag TIMF has not been set, a timer T3 is reset and started (step #1032), the flag TIMF is set (step #1033), and the process proceeds to step #1034. When the flag TIMF has been set, the process proceeds directly to step #1034. At step #1034, whether or not the timer T3 shows that 5 seconds have passed is determined. When 5 seconds have passed, the flag VWDF showing the virtual wide is reset at step #1035, and the process proceeds to step #1045. When five seconds have not passed, the process proceeds also to step #1045.

When the mode is not the virtual wide mode (that is, VWD≠1) at step #1002, a signal for turning off the display "VW", representing the virtual wide, and the field frame $F_1$ is set (step #1038), a signal for displaying a position of the printed data "DAT" corresponding to the field frame $F_o$ is set (step #1040), and the process proceeds to step #1024. At steps #1045 to #1065, signals representing a control time value TVc, a control aperture value AVc, a display of "VW", turning on/off of "VW", turning off of "VW", a display of the field frame F1, turning on/off of the field frame F1, turning off of the field frame $F_1$, and a display of the printed data "DAT", turning off of the printed data "DAT" and display position of the printed data "DAT", respectively, are transmitted to the display control circuit DISP, and the process returns.

In the flow shown in FIG. 67, when the above-described subroutine DISPLAY is completed at step #590, whether or not the release switch $S_{RE}$ on the lens side is ON is determined based on the data transmitted from the in-lens microcomputer μC2 (step #592). When it is ON, the process proceeds to step #600. When the switch $S_{RE}$ is not ON, whether or not the release switch S2 on the camera body side is ON is determined step #595. When it is ON, the process proceeds to step #600. At step #600, whether or not a zooming operation is being performed is determined based on the data transmitted from the in-lens microcomputer μC2. When a zooming operation is being performed, the process proceeds to step #635 to inhibit a release operation. When a zooming operation is not being performed at step #600, the process proceeds to step #601 in FIG. 68, where whether or not the mode is the virtual wide mode is determined. When the mode is not the virtual wide mode (that is, VWDF≠1), the process proceeds to step #609, where whether or not the mode is the self mode is determined based on the ON/OFF of the switch $S_{SELF}$. When the switch $S_{SELF}$ is ON, since the mode is the self mode, after a counting of 10 seconds at step #610, the process proceeds to step #617. When the switch $S_{SELF}$ is not ON, since the mode is not the self mode, after skipping step #610, the process proceeds to step #617. When the mode is the virtual wide mode (that is, VWDF=1) at step #601, the process proceeds to step #602, where a flag ZUPF showing a zooming up is set, and in order to transmit this data to the in-lens microcomputer μC2, the subroutine LENS COMMUNICATION II is executed at step #603. Then, whether or not the mode is the self mode is determined based on the ON/OFF of the switch $S_{SELF}$ at step #604. When the switch $S_{SELF}$ is ON, since the mode is the self mode, after a counting of 10 seconds at step #605, the process proceeds to step #606. When the switch $S_{SELF}$ is not ON, since the mode is not the self mode, after skipping step #605, the process proceeds to step #506. Next, at step #606, the subroutine LENS COMMUNICATION I is executed to receive data from the in-lens microcomputer μC2, and at step #607, whether or not the zooming is completed is determined based on the data received from the in-lens microcomputer μC2. When the zooming is not completed, the process waits for a while at step #611, and returns to step #606. On the other hand, when the zooming is completed, the flag ZUPF showing a zooming up is reset at step #608, and the process proceeds to step #617.

At and after step #617, all the interrupts are inhibited, the exposure control is performed, and after the exposure control, the film is wound up by a frame (steps #617 to #625). Then, the flag S1ONF is reset in order to show that the subroutine S1ON is completed, the interrupt S1INT by the turning on of the taking preparation switch S1 is permitted, the flag VWDF showing the virtual wide mode is reset, and the process returns (steps #630 to #634).

In the flow shown in FIG. 67, when the release switch S2 is not ON at step #595, the process proceeds also to step #635. At step #635, whether or not the taking preparation switch S1 is ON is determined. When the taking preparation switch S1 is ON, a timer T2 for maintaining the power supply is reset and started at step #640, and the process returns. On the other hand, when the taking preparation switch S1 is not ON, whether or not a zooming operation is being performed is determined based on the lens data at step #650. When a zooming operation is being performed at step #650, the process proceeds to step #640, where the timer T2 is reset and started to increase the power supply maintained time. Moreover, when a zooming operation is not being performed at step #650, whether or not the timer T2 for maintaining the power supply shows that 5 seconds have passed is determined at step #655. When 5 seconds have not passed, the process returns. When 5 seconds have passed, the process proceeds to step #630, where the completion of the taking operation by the turning off of the taking preparation switch S1 is controlled.

Figure 74:
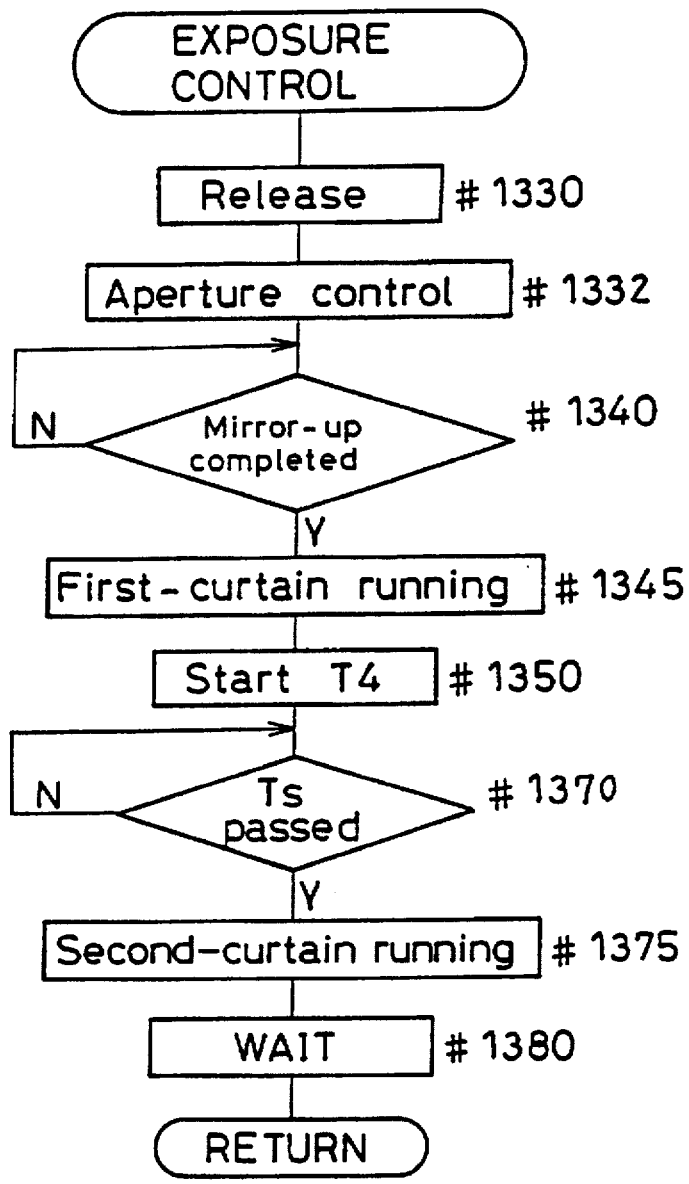
Figure 75:
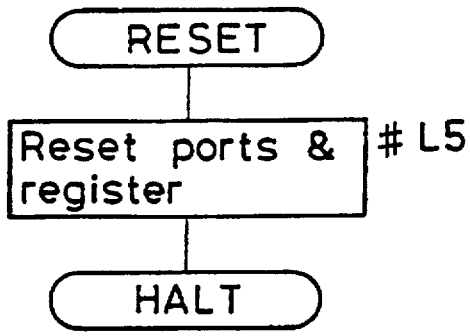

Next, the subroutine EXPOSURE CONTROL executed at step #620 is shown in FIG. 74. When the subroutine is called, firstly, a predetermined control signal is outputted to control a release operation (step #1330). Thereby, an engaged portion (not shown) is disengaged to perform a release operation such as a mirror-up, etc. Then, the aperture is closed to the value shown by the control aperture value AVc (step #1832). Then, the in-body microcomputer μC1 waits until the mirror-up is completed, and when the mirror-up is completed, a first curtain is run. Then, a timer T4 for counting an actual exposure time Ts corresponding to the control time value TVc is reset and started (steps #1340 to #1350). Thereafter, the process proceeds to #1370, and waits until the exposure time Ts passes. When the exposure time Ts has passed, a second curtain is run, and the process waits until the second-curtain running is completed, and returns (steps #1375 and #1380).

With this, the description of step #55 is finished.

Returning to the flow in FIG. 65, when the main switch $S_M$ is not ON at step #20, the process proceeds to step #80, where interrupts other than the interrupt SMINT by the turning on of the main switch $S_M$ are inhibited. Then, it being determined that this flow is executed by the turning off of the main switch $S_M$, a flag SMOFF showing this is set, and the flag VWDF is reset to cancel the virtual wide mode (steps #87 and #90). Then, the levels of the terminals PW1 and PW2 are changed to low to disable the transistors $Tr_1$ and $Tr_2$ for supplying electric power to the circuits by the in-body microcomputer μC1 and the zoom motor of the lens, and further, the level of the terminal PW0 is changed to low to disable the DC/DC converter DD (steps #120 and #125). Then, the process halts. Thus, the in-body microcomputer μC1 goes to a sleep mode.

Next, control operations by the in-lens microcomputer μC2 will be described. When the lens is not attached to the camera body, since the lens attachment detection switch $S_{LE}$ shown in FIG. 4 is turned on and the level of the reset terminal RE2 of the in-lens microcomputer μC2 is maintained low, the circuits on the lens side are not activated at all. When the lens is attached to the camera body, the lens attachment detection switch $S_{LE}$ is turned off and a signal whose level is changed from low to high is inputted into the reset terminal RE2. Thereby, the in-lens microcomputer μC2 executes a routine RESET shown in FIG. 15. The in-lens microcomputer μC2 firstly resets ports and registers, and then, halts.

Figure 76:
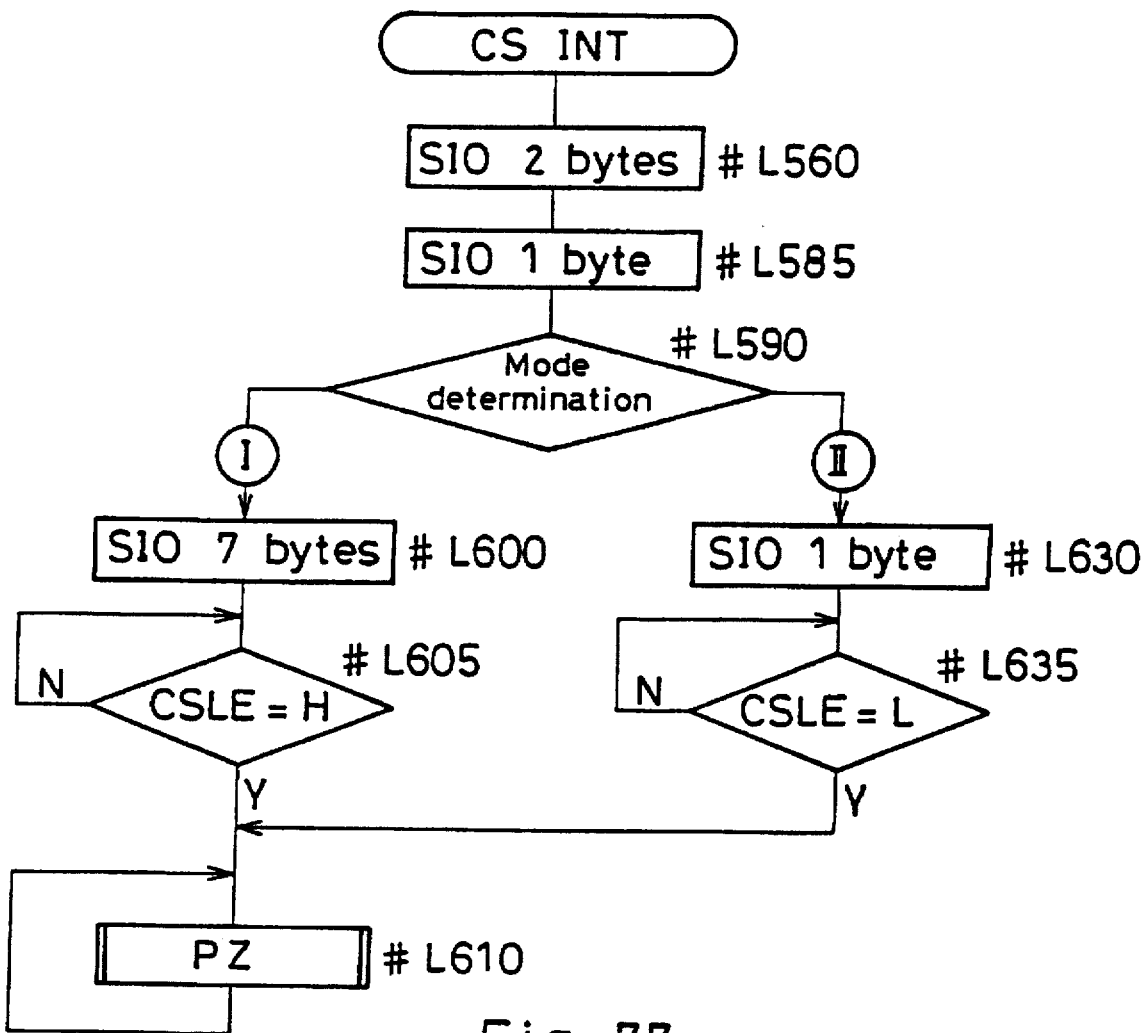

Next, when a signal whose level is changed from high to low is transmitted from the in-body microcomputer μC1 to the terminal CSLE of the lens, the in-lens microcomputer μC2 executes a routine CS INTERRUPT shown in FIG. 76. In this routine, the 2-byte serial communication is performed in response to a clock from the camera (step #L560). Subsequently, data showing the communication mode is received from the in-body microcomputer μC1 by the 1-byte serial communication, and the communication mode is determined (steps #L585 and #L590). When the communication mode is Mode I , 7-byte data are outputted to the in-body microcomputer μC1, and the process waits until the level of the signal inputted to the terminal CSLE is changed from low to high (steps #L600 and #L605). When it is changed to high, the process goes to a subroutine POWER ZOOM (hereinafter, referred to as "PZ") at step #L610, and the subroutine PZ is repeated thereafter.

When the communication mode is Mode II, 1-byte data are received from the in-body microcomputer μC1 (step #L630), and the process waits until the level of the terminal CSLE is changed from low to high (step #L635). When the level of the terminal CSLE is changed to high, the process goes to the subroutine PZ, and the subroutine PZ is repeated thereafter.

Figure 77:
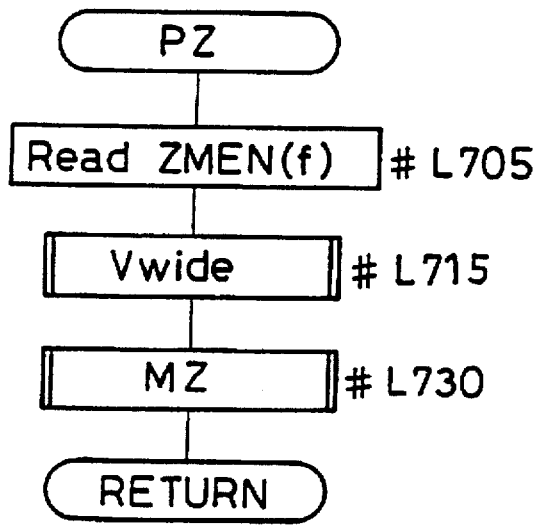

The subroutine PZ is shown in FIG. 77. In this subroutine, focal length information (f) is read from the zoom encoder ZMEN at step #L705, a subroutine Vwide is executed at step #L715, a subroutine MANUAL ZOOM (hereinafter, referred to as MZ) is executed at step #L730, and the process returns.

The above-mentioned subroutines Vwide and MZ will hereinafter be described. First, the subroutine Vwide shown in FIG. 79 will be described. At step #L1000, whether or not the virtual wide is completed, that is, whether or not the focal length is increased from f to f/k (k represents a predetermined value, for example, 1.4) is determined by the flag VWDCF. Then, when the virtual wide is completed (that is, VWDCF=1), the process proceeds to step #L1005, where whether or not the mode is the virtual wide mode is determined based on the data transmitted from the in-body microcomputer μC1. When the mode is not the virtual wide mode (that is, VWDF≠1), the process proceeds to step #L1030, where the lens is controlled by f×k so that the original focal length before the zooming is obtained. After the lens control, the process proceeds to step #L1025, where the flag VWDCF showing the completion of the virtual wide is reset, and the process returns.

When the mode is the virtual wide mode (that is, VWDF=1) at step #L1005, the process proceeds to step #L1010, where whether or not a flag ZUPF showing that the original focal length before the virtual wide operation should be obtained by the turning on of the release button has been set is determined based on the data transmitted from the in-body microcomputer μC1. When the flag ZUPF has been set, the process proceeds to step #L1015, where the lens is controlled by f×k so that the original focal length before the zooming is obtained. After the lens control, the process proceeds to step #L1020, where, it being determined that the zooming is completed, a flag ZMCF (which is transmitted to the in-body microcomputer μC1) showing the completion of the zooming is set. Then, the process proceeds to step #L1025. At step #L1025, as described above, the flag VWDCF showing the completion of the virtual wide is reset, and the process returns. When the flag ZUPF has not been set at step #L1010, the process immediately returns.

When the flag VWDCF showing the completion of the virtual wide has not been set at step #L1000, the process proceeds to step step #L1033, where whether or not the mode is the virtual wide mode (that is, whether or not VWDF=1) is determined. When the mode is the virtual wide mode, the process proceeds to step #L1035. When the mode is not the virtual wide mode, the process immediately returns. At step #L1035, whether or not a value (f/k) obtained by dividing the present focal length f by k is equal to or larger than the minimum focal length $f_{min}$ particular to the lens is determined. When f/k<$f_{min}$, it being determined that the zooming is inoperable, a flag VWDOKF (which is transmitted to the in-body microcomputer μC1) showing that the virtual wide is operable is reset, and the process returns (step #L1060). When (f/k)≥$f_{min}$, the flag VWDOKF showing that the virtual wide is operable is set, and the lens is controlled by f/k (steps #L1040 and #L1045). After the lens control, the flag VWDCF showing the completion of the virtual wide is set, and the flag ZMCF showing the completion of the zooming is reset, and the process returns (steps #L1050 and #L1055).

Figure 78:
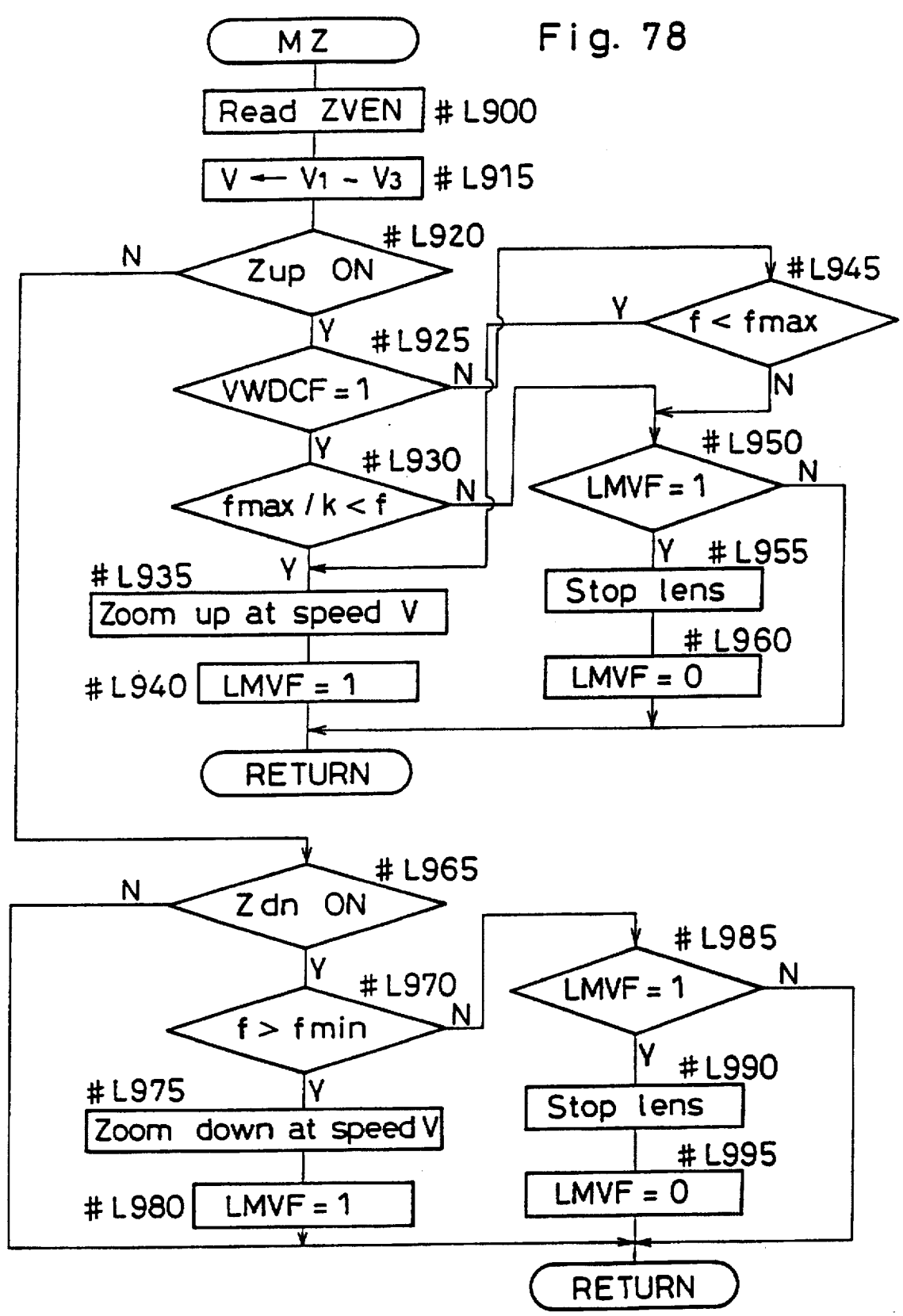
Figure 79:
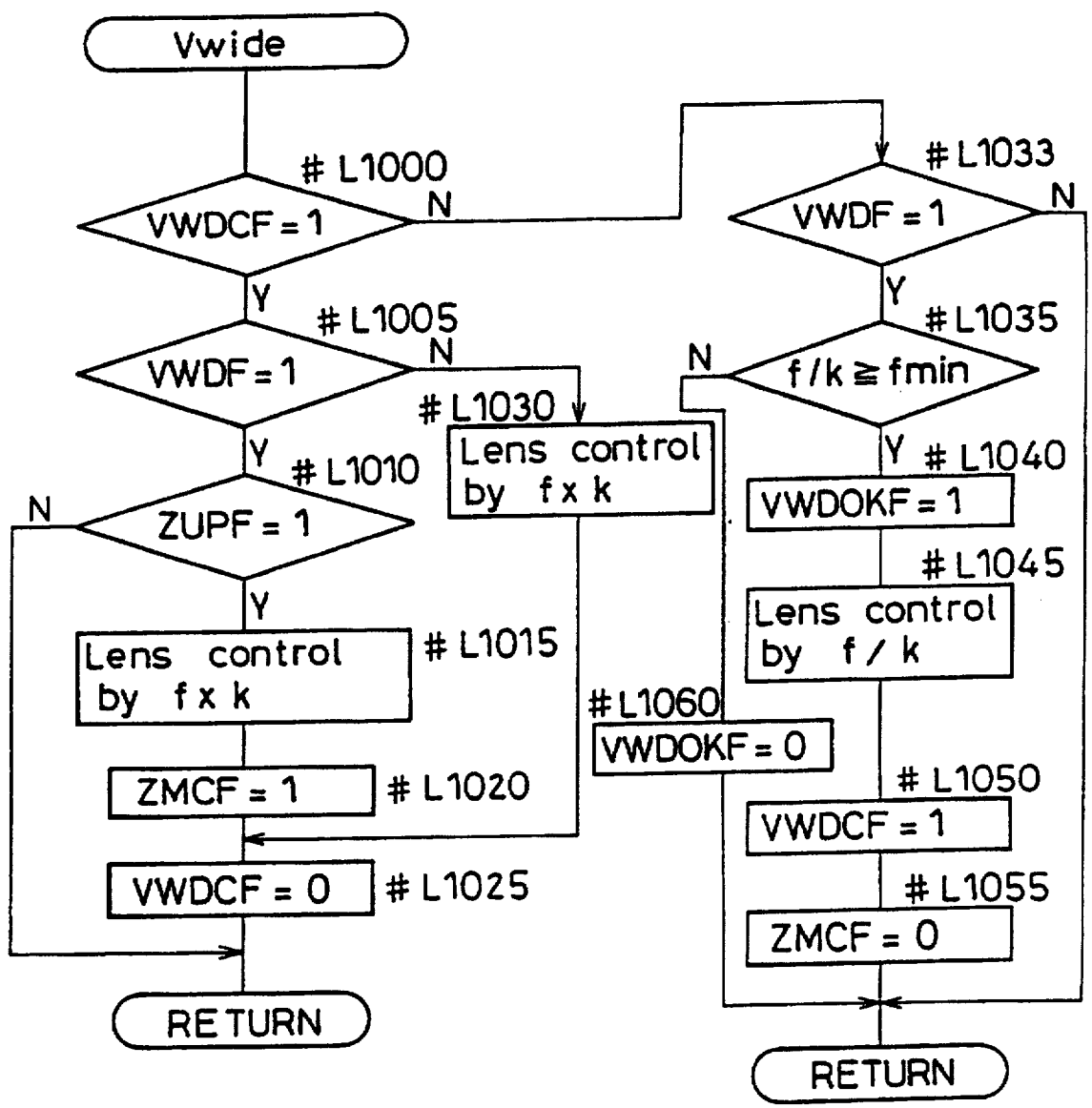

Next, the subroutine MZ will be described referring to FIG. 78. Firstly, the encoder ZVEN showing a speed and direction of the manual zooming is read, and a zoom speed V is set to the speeds $V_1$ to $V_3$ ($V_1$<$V_2$<$V_3$) based on the encoder (steps #L900 and #L915). Then, at step #L920, whether or not a zoom up switch $Z_{UP}$ of the encoder ZVEN is ON is determined. When the switch $Z_{UP}$ is ON, whether or not the flag VWDCF showing the completion of the virtual wide has been set is determined at step #L925. When the flag VWDCF has been set, whether or not a value ($f_{max}/k$) obtained by dividing the maximum focal length $f_{max}$ particular to the lens by the predetermined value k is smaller than f is determined (step #L930). When $f_{max}/k<f$, it being determined that a zooming up during a taking operation is operable, a zoom up control is performed at the speed V set as described above, a flag LMVF (which is transmitted to the in-body microcomputer μC1) showing that the lens is moving is set, and the process returns (steps #L935 and #L940). When $f_{max}/k \geq f$ at step #L930, the process proceeds to step #L950, where whether or not the flag LMVF has been set is determined. When the lens is moving (that is, LMVF=1), the lens is stopped at step #L955, the flag LMVF is reset at step #L960, and the process returns. Since this routine is executed fast, if the focal length f becomes $f=f_{max}/k$ while the lens is moving, the lens stops at the position. When the flag LMVF has not been set at step #L950, the process immediately returns.

When the flag VWDCF has not been set at seep #L925, the process proceeds to step #L945, where whether or not the focal length f is smaller than the maximum focal length $f_{max}$ particular to the lens is determined. When $f<f_{max}$ the process proceeds to step #L935, where a zooming up control is performed. When $f \geq f_{max}$ (although $f>f_{max}$ is impossible), the process proceeds to step #L950, where the stopping of the lens is controlled.

When the zoom up switch $Z_{UP}$ is not ON at step #L920, the process proceeds to step #L965, where whether or not a zoom down switch $Z_{dn}$ of the encoder ZVEN is ON is determined. When the switch is ON, whether or not the focal length f is larger than the minimum focal length $f_{MIN}$ particular to the lens is determined (step #L970). When $f>f_{MIN}$, it being determined that a zooming down is operable, a zooming down control is performed at the speed V set as described above, the flag LMVF (which is transmitted to the in-body microcomputer μC1) showing that the lens is moving is set, and the process returns (steps #L975 and #L980). When $f \leq f_{min}$ (although $f<f_{min}$ is impossible) at step #L970, the process proceeds to step #L985, where whether or not the flag LMVF has been set is determined. When the lens is being moved (that is, LMVF=1), the lens is stopped at step #L990, the flag LMVF is reset at step #L995, and the process returns. Since this routine is executed fast, if the focal length f becomes $f=f_{min}$ while the lens is moving, the lens stops at the position. When the flag LMVF has not been set at step #L985, the process immediately returns.

Variation

Figure 68:
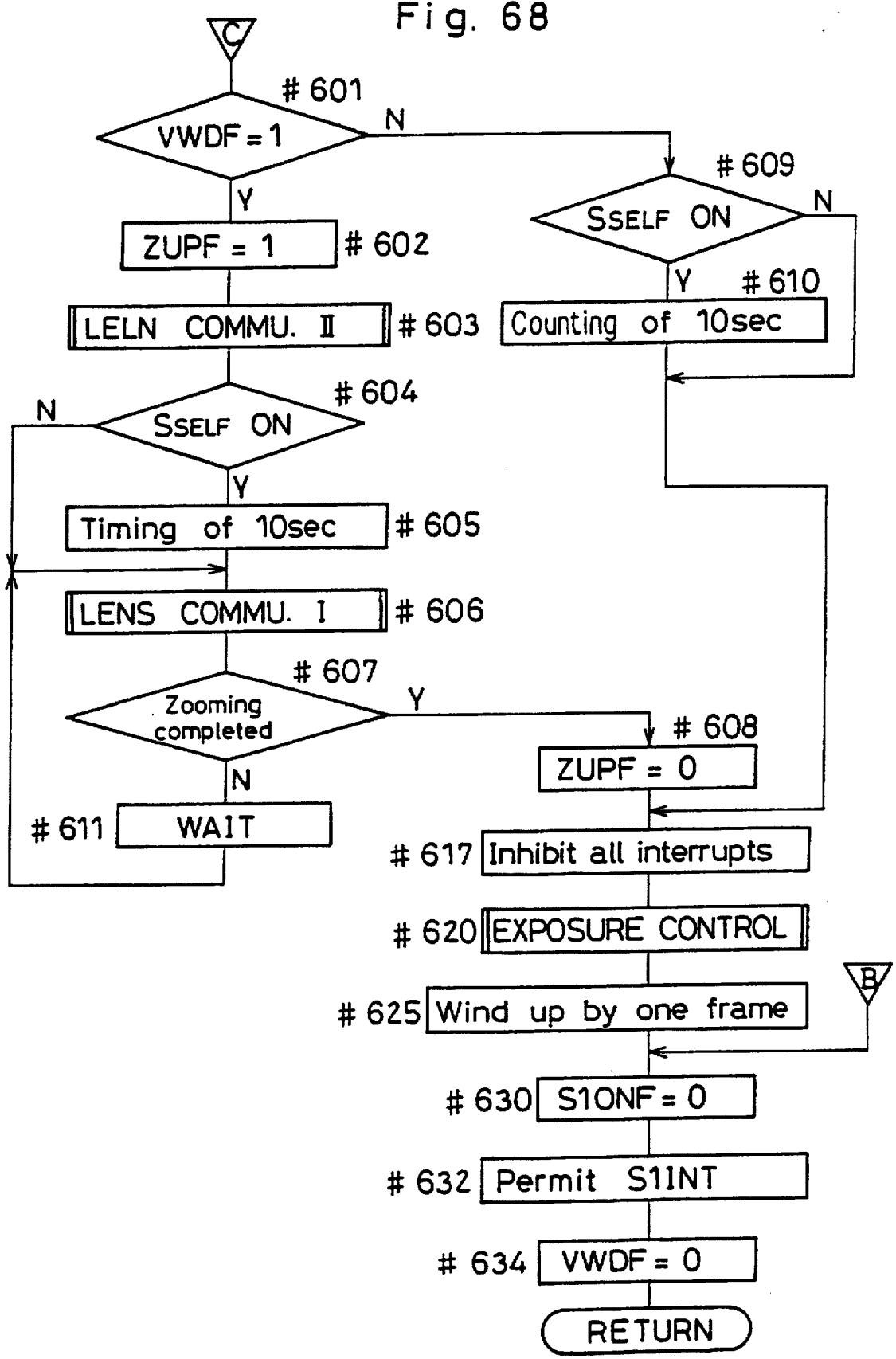
Figure 80:
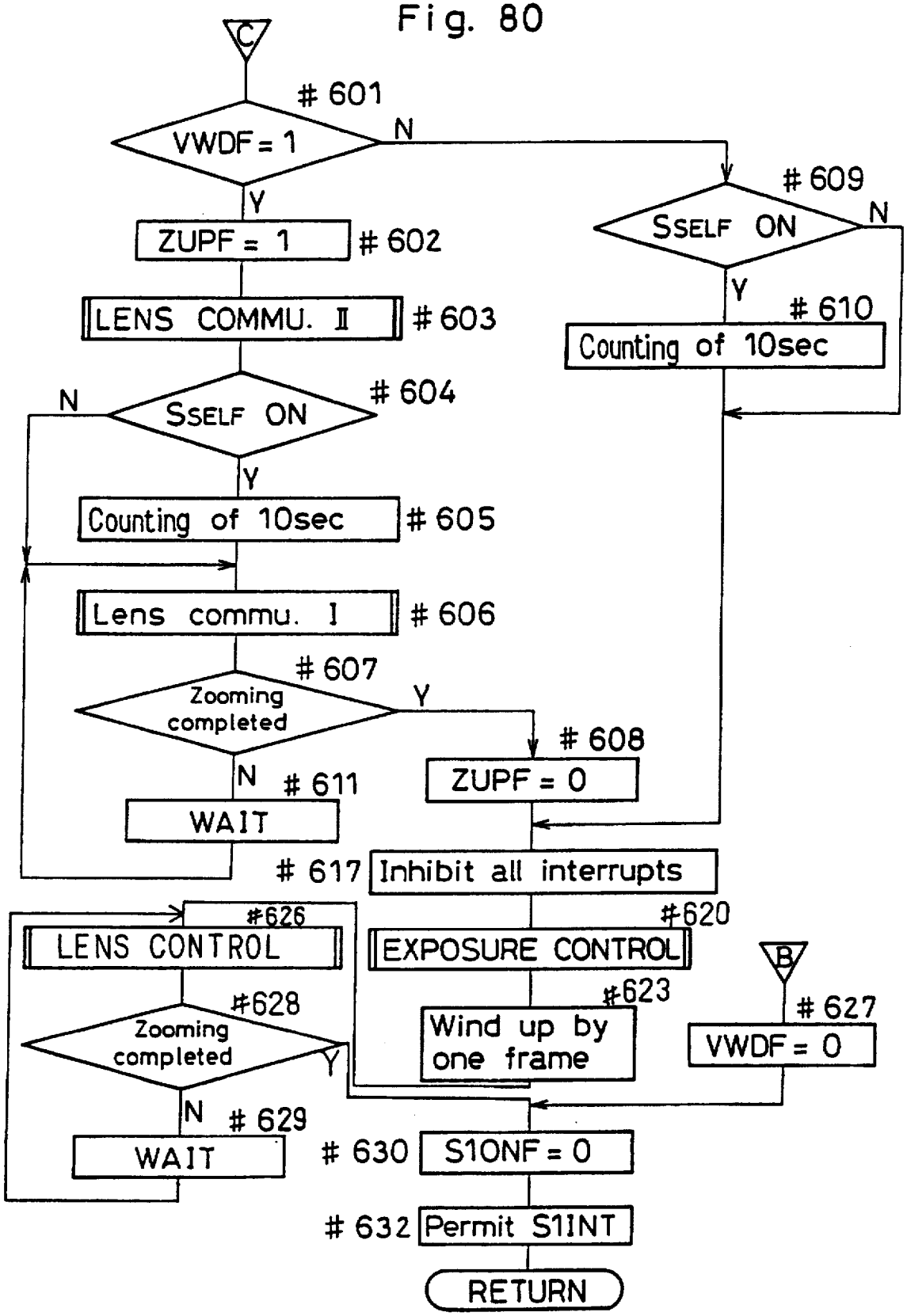

In the above-described embodiment, the virtual wide mode is canceled when the taking operation is completed. This is because after the exposure control at step #620 in FIG. 68, the flag VWDF showing the virtual wide mode is reset at step #634. If the program shown in FIG. 68 is altered as shown in FIG. 80, the virtual wide mode is maintained after the completion of the taking operation. In the flow shown in FIG. 80, the step #634 shown in FIG. 68 is omitted. Then, after step #625 is executed, the subroutine LENS CONTROL is executed. Thus, if the flag VWDF has been set, the focal length of the taking lens is set to f/k. In this embodiment, at the time of the time up of the timer T2 for maintaining the power source (that is, when 5 seconds have passed) at step #655 in FIG. 67, the flag VWDF is reset at step #627.

Obviously, many modifications and variations of the present invention are possible in light of the above teachings. It is therefore to be understood that within the scope of the appended claims, the invention may be practiced other than as specifically described.

What is claimed is:

1. A camera comprising:

a taking lens whose focal length is capable of being changed by driving a zooming optical system thereof;

a finder display whose angle of view is determined according to the focal length of said taking lens;

an operation member which is manually operated;

a controller which controls the zooming optical system in response to an operation of said operation member so that the focal length of said taking lens is changed in the wide-angle direction by a predetermined amount; and an indicator which indicates within said finder display an angle of view corresponding to that which existed before the focal length was changed.

2. A camera as claimed in claim 1, wherein said predetermined amount is calculated on the basis of the current focal length.

3. A camera as claimed in claim 1, wherein said indicator is operated after a focal length changing operation by said controller has been completed.

4. A camera as claimed in claim 1, wherein said camera is a single lens reflex camera.

5. A camera comprising:

a taking lens whose focal length is capable of being changed by driving a zooming optical system thereof;

a finder display whose angle of view is determined according to the focal length of said taking lens;

an operation member which is manually operated;

a calculator which calculates a target focal length based on the current focal length of the taking lens;

a controller which controls the zooming optical system in response to an operation of said operation member so that the focal length of said taking lens is changed to the target focal length; and an indicator which indicates within said finder display an angle of view corresponding to that which existed before the focal length was changed.

6. A camera as claimed in claim 5, wherein said indicator is operated after a focal length changing operation by said controller has been completed.

7. A camera as claimed in claim 5, wherein said camera is a single lens reflex camera.

8. A camera comprising:

a finder display whose angle of view is variable;

a view angle changer which changes an angle of view of said finder display;

an operation member which is manually operated;

a controller which controls said view angle changer in response to an operation of said operation member so that the angle of view of said finder display increases; and an indicator which indicates, in response to an operation of said controller, the angle of view of said finder display, corresponding to that which existed before the angle of view was changed.

9. A camera as claimed in claim 8, wherein said indicator is operated after a view angle changing operation by said controller has been completed.

10. A camera as claimed in claim 8, wherein said camera is a single lens reflex camera and said view angle changer executes zooming of a taking lens.

11. A camera comprising:

a finder display whose angle of view is variable;

a view angle changer which changes an angle of view of said finder display;

an operation member which is manually operated;

a zoom controller which controls said view angle changer so that the angle of view of said finder display decreases;

an indicator which indicates the angle of view of said finder display, corresponding to that which existed after the angle of view is changed; and a controller which activates, when the operation member is operated, said zooming controller after the indication of said indicator is erased.

12. A camera as claimed in claim 11, wherein said camera is a single lens reflex camera.

* * * * *